(12) United States Patent
Tsuruda et al.

(10) Patent No.: US 11,467,465 B2
(45) Date of Patent: Oct. 11, 2022

(54) REFLECTIVE DISPLAY APPARATUS

(71) Applicant: TOPPAN PRINTING CO., LTD., Taito-ku (JP)

(72) Inventors: Tomoko Tsuruda, Taito-ku (JP); Mamoru Ishizaki, Taito-ku (JP)

(73) Assignee: TOPPAN PRINTING CO., LTD., Taito-ku (JP)

( * ) Notice: Subject to any disclaimer, the term of this patent is extended or adjusted under 35 U.S.C. 154(b) by 257 days.

(21) Appl. No.: 16/415,559

(22) Filed: May 17, 2019

(65) Prior Publication Data

US 2019/0271878 A1    Sep. 5, 2019

Related U.S. Application Data

(63) Continuation of application No. PCT/JP2017/041459, filed on Nov. 17, 2017.

(30) Foreign Application Priority Data

Nov. 17, 2016    (JP) .............................. JP2016-224321

(51) Int. Cl.
  *G02F 1/167*    (2019.01)
  *G02F 1/1677*   (2019.01)
  *G02F 1/1335*   (2006.01)
  (Continued)

(52) U.S. Cl.
  CPC ............ *G02F 1/167* (2013.01); *G02F 1/1335* (2013.01); *G02F 1/133514* (2013.01);
  (Continued)

(58) Field of Classification Search
  None
  See application file for complete search history.

(56) References Cited

U.S. PATENT DOCUMENTS 6,147,728 A * 11/2000 Okumura .......... G02F 1/133514
                                                   349/106
2002/0109457 A1 * 8/2002 Duineveld .......... H01L 27/3218
                                                   313/504
(Continued)

FOREIGN PATENT DOCUMENTS

JP    2003-161964 A    6/2003
JP    2007-298632 A    11/2007

OTHER PUBLICATIONS

Extended European Search Report dated Dec. 17, 2019 in European Patent Application No. 17870785.7, 10 pages.
(Continued)

*Primary Examiner* — Ryan Crockett
(74) *Attorney, Agent, or Firm* — Oblon, McClelland, Maier & Neustadt, L.L.P.

(57) ABSTRACT

A reflective display apparatus including a reflective display portion which is two-dimensionally divided into pixels each having subpixels and changes reflectance of each subpixel based on an image signal, and colored layers facing the reflective display portion and partially overlapping the pixels as viewed in a facing direction in which the colored layers face the reflective display portion. The colored layers include traversing colored layers that overlap more than one of the subpixels as viewed in the facing direction, and the colored layers are positioned such that at most one of the colored layers overlaps one of the subpixels as viewed in the facing direction.

17 Claims, 20 Drawing Sheets

(51) Int. Cl.
*G02F 1/157* (2006.01)
*G02F 1/153* (2006.01)

(52) U.S. Cl.
CPC .............. *G02F 1/153* (2013.01); *G02F 1/157* (2013.01); *G02F 1/1677* (2019.01); *G02F 2203/02* (2013.01)

(56) References Cited

U.S. PATENT DOCUMENTS

| | | | | |
|---|---|---|---|---|
| 2002/0180768 | A1* | 12/2002 | Lam | G09G 5/20 345/698 |
| 2005/0105179 | A1* | 5/2005 | Taira | H04N 13/31 359/463 |
| 2005/0285921 | A1* | 12/2005 | Daniel | B41J 3/4075 347/106 |
| 2007/0296894 | A1* | 12/2007 | Her | G02F 1/133514 349/106 |
| 2008/0043092 | A1* | 2/2008 | Evans | G09F 19/12 348/36 |
| 2008/0198185 | A1* | 8/2008 | Maruyama | G09G 3/2025 345/698 |
| 2009/0033845 | A1* | 2/2009 | Tanno | G02F 1/134363 349/106 |
| 2010/0103187 | A1* | 4/2010 | Linssen | G09G 3/2003 345/590 |
| 2012/0147314 | A1* | 6/2012 | Yoshizawa | G02B 5/201 349/144 |
| 2015/0302808 | A1* | 10/2015 | Wang | G02F 1/136286 345/691 |
| 2015/0309360 | A1* | 10/2015 | Wang | G02F 1/134336 345/694 |
| 2018/0149912 | A1* | 5/2018 | Zhang | G02F 1/136286 |
| 2019/0025635 | A1* | 1/2019 | Chen | G02F 1/133514 |
| 2020/0058694 | A1* | 2/2020 | Nakanishi | H04N 5/232 |

OTHER PUBLICATIONS

International Search Report dated Feb. 6, 2018 in PCT/JP2017/041459, filed Nov. 17, 2017 with English Translation.

* cited by examiner

REFLECTIVE DISPLAY APPARATUS

CROSS-REFERENCE TO RELATED APPLICATIONS

The present application is a continuation of International Application No. PCT/JP2017/041459, filed Nov. 17, 2017, which is based upon and claims the benefits of priority to Japanese Application No. 2016-224321, filed Nov. 17, 2016. The entire contents of all of the above applications are incorporated herein by reference.

BACKGROUND OF THE INVENTION

Field of the Invention

The present invention relates to a reflective display apparatus.

Discussion of the Background

Display apparatuses of transmissive or reflective type are known that have a display portion capable of changing transmittance or reflectance for each display unit, and a color filter in which colored layers are arranged facing each other for each display unit of the display portion.

For example, as a transmissive display apparatus, a transmissive liquid crystal display apparatus using a backlight is known. In a transmissive liquid crystal display apparatus, since the user directly sees the light transmitted through a color filter, the burden on the eyes of a user is large.

In contrast, in a reflective display apparatus, for example, external light such as natural light entering a color filter is reflected by a reflective display portion facing the color filter, thereby performing a color display. For this reason, a reflective display apparatus has less burden on the eyes of the user than a transmissive display apparatus, and is more suitable for work in which the user continues looking at the display screen for a long time. Since a reflective display apparatus can be configured without incorporating a display light source, power consumption is also small.

As an example of a reflective display apparatus, for example, an apparatus having a reflective display portion such as an electrophoretic method, a twisting ball method, or the like has been proposed. This kind of a reflective display apparatus is attracting attention as a display apparatus similar to a paper display medium because characters and images are displayed by reflected light of external light as with a printed paper surface.

Patent Literature 1 proposes a color display in which rectangular colored layers are arranged that face the pixel electrodes of a monochrome display apparatus using an electrophoretic method. Patent Literature 1 describes the colored layers in a configuration where they are each partitioned by a bank and a configuration where they are arranged with a gap therebetween without using a bank.

Patent Literature 2 discloses a multicolor display panel in which a display body, containing particles that move or rotate due to an applied electric field, is disposed between a pair of substrates of which at least one is transparent, and a color filter is formed on at least one transparent substrate of the pair of substrates.

Patent Literature 2 discloses a configuration of the color filter in which three square colored layers colored in three primary colors are arranged in a square lattice shape, and a configuration in which elongated striped colored layers colored in three primary colors extending in one direction are arranged.

Patent Literature 1: JP 2007-298632 A
Patent Literature 2: JP 2003-161964 A

SUMMARY OF THE INVENTION

According to an aspect of the present invention, a reflective display apparatus includes a reflective display portion which is two-dimensionally divided into pixels each having subpixels and changes reflectance of each subpixel based on an image signal, and colored layers facing the reflective display portion and partially overlapping the pixels as viewed in a facing direction in which the colored layers face the reflective display portion. The colored layers include traversing colored layers that overlap more than one of the subpixels as viewed in the facing direction, and the colored layers are positioned such that at most one of the colored layers overlaps one of the subpixels as viewed in the facing direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments of the present invention will now be described with reference to the accompanying drawings. In all the drawings, the same or corresponding members are denoted by the same reference signs, and common description is omitted, even in different embodiments.

First Embodiment

A reflective display apparatus according to a first embodiment of the present invention will be described.

Figure 1:
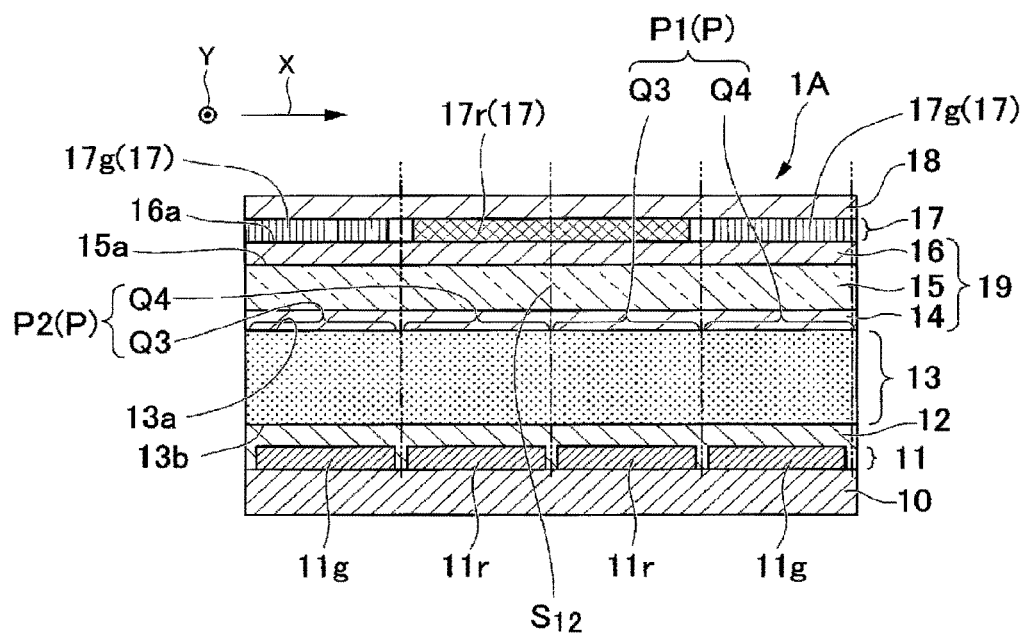
FIG. 1 is a schematic longitudinal cross-sectional view illustrating a configuration of a main part of a reflective display apparatus according to a first embodiment of the present invention.
Figure 2:
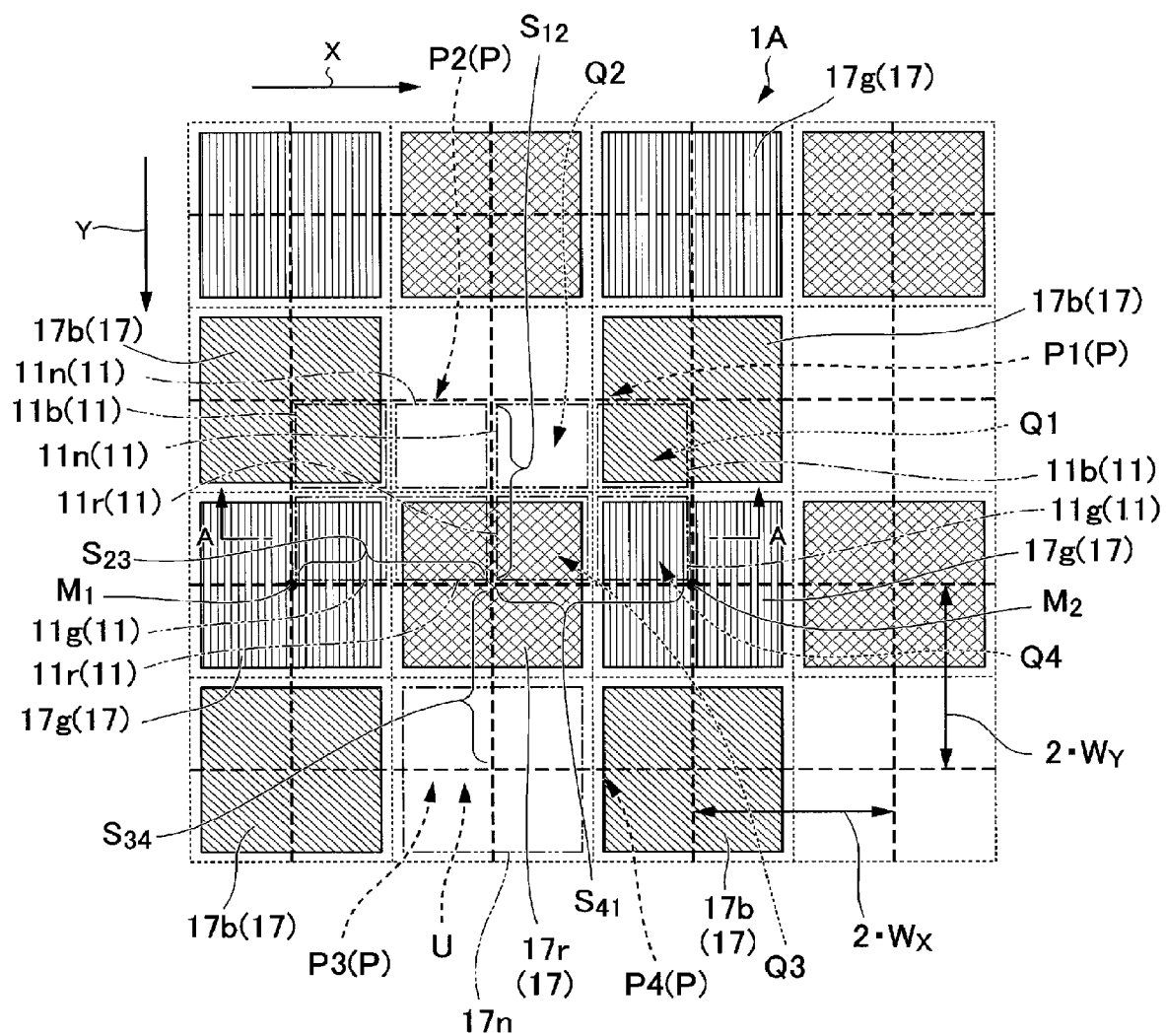
FIG. 2 is a schematic plan view illustrating an arrangement of colored layers of the reflective display apparatus according to the first embodiment of the present invention.
Figure 3:
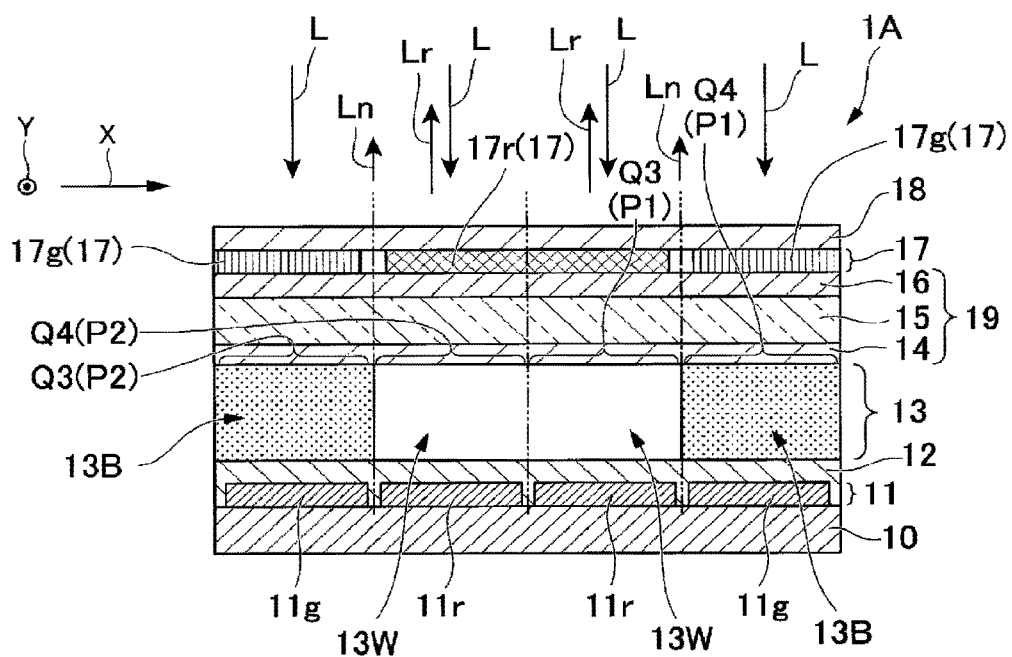
FIG. 3 is a schematic diagram illustrating an example of a driving state of the reflective display apparatus according to the first embodiment of the present invention.

FIG. 1 is a schematic longitudinal cross-sectional view illustrating a configuration of a main part of a reflective display apparatus according to the first embodiment of the present invention. FIG. 2 is a schematic plan view illustrating an arrangement of colored layers of a reflective display apparatus according to the first embodiment of the present invention. FIG. 3 is a schematic diagram illustrating an example of a driving state of a reflective display apparatus according to the first embodiment of the present invention.

As illustrated in the configuration of the main part in FIG. 1, a reflective display panel 1A (reflective display apparatus) according to the present embodiment includes a base 10, a first electrode layer 11, an adhesive layer 12, a reflective display layer 13 (reflective display portion), a second electrode layer 14, a substrate 15, an ink fixing layer 16, a color filter layer 17, and a protective layer 18 in this order.

The reflective display panel 1A is a reflective display apparatus in which incident light from outside is divided into a first color, a second color, a third color, and achromatic color by the color filter layer 17, and the amount of reflected light of these four colors is adjusted by the reflective display layer 13 that is driven based on image signals, thus displaying a full color image.

The base 10 is configured by a plate-like insulator. The material of the base 10 may be, for example, a glass substrate or the like, or a film substrate such as a PET (polyethylene terephthalate) film, a PEN (polyethylene naphthalate) film, or the like. On the surface of the base 10, a first electrode layer 11 is laminated.

The first electrode layer 11 applies a driving voltage to the reflective display layer 13 (described later) for changing the reflectance of the reflective display layer 13. In the present embodiment, the first electrode layer 11 is patterned corresponding to the shape and arrangement of subpixels so that a voltage can be applied to the subpixels of the pixels which are display units.

In order to control the tone of the first color, the second color, the third color, and the achromatic color in each pixel, the first electrode layer 11, as a driving electrode, applies a driving voltage for driving the reflective display layer 13 described later.

As illustrated by a two-dot chain line in FIG. 2, each of the plurality of first electrode layers 11 includes a first color subpixel electrode 11r, a second color subpixel electrode 11g, a third color subpixel electrode 11b, and an achromatic color subpixel electrode 11n. In the following description, when the first color subpixel electrode 11r, the second color subpixel electrode 11g, the third color subpixel electrode 11b, and the achromatic color subpixel electrode 11n are referred to collectively, they may be expressed as the "driving electrodes" or the "subpixel electrodes" in order to simplify description.

The first electrode layer 11 may be formed, for example, of a conductive oxide having transparency such as an indium oxide (e.g., ITO) type, a tin oxide type, or a zinc oxide type, or a carbon nanotube or thiophene type compound or the like.

As illustrated in FIG. 1, a reflective display layer 13 is laminated on the first electrode layer 11 with an adhesive layer 12 interposed therebetween.

The material of the adhesive layer 12 is not limited as long as the first electrode layer 11 and the surface 13b of the reflective display layer 13 can be adhered to each other.

The reflective display layer 13 has an appropriate layer configuration capable of switching between at least black and white by applying an electric field in the direction of the layer thickness.

In the present embodiment, the reflective display layer 13 is configured so that the reflectance gradually changes from a minimum value (black) to a maximum value (white) according to the magnitude of the electric field. For this reason, the reflective display layer 13 is capable of expressing black and white gradation.

The reflectance of the reflective display layer 13 may be changed on the surface 13a that is on the opposite side from the surface 13b.

For example, as the reflective display layer 13, a configuration selected from a reflective liquid crystal type, a cholesteric liquid crystal type, an electrophoretic type (microcapsule type or the like), a micro cup type, an electrochromic type and the like may be used.

The second electrode layer 14 is a transparent electrode laminated on the surface 13a of the reflective display layer 13.

In the present embodiment, the second electrode layer 14 is arranged in an area covering the entire first electrode layer 11.

The drive electrodes of the first electrode layer 11, and the second electrode layer 14 are connected to a drive power source (not illustrated) via switching elements (not illustrated). Therefore, when the switching element is driven according to an image signal, an electric field due to a driving voltage corresponding to the image signal is generated between each driving electrode and the second electrode layer 14.

As the material of the second electrode layer 14, for example, a conductive transparent material such as indium tin oxide (ITO) or the like may be used.

The substrate 15 is a light-transmissive layered portion laminated on the second electrode layer 14.

As the material of the substrate 15, for example, a glass substrate may be used, or a film substrate such as a PET (polyethylene terephthalate) film, a PEN (polyethylene naphthalate) film or the like may be used.

The ink fixing layer 16 is a light-transmissive layer portion and is formed to fix a color filter layer 17 (described later) on the substrate 15. In this embodiment, the reflective display panel 1A includes the ink fixing layer 16; however, in the case where the color filter layer 17 described later is formed directly on the substrate 15, the ink fixing layer 16 may be omitted.

The ink fixing layer 16 is laminated on the surface 15a of the substrate 15 that is on the opposite side from the surface that is in contact with the second electrode layer 14.

As the material of the ink fixing layer 16, an appropriate material is used according to the material of the substrate 15 and the color filter layer 17 described later.

Examples of the material of the ink fixing layer 16 include, for example, urethane resin, polyester resin, acrylic resin, vinyl alcohol resin and the like.

The ink fixing layer 16 may include a porous material such as synthetic silica or alumina in order to enhance the absorbability of the solvent of each ink forming the color filter layer 17 described later.

The method for forming the ink fixing layer 16 is not limited.

For example, the ink fixing layer 16 may be formed by applying a coating liquid for forming the ink fixing layer on the substrate 15, and then drying that coating.

In the case where the ink fixing layer 16 is formed by sheet processing, the coating liquid for forming the ink fixing layer may be applied by, for example, a screen printing method, an offset printing method, a spin coating method, intermittent coating with a die, or the like.

In the case where the ink fixing layer 16 is formed by continuous processing by a roll-to-roll method, the coating liquid for forming the ink fixing layer may be applied by, for example, die coating, comma coating, curtain coating, gravure coating or the like.

As a method for drying the coating liquid for forming the ink fixing layer applied on the substrate 15, heating, blowing, pressure reduction or the like may be used, for example.

As will be described later, in the present embodiment, an ink fixing layer 16 is formed after the first electrode layer 11, the adhesive layer 12, the reflective display layer 13, the second electrode layer 14, and the substrate 15 are laminated on the base 10. A step of drying the coating liquid for forming the ink fixing layer is performed in a temperature environment in which thermal deformation outside the allowable ranges does not occur in these layers. For example, in the case where a thermoplastic resin film is used for at least one of the base 10 and the substrate 15, it is preferable that the drying step be performed at a temperature equal to or lower than the glass transition point of the thermoplastic resin film.

The color filter layer 17 is laminated on the surface 16a of the ink fixing layer 16. The color filter layer 17 faces the reflective display layer 13 with the ink fixing layer 16 interposed therebetween.

As shown in FIG. 2, the plurality of color filter layers 17 respectively include a first colored layer 17r, a second colored layer 17g, and a third colored layer 17b as colored layers.

The first colored layer 17r has a transmission wavelength band that transmits only the wavelength component of the first color. The second colored layer 17g has a transmission wavelength band that transmits only the wavelength component of the second color. The third colored layer 17r has a transmission wavelength band that transmits only the wavelength component of the third color.

The first color, the second color, and the third color are not limited, as long as wavelength bands are different from each other and full-color display is possible by a combination of these colors.

It is preferable that the combination of the first color, the second color, and the third color be selected so as to be white light when the transmitted light of each color is mixed.

The first color, the second color, and the third color may be, for example, red, green, and blue. The order in which red, green, and blue correspond to the first color, the second color, and the third color may be appropriately switched.

The first color, the second color, and the third color may be, for example, cyan, magenta, and yellow. The order in which cyan, magenta, and yellow correspond to the first color, the second color, and the third color may be appropriately switched.

In the following description, when the first colored layer 17r, the second colored layer 17g, and the third colored layer 17b are referred to collectively, they may be expressed as the "colored layers" in order to simplify explanation.

The first colored layer 17r, the second colored layer 17g, and the third colored layer 17b are arranged to face the first color subpixel electrode 11r, the second color subpixel electrode 11g, and the third color subpixel electrode 11b respectively, with the reflective display layer 13 therebetween.

As illustrated in FIG. 1, in the present embodiment, the colored layers and the surface 13a of the reflective display layer 13 are separated by a light-transmissive layer 19 in which the second electrode layer 14, the substrate 15, and the ink fixing layer 16 are laminated.

The light-transmissive layer 19 can satisfactorily transmit light of the first color, the second color, the third color, and white.

Next, the shape and arrangement pattern in the plan view of the first electrode layer 11 and the color filter layer 17 will be described. The shape of the color filter layer 17 in the plan view is a shape as viewed in the facing direction with respect to the reflective display layer 13.

FIG. 2 is a schematic plan view illustrating a part of the reflective display panel 1A with the protective layer 18 omitted. The cross section A-A in FIG. 2 has the same cross section as that in FIG. 1 from which the protective layer 18 is removed.

As illustrated in FIG. 2, the outer shapes of the first color subpixel electrode 11r, the second color subpixel electrode 11g, the third color subpixel electrode 11b, and the achromatic color subpixel electrode 11n in the plan view are rectangular. Each longitudinal width and each lateral width of the subpixel electrodes may be different from each other. As an example, FIG. 2 illustrates an example in which the subpixel electrodes have a square shape having the same size as each other in the plan view.

However, the plan view shapes of the subpixel electrodes may be rectangles having the same size as each other, or rectangles whose sizes do not coincide. Furthermore, depending on, for example, the arrangement position of the switching elements or the like, the shape of the subpixel electrodes may be a quasi-rectangular shape in which a concave portion or a convex portion is formed in a part of the rectangle.

In the following description, unless otherwise stated, an example is described in which the plan view shapes of the subpixel electrodes are rectangles having the same shape and having sides extending in the X direction (the direction from the left to the right in FIG. 2) and the Y direction orthogonal to the X direction (the direction from the top to the bottom in FIG. 2) in order to simplify explanation. The arrangement pitch of the subpixel electrodes is presumed to be uniform in the respective X direction and Y direction.

In the case where the shape of the effective display area of the reflective display panel 1A is rectangular, the X direction and the Y direction may be the horizontal direction and the vertical direction of the effective display area, respectively.

In the present embodiment, the subpixel electrodes are arranged in a rectangular region partitioned in the X direction and the Y direction on the base 10. For example, in the cross section along the line A-A in FIG. 2, as illustrated in FIG. 1, the second color subpixel electrode 11g, the first color subpixel electrode 11r, the first color subpixel electrode 11r, and the second color subpixel electrode 11g are arranged in this order in the X direction. For these subpixel electrodes, a third color subpixel electrode 11b, an achromatic color subpixel electrode 11n, an achromatic color subpixel electrode 11n, and a third color subpixel electrode 11b are provided in the direction opposite to the Y direction (the upper side illustrated in FIG. 1), and are adjacent to each other.

As illustrated in the case of the second color subpixel electrode 11g and the first color subpixel electrode 11r in FIG. 1, the respective subpixel electrodes can change the reflectance of parts of the reflective display layer 13 they face (refer to the two-dot chain line shown in FIG. 1) by applying a voltage to the respective parts.

For example, FIG. 3 schematically illustrates a state in which a voltage is applied to the first color subpixel electrodes 11r, and white portions 13W are formed in parts of the reflective display layer 13 facing the first color subpixel electrodes 11r.

The subpixel electrodes divide the reflective display layer 13 into subpixels which are the drive units having a changeable reflectance.

The subpixels according to the present embodiment partition the surface 13a of the reflective display layer 13 in a two-dimensional rectangular lattice shape in accordance with the fact that the subpixel electrodes are rectangular and arranged in the X direction and the Y direction at an equal pitch.

The X direction width and the Y direction width of the subpixels are denoted by $W_X$ and $W_Y$, respectively. In the present embodiment, the arrangement pitch in the X direction of the subpixels is $W_X$, and the arrangement pitch in the Y direction is $W_Y$.

The four subpixels facing the regions where the first color subpixel electrodes 11r, the second color subpixel electrodes 11g, the third color subpixel electrodes 11b, and the achromatic color subpixel electrodes 11n are arranged in 2×2 rectangular lattice shapes, constitute a pixel P (refer to the thick broken lines illustrated in FIG. 2). A pixel P is a display unit of a full color display on the reflective display panel 1A. The X direction width of the pixel P is $2 \cdot W_X$, and the Y direction width is $2 \cdot W_Y$.

The subpixels in each pixel P will be hereinafter referred to as a subpixel Q1, Q2, Q3, and Q4 (see the fine broken lines illustrated in FIG. 2). The relative positional relationship of each subpixel in each pixel P is the same. However, in FIG. 2, for simplicity of explanation, only the subpixels of the pixel P1 are denoted by reference signs.

The subpixel Q2 in each pixel P is adjacent to the subpixel Q1 in the direction opposite to the X direction. The subpixel Q3 in each pixel P is adjacent to the subpixel Q2 in the Y direction. The subpixel Q4 in each pixel P is adjacent to the subpixel Q3 (Q1) in the X (Y) direction.

The types of the subpixel electrodes facing the subpixels Q1, Q2, Q3, and Q4 differ depending on the pixel P.

For example, in the pixel P1 in FIG. 2, the subpixels Q1, Q2, Q3, and Q4 face the third color subpixel electrode 11b, the achromatic color subpixel electrode 11n, the first color subpixel electrode 11r, and the second color subpixel electrode 11g, respectively.

In the pixel P2 adjacent to the pixel P1 in the direction opposite to the X direction, the subpixels Q1, Q2, Q3, and Q4 face the achromatic color subpixel electrode 11n, the third color subpixel electrode 11b, the second color subpixel electrode 11g, and the first color subpixel electrode 11r, respectively. The arrangement pattern of the sub-pixel electrodes in the pixel P2 is a pattern obtained by mirror inverting the arrangement pattern in the pixel P1 in the X direction.

In FIG. 2, the reference signs of the subpixel electrodes in the other pixels P are omitted; however, the correspondence between the subpixels and the subpixel electrodes is as follows.

In the pixel P3 adjacent to the pixel P2 in the Y direction, the subpixels Q1, Q2, Q3, and Q4 face the first color subpixel electrode 11r, the second color subpixel electrode 11g, the third color subpixel electrode 11b, and the achromatic color subpixel electrode 11n, respectively. The arrangement pattern of the subpixel electrodes in the pixel P3 is a pattern obtained by mirror inverting the arrangement pattern in the pixel P2 in the Y direction.

In the pixel P4 adjacent to the pixel P3 (P1) in the X direction (Y direction), the subpixels Q1, Q2, Q3, and Q4 face the second color subpixel electrode 11g, the first color subpixel electrode 11r, the achromatic color subpixel electrode 11n, and the third color subpixel electrode 11b, respectively.

The arrangement pattern of the subpixel electrodes in the pixel P4 is a pattern obtained by mirror inverting the arrangement pattern in the pixel P3 (P1) in the X (Y) direction.

As described above, the pixels P1, P2, P3, P4 are arranged in a 2×2 rectangular lattice shape. In the reflective display layer 13, the pixels P1, P2, P3, and P4 constitute a repeating unit U in the X direction and the Y direction. The outline of the repeating unit U in the plan view is a rectangle in which the lengths of the sides extending in the X direction are $4 \cdot W_X$ and the lengths of the sides extending in the Y direction are $4 \cdot W_Y$. The repeating unit U is arranged in a rectangular lattice shape with a pitch of $4 \cdot W_X$ in the X direction and a pitch of $4 \cdot W_Y$ in the Y direction.

However, in the present embodiment, since the effective display area of the reflective display panel 1A is rectangular, there are places where only a part of the repeating unit U, half (two pixels) or one quarter (one pixel), is arranged as the outermost pixels of the effective display area.

As schematically illustrated in FIG. 2, the outer shape in plan view of the first colored layer 17r, the second colored layer 17g, and the third colored layer 17b in the color filter layer 17 is rectangular and slightly smaller than the outer shape of the pixel P. The sides of the outer shape of the colored layers extend in the X direction or the Y direction.

The X direction widths (Y direction widths) of the colored layers may differ depending on the colored layer. However, FIG. 2 illustrates an example in which the widths in the X direction (the widths in the Y direction) of the colored layers are equal to each other.

The outer shapes in plan view of the colored layers are not limited to being an exact rectangle as illustrated in FIG. 2. For example, the corners of the colored layers may be rounded.

The first colored layer 17r is arranged at a position overlapping with the subpixel Q3 of the pixel P1, the subpixel Q4 of the pixel P2, the subpixel Q1 of the pixel P3, and the subpixel Q2 of the pixel P4 in plan view. Therefore, the first colored layer 17r is a traversing colored layer overlapping with the four subpixels Q3, Q4, Q1, Q2.

The first colored layer 17r traverses the side $S_{12}$ of a boundary between the pixel P1 and P2, the side $S_{23}$ of a boundary between the pixel P2 and P3, the side $S_{34}$ of a boundary between the pixel P3 and P4, and the side $S_{41}$ of a boundary between the pixel P4 and P1.

In this way, the first colored layer 17r extends over the four pixels P1, P2, P3, and P4.

For example, the first colored layer 17r overlaps the subpixel Q3 as the first subpixel when the pixel P1 is taken to be the first pixel. The first colored layer 17r overlaps the subpixel Q4 (Q2) as the second subpixel in the pixel P2 (P4), which is the second pixel adjacent to the pixel P1. For this reason, the first colored layer 17r is a pixel boundary traversing colored layer. For example, the same is true even in the case of selecting pixel P2, P3, or P4 as the first pixel.

The pixel boundary traversing colored layer always overlaps two or more sub pixels, and therefore constitutes a traversing colored layer.

In the present embodiment, the first colored layer 17r equally overlaps the facing subpixels Q3, Q4, Q1, Q2. Therefore, the centroid of the first colored layer 17r is located at the center of the repeating unit U (the intersection of the sides $S_{12}$, $S_{23}$, $S_{34}$, and $S_{41}$).

As with the repeating unit U, the first colored layer 17r is arranged in a rectangular lattice shape with a pitch of $4 \cdot W_X$ in the X direction and a pitch of $4 \cdot W_Y$ in the Y direction.

As same as the first colored layer 17r, the second colored layer 17g is arranged in a rectangular lattice shape with a pitch of $4 \cdot W_X$ in the X direction and a pitch of $4 \cdot W_Y$ in the Y direction. However, the second colored layer 17g is arranged at a position offset by $\pm 2 \cdot W_X$ in the X direction parallel to the first colored layer 17r. As a result, the centroid of the second colored layer 17g is arranged at the midpoint $M_1$, $M_2$ of each side extending in the Y direction of the repeating unit U.

The second colored layer 17g is a pixel boundary traversing colored layer that traverses the pixels P1 and P4 (P3 and P2) of the repeating unit U arranged around the mid point $M_2$ ($M_1$), and the pixels P3 and P2 (P1 and P4) of the repeating unit U on the right side (left side) of the repeating unit U.

As same as the first colored layer 17r, the third colored layer 17b is arranged in a rectangular lattice shape with a pitch of $4 \cdot W_X$ in the X direction and a pitch of $4 \cdot W_Y$ in the Y direction. However, the third colored layer 17b is arranged in a position offset parallel to the first colored layer 17r by $\pm 2 \cdot W_X$ in the X direction and by $\pm 2 \cdot W_Y$ in the Y direction in parallel. As a result, the centroid of the third colored layer 17b is arranged at the apexes of the outer shape of the repeating unit U.

The third colored layer 17b is a pixel boundary traversing colored layer that traverses the pixels P1, P2, P3, P4 arranged around the four apexes of the outer shape of the repeating unit U.

With this kind of an arrangement, band-shaped regions in which the first colored layer 17r and the second colored layer 17g are alternately arranged in the X direction (the first arrangement direction) are arranged in parallel at a pitch of $4 \cdot W_Y$ in the Y direction. A gap is formed between the first colored layer 17r and the second colored layer 17g adjacent to each other in the X direction with the boundaries of the subpixels interposed therebetween.

Furthermore, band-shaped regions in which the second colored layer 17g and the third colored layer 17b are alternately arranged in the Y direction (the second arrangement direction) are arranged in parallel at a pitch of $4 \cdot W_X$ in the X direction. A gap is formed between the second colored layer 17g and the third colored layer 17b adjacent to each other in the Y direction with the boundaries of the subpixels interposed therebetween.

The first colored layers 17r are alternately arranged with the non-colored regions 17n in which a colored layer is not formed in the Y direction. The third colored layers 17b are alternately arranged with the non-colored regions 17n in the X direction.

Therefore, in the repeating unit U, the subpixel Q2 of the pixel P1, the subpixel Q1 of the pixel P2, the subpixel Q4 of the pixel P3, and the subpixel Q3 of the pixel P4 each constitutes a non-colored subpixel that does not face any colored layer.

In the repeating unit U, the subpixels are overlapped by a quarter of a first colored layer 17r, a second colored layer 17g, a third colored layer 17b, and a non-colored region 17n. The arrangement of the colored layers in each pixel P will be described with an arrangement example of the pixel P3.

Figure 4A:
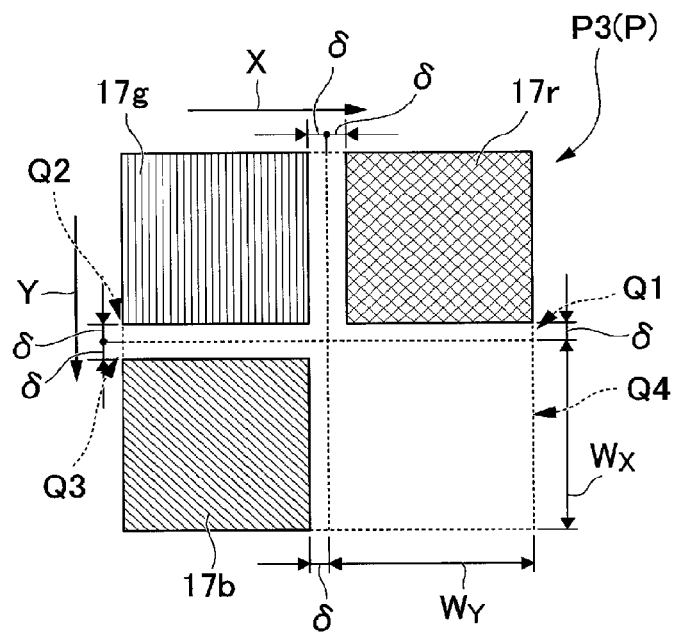
FIG. 4A is a schematic plan view illustrating a positional relationship between pixels and colored layers in a reflective display apparatus according to the first embodiment of the present invention.

FIG. 4A is a schematic plan view illustrating a positional relationship between a pixel and a colored layer in the reflective display apparatus according to the first embodiment of the present invention.

As illustrated in FIG. 4A, the subpixels Q1, Q2, Q3, and Q4 of the pixel P3 are $W_X \times W_Y$ rectangles. In the pixel P3, the first colored layer 17r, the second colored layer 17g, and the third colored layer 17b are separated from each other. In the pixel P3, the first colored layer 17r, the second colored layer 17g, and the third colored layer 17b overlap with the subpixels Q1, Q2, Q3 respectively without exceeding the regions of the subpixels Q1, Q2, Q3.

Since the first colored layer 17r in the pixel P3 traverses the outer shape of the pixel P3, the first colored layer 17r is arranged without a gap with respect to the outer shape of the pixel P3. However, the first colored layer 17r in the pixel P3 is arranged with a gap δ (where δ>0) with respect to the boundaries with the subpixels Q2 and Q4.

Similarly, the second colored layer 17g in the pixel P3 is arranged without a gap with respect to the outer shape of the pixel P3. However, the second colored layer 17g in the pixel P3 is arranged with a gap δ (where δ>0) with respect to the boundaries with the subpixels Q1 and Q3.

Similarly, the third colored layer 17b in the pixel P3 is arranged with no gap with respect to the outer shape of the pixel P3. However, the third colored layer 17b in the pixel P3 is arranged with a gap δ (where δ>0) with respect to the boundaries with the subpixels Q2 and Q4.

Therefore, in the pixel P3, the first colored layer 17r and the second colored layer 17g are separated by 2·δ in the X direction. Similarly, the second colored layer 17g and the third colored layer 17b are separated by 2·δ in the Y direction.

The area of each colored layer is $(W_X-\delta)\cdot(W_Y-\delta)$. In the pixel P3, the total area of the non-colored region including the area of the non-colored subpixels and the gaps δ is $4 \cdot W_X \cdot W_Y - 3 \cdot (W_X-\delta) \cdot (W_Y-\delta)$.

Here, the gap of 2·δ between the colored layers is set to a size that can reliably prevent contact between adjacent colored layers even in the case where manufacturing error occurs.

The first colored layer 17r and the third colored layer 17b are arranged apart from each other in the diagonal direction of the pixel P3.

Similar to the example of the pixel P3 described above, as illustrated in FIG. 2, in the repeating unit U, with respect to the subpixels Q3 of P1 and Q2 of P4 where the first colored layer 17r overlaps, the second colored layer 17g overlaps the subpixel Q4 of the pixel P1 and the subpixel Q1 of the pixel P4 that are adjacent in the X direction. In the repeating unit U, with respect to the subpixels Q4 of P2 and Q1 of P3 where the first colored layer 17r overlaps, the second colored layer 17g overlaps the subpixel Q3 of the pixel P2 and the subpixel Q2 of the pixel P3 that are adjacent in the direction opposite to the X direction.

Taking the area of the colored layer in the portion facing the subpixels with respect to the area of the subpixels to be a colored portion area ratio α, the colored portion area ratio α in the present embodiment is expressed by the following Equation (1).

Equation 1

$$\alpha = \frac{(W_X - \delta) \cdot (W_Y - \delta)}{W_X \cdot W_Y} \quad (1)$$

The colored portion area ratio α may be 25% or greater but less than 100%.

When the colored portion area ratio α is less than 25%, the amount of light passing through the first colored layer 17r, the second colored layer 17g, and the third colored layer 17b decreases, whereby the vividness (chroma) of displayed color may become too low.

The higher the colored portion area ratio α is, the better; however, when the colored portion area ratio α approaches 100%, color mixing tends to occur in adjacent colored layers depending on the manufacturing method of the color filter layer 17. Therefore, it is preferable that the colored portion area ratio α be set to a colored portion area ratio in which color mixing does not occur in the manufacturing process. For example, in the case where the color filter layer 17 is formed by an inkjet printing method, the area ratio may be set to 99% or less.

A method of manufacturing the color filter layer 17 will be described.

The color filter layer 17 may be formed by a method of patterning a colored resist film by photolithography, for example, as is performed for a color filter for a transmissive liquid crystal display apparatus. In this case, it is also possible to directly form the color filter layer 17 on the substrate 15 without providing the ink fixing layer 16.

The color filter layer 17 may be formed, for example, by applying ink corresponding to the colors of the colored layers to the surface 16a, which is the arrangement surface of the colored layers, and solidifying the ink.

In this case, by separately applying the ink to the forming regions of the first colored layer 17r, the second colored layer 17g, and the third colored layer 17b, the color filter layer 17 is formed without forming a black matrix. In this color filter layer 17, loss of light quantity due to a black matrix is eliminated, so the amount of light transmitted through the color filter layer 17 is further improved.

In the case of forming the color filter layer 17 by ink application, an appropriate ink application method capable of separately applying ink may be used as the ink application method.

Examples of an ink application method suitable for forming the color filter layer 17 include a screen printing method, an offset printing method, an inkjet printing method, and the like. In particular, an inkjet printing method is more preferable, because the alignment of the arrangement position of the color filter layer 17 with respect to the first electrode layer 11 becomes easier and the productivity is also high.

As an example of a method of solidifying the ink after being applied onto the ink fixing layer 16, there is a method of drying by heating, blowing, pressure reduction or the like. For example, in the case where the ink is an energy ray-curable ink such as UV ink or the like, a method of irradiating with energy rays such as UV light may be used.

In particular, in the case where UV ink is used, it is possible to form the color filter layer 17 even when UV ink is directly applied to the surface of the substrate 15 without providing the ink fixing layer 16.

A manufacturing method and an ink in the case where the color filter layer 17 is formed by an inkjet printing method will be hereinafter described in detail.

As an inkjet apparatus used in the inkjet printing method, a piezo conversion type and a thermal conversion type are known according to differences in ink ejection methods; however, it is more preferable to use a piezo conversion type inkjet apparatus.

The particle forming frequency of the ink of the inkjet apparatus may be no less than 5 kHz and no more than 100 kHz.

The nozzle diameter of the inkjet apparatus may be no less than 5 μm and no more than 80 μm.

It is more preferable that the inkjet apparatus include a plurality of inkjet heads, and that about 60 to 500 nozzles be incorporated in one inkjet head.

As the ink for forming the color filter layer 17 (hereinafter, simply referred to as ink), for example, a composition in which a colorant, a solvent, a binder resin, and a dispersant are mixed may be used.

As the colorant contained in the ink, coloring matters in general can be used irrespective of whether they are organic pigments, inorganic pigments, dyes and the like. As the colorant, an organic pigment is more preferable, and it is further preferable to use a colorant having excellent light stability.

Specific examples of the colorant may include, for example, C.I. Pigment Red 9, 19, 38, 43, 97, 122, 123, 144, 149, 166, 168, 177, 179, 180, 192, 208, 215, 216, 217, 220, 223, 224, 226, 227, 228, 240, 254; C.I. Pigment Blue 15, 15:3, 15:6, 16, 22, 29, 60, 64; C.I. Pigment Green 7, 36, 56, 58, 59; C.I. Pigment Yellow 20, 24, 86, 81, 83, 93, 108, 109, 110, 117, 125, 137, 138, 139, 147, 148, 150, 153, 154, 166, 168, 185; C.I. Pigment Orange 36, 73; C.I. Pigment Violet 23 and the like.

For the colorant, two or more kinds of materials may be mixed so as to obtain the required hue.

As the solvent contained in the ink, in consideration of suitability in inkjet printing, a solvent having a surface tension of 35 mN/m or less and a boiling point of 130° C. or more may be used.

When the surface tension of the ink is larger than 35 mN/m, the stability of the dot shape at the time of ejecting ink may deteriorate.

When the boiling point of the ink is less than 130° C., drying at a position close to the nozzle may become excessive. Therefore, nozzle clogging or the like may occur.

Specific examples of the solvent may include, for example, 2-methoxyethanol, 2-ethoxyethanol, 2-butoxyethanol, 2-ethoxyethyl acetate, 2-butoxyethyl acetate, 2-methoxyethyl acetate, 2-ethoxyethyl ether, 2-(2-ethoxyethoxy) ethanol, 2-(2-butoxyethoxy) ethanol, 2-(2-ethoxyethoxy) ethyl acetate, 2-(2-butoxyethoxy) ethyl acetate, 2-phenoxyethanol, diethylene glycol dimethyl ether, and the like.

Two or more kinds of solvents may be mixed and used as necessary for the solvent.

Examples of the binder resin contained in the ink include an acrylic resin, a novolac resin, a melamine resin, an epoxy resin, and the like. As the binder resin, one type of resin may be used alone, or two or more types may be mixed and used.

Examples of the acrylic resin may include, for example, a polymer derived from monomers of (meth)acrylic acid, alkyl (meth)acrylates such as methyl (meth)acrylate, ethyl (meth)acrylate, propyl (meth)acrylate, butyl (meth)acrylate, benzyl (meth)acrylate, lauryl (meth)acrylate, hydroxyethyl (meth)acrylate, hydroxypropyl (meth)acrylate, ethoxyethyl (meth)acrylate, glycidyl (meth)acrylate, and the like; or from monomers of alicyclic (meth)acrylate such as cyclohexyl (meth)acrylate, isobornyl (meth)acrylate, dicyclopentenyl (meth)acrylate and the like.

As the monomer, one kind of the above-mentioned plurality of monomers may be used alone, or two or more kinds may be used in combination. Furthermore, a resin copolymerized with acrylate-copolymerizable compounds such as styrene, cyclohexyl maleimide, phenyl maleimide, cyclohexyl maleimide, phenyl maleimide, methyl maleimide, ethyl maleimide, n-butyl maleimide, lauryl maleimide and the like may be used.

An ethylenically unsaturated group may be added to the acrylic resin.

Examples of a method for adding an ethylenically unsaturated group to an acrylic resin may include a method of adding a compound having an ethylenically unsaturated group and a carboxylic acid such as acrylic acid to an epoxy-containing resin such as glycidyl methacrylate; a method of adding an epoxy-containing acrylate such as glycidyl methacrylate to a carboxylic-acid-containing resin such as methacrylic acid; a method of adding an isocyanate-group-containing acrylate such as methacryloyloxyethyl isocyanate to a hydroxyl-group-containing resin such as hydroxy methacrylate, and the like.

Examples of the novolac resin may include, for example, a phenol novolac type epoxy resin, a cresol novolac type epoxy resin, and the like.

Examples of melamine resins may include, for example, alkylated melamine resins (methylated melamine resin, butylated melamine resin, and the like), and mixed etherified melamine resins and the like. The melamine resin may be a high-condensation type resin or a low-condensation type resin.

One type of melamine resin may be used alone, or a mixture of two or more types may be used. The melamine resin may, when necessary, be further mixed with an epoxy resin.

Examples of the epoxy resin may include, for example, glycerol polyglycidyl ether, trimethylolpropane polyglycidyl ether, resorcin diglycidyl ether, neopentyl glycol diglycidyl ether, 1,6-hexanediol diglycidyl ether, ethylene glycol (polyethylene glycol) diglycidyl ether, and the like.

One type of epoxy resin may be used alone or a mixture of two or more types may be used.

The mass-average molar mass of the binder resin contained in the ink may be in the range of no less than 200 and no more than 10000. The mass-average molar mass of the binder resin is more preferably in the range of no less than 300 and no more than 8000.

When the mass-average molar mass of the binder resin exceeds 10000, the fluidity of the ink may be insufficient during the drying process of the color filter layer 17, and the pattern flatness may deteriorate.

When the mass-average molar mass of the binder resin is less than 300, physical properties such as solvent resistance and heat stability may deteriorate.

The dispersant contained in the ink improves the dispersibility of the pigment in the solvent.

As the dispersant, for example, an ionic surfactant, a nonionic surfactant and the like may be used.

Specific examples of the dispersant may include, for example, sodium alkylbenzene sulfonate, poly fatty acid salt, fatty acid salt alkyl phosphate, tetraalkylammonium salt, polyoxyethylene alkyl ether and the like. As the dispersant, organic pigment derivatives, polyester and the like may be used.

One type of dispersant may be used alone, or a mixture of two or more types may be used.

The viscosity of the ink may be no less than 1 mPa·s and no more than 20 mPa·s. More preferably, the viscosity of the ink is no less than 5 mPa·s and no more than 15 mPa·s.

When the viscosity of the ink exceeds 20 mPa·s, ejected ink may not land at a predetermined position or nozzle may clog.

When the viscosity of the ink is less than 1 mPa·s, the ejected ink may be scattered easily.

The mass ratio of the colorant to the binder resin in the ink may be in the range of 1:9 to 1:1. The fluidity of the ink is adjusted by changing the amount of the binder resin in the ink. Varying the amount of the binder resin in the ink improves variation in concentration of the colorant in the ink.

Reflective display panels are typically used as display media using external light. Therefore, the color density of the color filter of a reflective display panel is preferably lower than that of the color filter of a transmissive display panel typified by a liquid crystal display so that a bright display screen can be obtained by making a large amount of external light incident. As a result, the color reproduction range of the reflective display panel tends to be narrower than that of the transmissive display panel.

When the binder resin exceeds 9 parts by mass with respect to 1 part by mass of the colorant of the ink, the coating amount for obtaining the required color density may become too large. Furthermore, as the amount of the binder resin increases, the viscosity of the ink increases, and the fluidity of the ink deteriorates. Therefore, the colorant is likely to gather at the center of the dots formed by the ink droplets, the color density of peripheral area of the dots tends to decrease, and color unevenness of the color filter layer 17 occurs.

When the amount of the binder resin is less than 1 part by mass with respect to 1 part by mass of the colorant of the ink, the amount of colorant contained in the ink becomes relatively large and the color density becomes large. Therefore, it is necessary to dilute by increasing the amount of solvent (volatile matter) of the ink, or to form the color filter layer 17 with a small amount of ink ejection.

For example, when the solvent is increased, the fluidity of the ink increases and the ink ejection amount also increases. As a result, the colorant tends to gather more to the peripheral area of the dots than the central portion of the dots formed by the ink droplets, the color density at the center portion of the dots tends to decrease, and color unevenness of the color filter layer 17 occurs.

In the case of reducing the ink ejecting amount, the dot diameter formed by the ink droplets becomes small, and gaps are likely to occur between the dots, so it is difficult to form a satisfactory color filter layer 17.

As illustrated in FIG. 1, the protective layer 18 is a light-transmissive layered portion laminated so as to cover the ink fixing layer 16 and the color filter layer 17. The protective layer 18 protects the color filter layer 17 by covering the color filter layer 17. The protective layer 18 prevents the color filter layer 17 from being damaged by mechanical contact, adhesion of contamination, and moisture absorption.

The material of the protective layer 18 may include, for example, organic resins such as polyamide, polyimide, polyurethane, polycarbonate, acrylic type, silicone type or the like, or inorganic substances such as $Si_3N_4$, $SiO_2$, $SiO$, $Al_2O_3$, $Ta_2O_3$ or the like.

After forming the color filter layer 17, the protective layer 18 can be formed, for example, by a coating method such as spin coating, roll coating, printing, or an evaporation method, or the like.

The function of the reflective display panel 1A according to the present embodiment will now be described with focus on the function of the color filter layer 17.

Figure 4B:
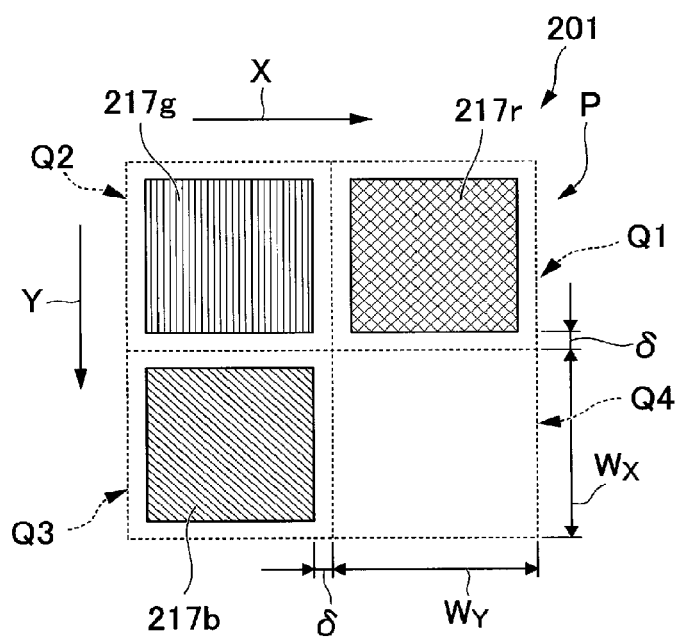
FIG. 4B is a schematic plan view illustrating a positional relationship between pixels and colored layers in a reflective display apparatus of a comparative example.

FIG. 4B is a schematic plan view illustrating the positional relationship between the pixels and the colored layer in the reflective display apparatus of the comparative example.

In the reflective display panel 1A, when a voltage is applied between the first electrode layer 11 and the second electrode layer 14 in the pixels P, according to voltages applied to the respective first color subpixel electrodes 11r, the second color subpixel electrodes 11g, and the third color subpixel electrodes 11b, the reflective display layer 13 at parts facing these pixel electrodes is switched to white, gray, and black displays having appropriate reflectance.

For example, FIG. 3 illustrates an example in the case where in the pixels P1 and P2 adjacent in the X direction, black portions 13B are formed in the reflective display layer 13 facing the second color subpixel electrodes 11g, and white portions 13W are formed in parts of the reflective display layer 13 facing the first color subpixel electrodes 11r.

FIG. 3 is a schematic view, so the black portions 13B and the white portions 13W are drawn as if they are formed over the entire layer thickness; however, the black portions 13B and the white portions 13W may be formed only on the surface 13a of the reflective display layer 13, or may be formed only at positions close to the surface 13a.

When incident light L enters the reflective display panel 1A from outside, only the second color component of the incident light L incident on the second colored layer 17g passes through the second colored layer 17g, and further passes through the light-transmissive layer 19 and reaches the black portions 13B. This incident light L is absorbed by the black portions 13B.

On the other hand, in the case of incident light L incident on the first colored layer 17r, only the first color component passes through the first colored layer 17r, and further passes through the light-transmissive layer 19, and reaches the white portions 13W. The light-transmissive layer 19 has light transmittance that allows good transmission of white light, so only the light quantity attenuates according to the transmittance, and the wavelength component hardly changes. The incident light L that reaches the white portions 13W is reflected externally as reflected light Lr that includes only the first color component according to the reflectance of the white portions 13W.

In the subpixels, the incident light L incident on the regions not overlapping with a colored layer is similarly absorbed by the black portions 13B and is reflected outside as white reflected light Ln by the white portions 13W.

In this way, in a subpixel having a colored layer overlapped thereon, when a voltage is applied to a subpixel electrode, reflected light of a chromatic color such as reflected light Lr corresponding to the color of the colored layer and reflected light Ln of an achromatic color are reflected.

In the reflected light, as the amount of the reflected light of the chromatic color increases, a vivid color display with high chroma can be obtained. Therefore, as the colored portion area ratio α increases in the subpixels, the chroma of the display colors can be improved. Therefore, it is preferable to make the gap δ as small as possible in the colored layer. However, when the gap δ is too small, color mixture during manufacturing occurs, so the gap δ may not be less than the allowable limit.

In the present embodiment, the colored layer area ratio α is increased by forming the colored layers as the traversing colored layers. This point will be explained in comparison with a comparative example.

FIG. 4B illustrates, as a comparative example, the relationship between pixels, the subpixels and the colored layers in the reflective display panel 201 of the related art in which a full color display is performed with three primary colors and achromatic color.

The pixels P of the reflective display panel 201 include subpixels Q1, Q2, Q3, and Q4 similar to those of the pixels P of the present embodiment. In the pixels P, the first colored layer 217r, the second colored layer 217g, and the third colored layer 217b are arranged to overlap the subpixels Q1, Q2, Q3, respectively. The colored layers each have a $(W_X-2\cdot\delta)\times(W_Y-2\cdot\delta)$ rectangular shape, and gaps δ are formed with respect to the outlines of the subpixels on which the colored layers are arranged.

In the reflective display panel 201 of the comparative example, such pixels P are two-dimensionally arranged in the X-direction and the Y direction. As described above, since there is no traversing colored layer in the pixel P and the colored layers are each separated by δ with respect to each side of the outer shape of the subpixel, the colored portion area ratio β is expressed by the following Equation (2).

Equation 2

$$\beta = \frac{(W_X - 2 \cdot \delta) \cdot (W_Y - 2 \cdot \delta)}{W_X \cdot W_Y} \quad (2)$$

Comparing the above Equation (2) and the above Equation (1), it is found that β<α whenever the size of the subpixel and the gap δ are the same.

In the present embodiment, the colored layers in the pixels P each constitute a pixel boundary traversing colored layer. Therefore, no gaps are formed at the boundaries between the pixels (subpixels) where the colored layers straddle. Thus, the colored portion area ratio α in the subpixels in which the colored layers are arranged exceeds the colored portion area ratio β in the comparative example. Therefore, with the reflective display panel 1A, it is possible to prevent the decrease of chroma of the display color as compared with the comparative example. As a result, with the reflective display panel 1A, the chroma of the display area is improved, and color display with vivid colors can be performed.

First Modified Example

A reflective display apparatus according to a modified example (first modified example) of the first embodiment will now be described.

Figure 5A:
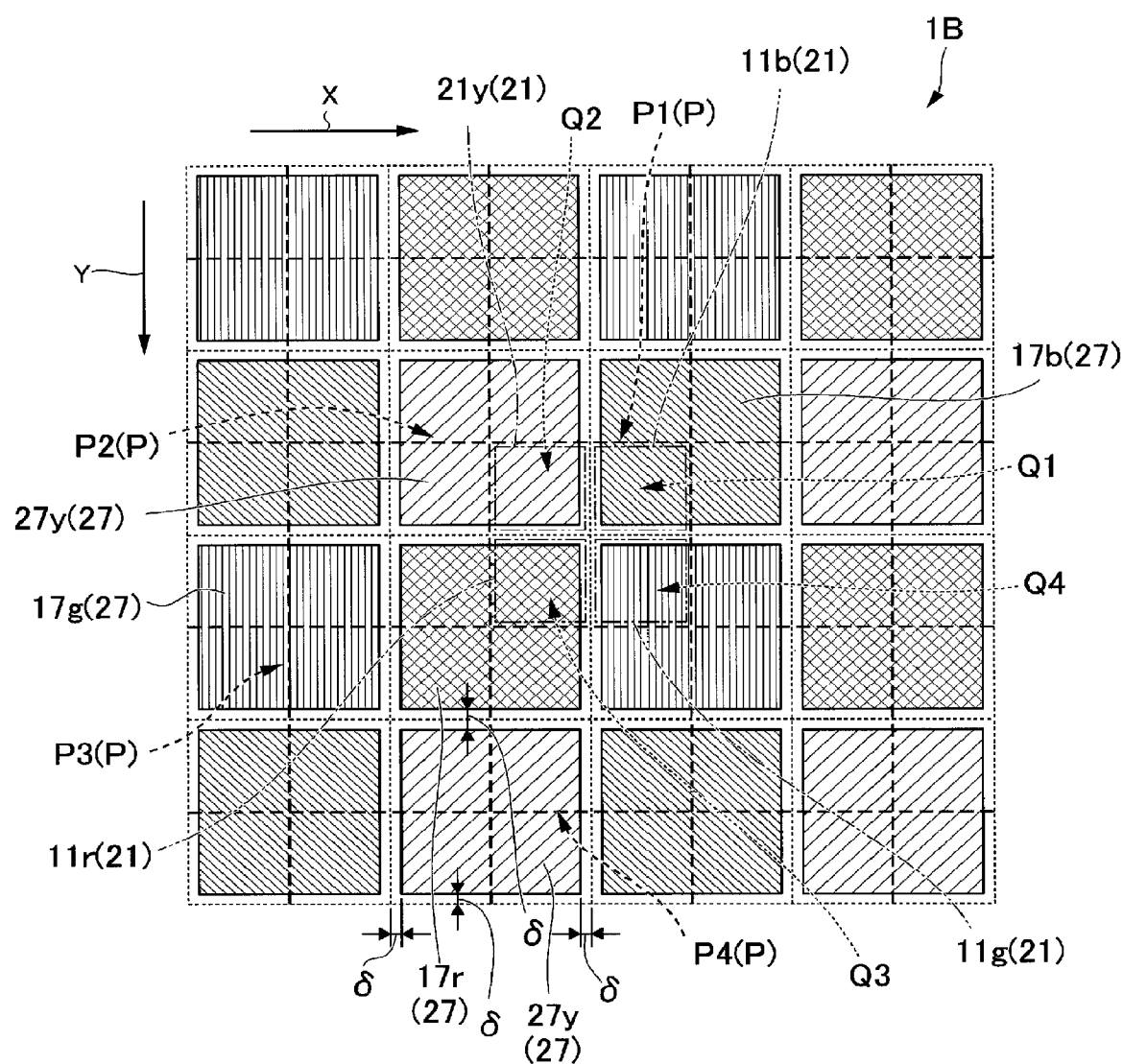
FIG. 5A is a schematic plan view illustrating a configuration of a main part of a modified example (first modified example) of the reflective display apparatus according to the first embodiment of the present invention.

FIG. 5A is a schematic plan view illustrating a configuration of a main part of a reflective display apparatus of a modified example (first modified example) of the first embodiment of the present invention.

As the main part is illustrated in FIG. 5A, the reflective display panel 1B (reflective display apparatus) of this modified example includes a first electrode layer 21 and a color filter layer 27 instead of the first electrode layer 11 and the color filter layer 17 of the reflective display panel 1A according to the first embodiment.

The following description will center on differences from the first embodiment.

Instead of the achromatic color subpixel electrode 11n of the first electrode layer 11 in the first embodiment, the first electrode layer 21 includes a fourth color subpixel electrode 21y that applies a voltage for displaying a fourth color that is a chromatic color. The fourth color subpixel electrode 21y has a configuration similar to that of the achromatic color subpixel electrode 11n except that the type of the image signal applied thereto is different.

The color filter layer 27 is configured by adding a fourth colored layer 27y (a colored layer, a traversing colored layer, a pixel boundary traversing colored layer) to the color filter layer 17 of the first embodiment.

The fourth colored layer 27y has a transmission wavelength band that transmits only the wavelength component of the fourth color. The fourth color is not limited as long as the wavelength band is different from that of the first color, the second color, and the third color, and full color display is possible by a combination of these. For example, the fourth color may be yellow.

As with the first colored layer 17r, the second colored layer 17g, and the third colored layer 17b, the fourth colored layer 27y in plan view has a rectangular shape with a width in the X direction of 2·($W_X$–δ) and a width in the Y direction of 2·($W_Y$–δ).

The fourth colored layer 27y is arranged so that the centroid of the fourth colored layer 27y coincides with the center of the non-colored region 17n in the first embodiment. Therefore, there is a gap δ between the fourth colored layer 27y and the sides of the outer shapes of the four subpixels overlapped by the fourth colored layer 27y.

The reflective display panel 1B of this modified example can perform full color display similarly to the first embodiment except that full color display is performed with the first color, the second color, the third color, and the fourth color.

With the reflective display panel 1B of this modified example, all four colored layers are pixel boundary traversing colored layers, so, as in the first embodiment, it is possible to prevent the decrease of chroma of the display color.

This modified example is an example of a case where the subpixels in the pixels do not include non-colored subpixels.

Second Modified Example

A reflective display apparatus of a modified example (second modified example) of the first embodiment will now be described.

Figure 5B:
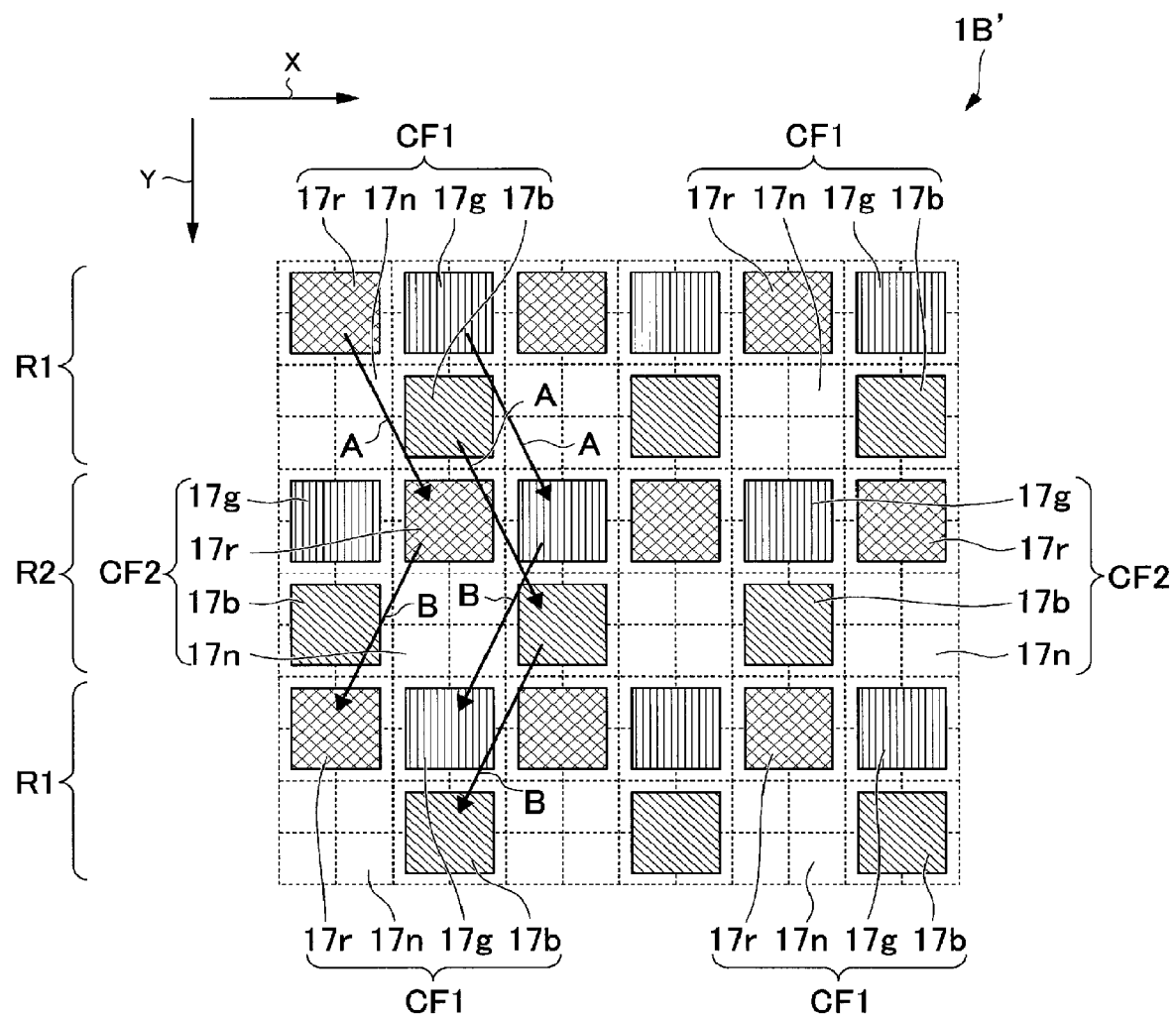
FIG. 5B is a schematic plan view illustrating a configuration of a main part of a modified example (second modified example) of the reflective display apparatus according to the first embodiment of the present invention.

FIG. 5B is a schematic plan view illustrating a configuration of a main part of the modified example (second modified example) of the reflective display apparatus according to the first embodiment of the present invention.

As the main part is illustrated in FIG. 5B, the reflective display panel 1B' (reflective display apparatus) of the present modified example has a first colored layer 17r, a second colored layer 17g, a third colored layer 17b, and a non-colored region 17n as with the reflective display panel 1A according to the first embodiment; the reflective display panel 1B' differs from the reflective display panel 1A according to the first embodiment in terms of the arrangement of the colored layers and the non-colored region.

The following description will center on differences from the first embodiment.

In the first embodiment, one color filter unit is constituted by the first colored layer 17r, the second colored layer 17g, the third colored layer 17b, and the non-colored region 17n, and a plurality of color filter units are provided between the ink fixing layer 16 and the protective layer 18. In particular, in the example shown in FIG. 2, one color filter unit includes a first colored layer 17r located in the upper right portion, a non-colored region 17n located in the lower right portion, a second colored layer 17g located in the upper left portion, and a third colored layer 17b located in the lower left portion. A plurality of color filter units configured in this way are regularly arranged in the X direction and the Y direction.

Unlike a configuration in which one type and a plurality of color filter units are arranged regularly in the X direction and the Y direction, the reflective display panel 1B' of this modified example has a plurality of first rows R1 in which a plurality of first color filter units CF1 are arranged in the X direction (first arrangement direction), and a plurality of second rows R2 in which a plurality of second color filter units CF2 are also arranged along the X direction. The plurality of first rows R1 and the plurality of second rows R2 are alternately arranged to be adjacent to each other along the Y direction (second arrangement direction). In other words, in the Y direction, a second row R2 is positioned between two first rows R1, and a first row R1 is positioned between two second rows R2.

Each of the plurality of first color filter units CF1 arranged in a first row R1 includes a second colored layer 17g located in the upper right portion, a third colored layer 17b located in the lower right portion, a first colored layer 17r located in the upper left portion, and a non-colored region 17n located in the lower left portion.

Each of the plurality of second color filter units CF2 arranged in a second row R2 includes a first colored layer 17r located in the upper right portion, a non-colored region 17n located in the lower right portion, a second colored layer 17g located in the upper left portion, and a third colored layer 17b located in the lower left portion.

From another viewpoint, as indicated by an arrow A in FIG. 5B, the first colored layer 17r, the second colored layer 17g, and the third colored layer 17b (the colored layers corresponding to the first color filter unit CF1) are arranged at positions offset by one column in the Y direction (moving from the first row R1 to the second row R2) and offset to the right by one pixel in the X direction.

In addition, as indicated by the arrow B, the first colored layer 17r, the second colored layer 17g, and the third colored layer 17b move by one row in the Y direction (move from the second row R2 to the third row R1), and are also arranged at positions offset to the left by one pixel in the X direction (first color filter unit CF1).

In other words, the colored regions are arranged in a zigzag pattern along the Y direction by offsetting every other column along the Y direction by one pixel in the X direction.

With this modified example, a more excellent image display can be obtained as compared with the first embodiment. More specifically, in the case of the first embodiment, for example, red is displayed by displaying pixels corresponding to the second colored layer 17g, the third colored layer 17b, and the non-colored region 17n in black, and displaying the pixels corresponding to the colored layer 17r in white. However, in the case of the arrangement of the colored layers illustrated in FIG. 2, the vertical lines (corresponding to two lines) on which the second colored layer 17g and the third colored layer 17b are formed are all displayed in black, so a black vertical line (color unevenness) appears in the displayed image, which causes deterioration in image quality.

In contrast, with the present modified example, the second colored layer 17g and the third colored layer 17b in a first row R1, and the first colored layer 17r and the non-colored region 17n in a second row R2 are staggered in the Y direction (in a zigzag pattern). Therefore, none of the vertical lines are displayed in black, and it is possible to solve the problem that may occur in the first embodiment.

Note that the colored portion area ratio and the NTSC ratio of the color index in this modified example have the same values as in the first embodiment.

Second Embodiment

A reflective display apparatus according to a second embodiment of the present invention will now be described.

Figure 6:
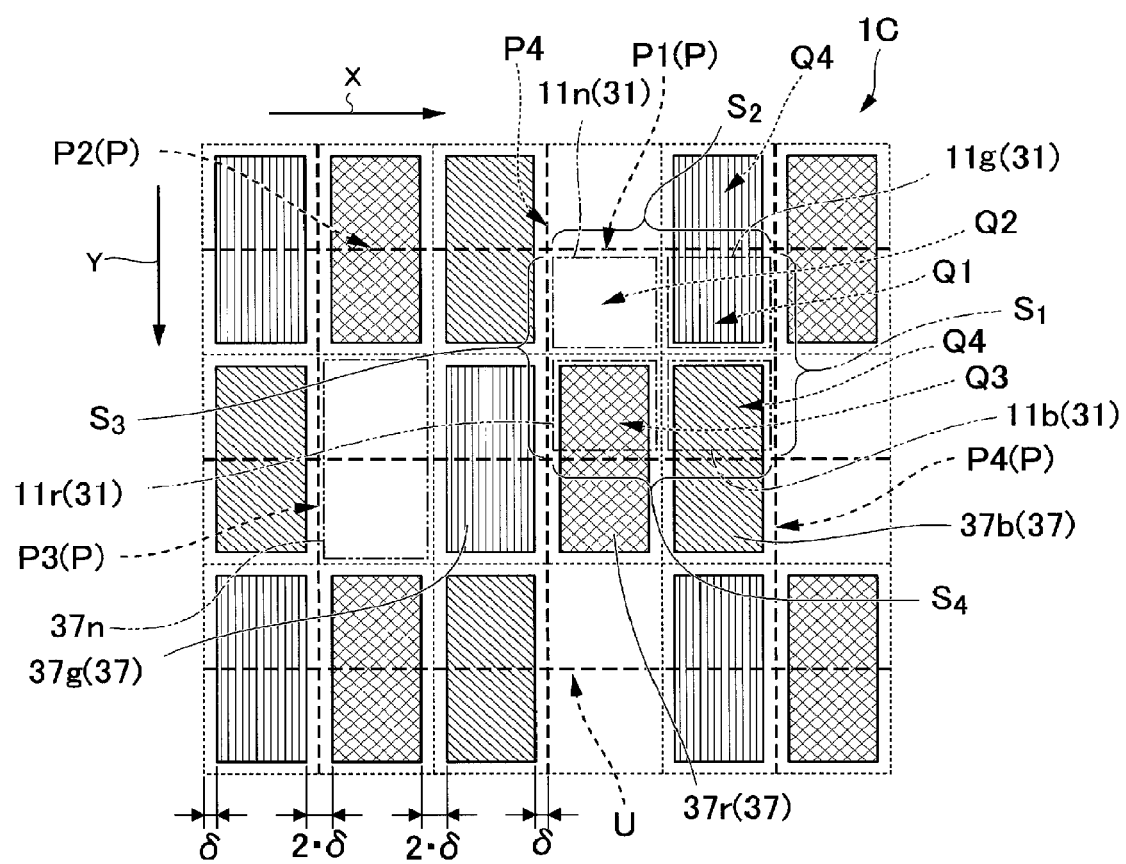
FIG. 6 is a schematic plan view illustrating a configuration of a main part of a reflective display apparatus according to a second embodiment of the present invention.

FIG. 6 is a schematic plan view illustrating a configuration of a main part of a reflective display apparatus according to a second embodiment of the present invention.

As illustrated in the main part in FIG. 6, the reflective display panel 1C (reflective display apparatus) according to the present embodiment includes a first electrode layer 31 and a color filter layer 37 instead of the first electrode layer 11 and the color filter layer 17 of the reflective display panel 1A according to the first embodiment.

The following description will center on differences from the first embodiment.

The first electrode layer 31 has a configuration similar to that of that of the first electrode layer 11 in the first embodiment except that the arrangement pattern of the subpixel electrodes differs depending on the arrangement pattern of the colored layers in the color filter layer 37 described later.

For example, in the pixel P1, the second color subpixel electrode 11g, the achromatic color subpixel electrode 11n, the first color subpixel electrode 11r, and the third color subpixel electrode 11b are arranged facing the subpixels Q1, Q2, Q3 and Q4, respectively.

The arrangement pattern of the subpixel electrodes in the pixel P4 is a pattern obtained by mirror inverting the arrangement pattern in the pixel P1 in the Y direction.

The arrangement pattern of the subpixel electrodes in the pixel P2 (P3) is the same arrangement pattern in the pixel P4 (P1).

Instead of the first colored layer 17r, the second colored layer 17g, and the third colored layer 17b of the color filter layer 17 of the first embodiment, the color filter layer 37 has a first colored layer 37r, a second colored layer 37g, and a third colored layer 37b (colored layer, traversing colored layer, pixel boundary traversing colored layer).

In the following description, when the first colored layer 37r, the second colored layer 37g, and the third colored layer 37b are referred to collectively, they may be expressed as "the colored layers in this embodiment" or simply "the colored layers" in order to simplify explanation.

The first colored layer 37r (the second colored layer 37g, the third colored layer 37b) has a configuration similar to that of the first colored layer 17r (second colored layer 17g, third colored layer 17b) in the first embodiment except that the shape in plan view is a rectangle that is longer in the Y direction, and the arrangement position is different.

The X direction width of the colored layers is $W_X - 2 \cdot \delta$, and the Y direction width is $2 \cdot (W_Y - \delta)$.

In the X direction, the color filter layer 37 is arranged such that the second colored layer 17g, the first colored layer 17r, and the third colored layer 17b are arranged at the pitch $W_X$ in this order, and furthermore, the colored layer group of the repeating unit composed of these three colored layers is arranged with a pitch of $4 \cdot W_X$. Therefore, a non-colored region 37n having an X-direction width of $W_X$ is formed between each colored layer group.

This kind of arrangement in the X direction is repeated with a pitch of $2 \cdot W_Y$ in the Y direction while being offset by $2 \cdot W_X$ in the X direction. Therefore, in the Y direction, a first row in which the second colored layer 37g and the third colored layer 37b alternately appear at a pitch of $2 \cdot W_Y$, and a second row in which the first colored layer 37r and the non-colored region 37n alternately appear at pitch of $2 \cdot W_Y$ are formed. The first row and the second row alternately appear in the X direction.

In the relationship between the colored layers and the subpixels, the colored layers are each arranged to overlap two subpixels which are adjacent in the Y direction with a gap δ between each colored layer and the boundary of each subpixel.

For example, the first colored layer 37r overlaps the subpixel Q3 of the pixel P1 and the subpixel Q2 of the pixel P4 within the repeating unit U.

For example, the third colored layer 37b overlaps the subpixel Q4 of the pixel P1 and the subpixel Q1 of the pixel P4 within the repeating unit U.

The first colored layer 37r and the third colored layer 37b are pixel boundary traversing colored layers that traverse the side $S_4$ that forms a boundary with the pixel P4 in the repeating unit U in the pixel P1.

For example, the second colored layer 37g overlaps the subpixel Q1 of the pixel P1 and the subpixel Q4 of the pixel P4 adjacent to the upper portion illustrated in FIG. 6 with respect to the repeating unit U.

The second colored layer 37g is a pixel boundary traversing colored layer that traverses a side $S_2$ that forms a boundary with the pixel P4 adjacent to the upper portion illustrated in FIG. 6 with respect to the repeating unit U in the pixel P1.

That is, the colored layers in the present embodiment each constitute a pixel boundary traversing colored layer that overlaps two pixels.

The subpixel on which the non-colored region 37n is formed is a non-colored subpixel.

By arranging the colored layers in this way, the first colored layer 37r, the second colored layer 37g, the third colored layer 37b, and the non-colored region 37n in the pixel P1 respectively overlap the subpixels Q3, Q1, Q4, and Q2 driven by the first color subpixel electrode 11r, the second color subpixel electrode 11g, the third color subpixel electrode 11b, and the achromatic color subpixel electrode 11n.

Similarly, the first colored layer 37r, the second colored layer 37g, the third colored layer 37b, and the non-colored region 37n in the pixels P2, P3, and P4 also overlap the subpixels that are driven by the first color subpixel electrode 11r, the second color subpixel electrode 11g, the third color subpixel electrode 11b, and the achromatic color subpixel electrode 11n respectively.

The reflective display panel 1C according to the present embodiment can perform full color display similarly to the first embodiment except that the colored layers each constitute a pixel boundary traversing colored layer that overlaps two pixels.

The colored portion area ratio γ in the subpixels in which the colored layers are arranged is expressed by the following Equation (3).

Equation 3

$$\gamma = \frac{(W_X - 2 \cdot \delta) \cdot (W_Y - \delta)}{W_X \cdot W_Y} \qquad (3)$$

When the size of the subpixel and the gap δ are the same, the relationship β<γ is satisfied. Therefore, with the reflective display panel 1C, it is possible to prevent a decrease of chroma of the display colors, as compared with the comparative example described above in the first embodiment.

Third Modified Example

A reflective display apparatus of a modified example (third modified example) of the second embodiment of the present invention will now be described.

Figure 7:
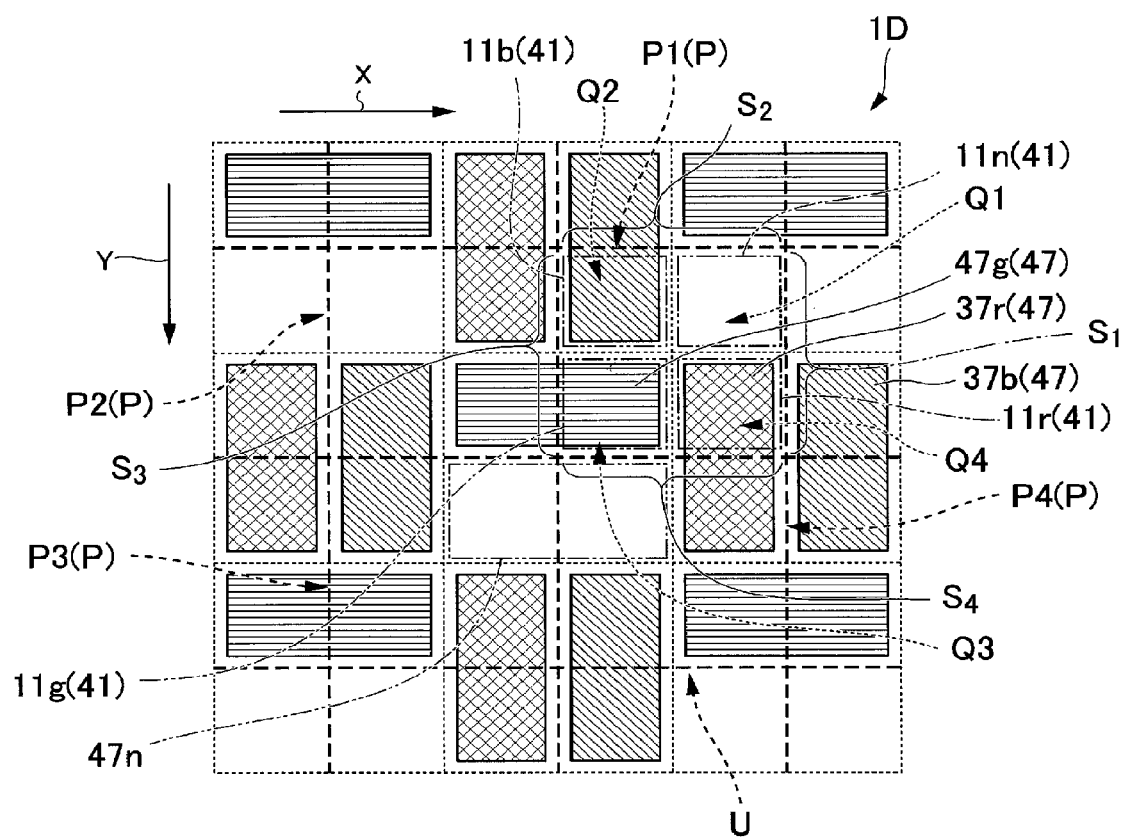
FIG. 7 is a schematic plan view illustrating a configuration of a main part of a modified example (third modified example) of the reflective display apparatus according to the second embodiment of the present invention.

FIG. 7 is a schematic plan view illustrating a configuration of a main part of a reflective display apparatus according to a modified example (third modified example) of the second embodiment of the present invention.

As illustrated in the main part in FIG. 7, the reflective display panel 1D (reflective display apparatus) of the present modified example includes a first electrode layer 41 and a color filter layer 47 instead of the first electrode layer 31 and color filter layer 37 of the reflective display panel 1C according to the second embodiment.

The following description will mainly center on the points that differ from the second embodiment.

The first electrode layer 41 has a configuration similar to that of the first electrode layer 31 in the second embodiment except that the arrangement pattern of the subpixel electrodes differs depending on the arrangement pattern of the colored layers in the color filter layer 47 to be described later.

For example, in the pixel P1, the achromatic color subpixel electrode 11n, the third color subpixel electrode 11b, the second color subpixel electrode 11g, and the first color subpixel electrode 11r are arranged to face the subpixels Q1, Q2, Q3 and Q4, respectively.

The arrangement pattern of the subpixel electrodes in the pixels P2 and P4 corresponds to a pattern obtained by rotating the arrangement pattern in the pixel P1 counterclockwise by 90° in FIG. 7. In other words, in the pixels P2 and P4, the achromatic color subpixel electrode 11n, the third color subpixel electrode 11b, the second color subpixel electrode 11g, and the first color sub pixel electrode 11r are arranged to face the subpixels Q2, Q3, Q4 and Q1, respectively.

The arrangement pattern of the subpixel electrodes in the pixel P3 is the same arrangement pattern in the pixel P1.

The color filter layer 47 includes a second colored layer 47g (a colored layer, a traversing colored layer, a pixel boundary traversing colored layer) instead of the second colored layer 37g of the color filter layer 37 of the second embodiment.

In the following description, when the first colored layer 37r, the second colored layer 47g, and the third colored layer 37b are referred to collectively, they may be expressed as "the colored layers in this embodiment" or simply "the colored layers" in order to simplify explanation.

The second colored layer 47g has a rectangular shape of which the shape in plan view is longer in the X direction. The X direction width of the second colored layer 47g is $2 \cdot (W_X - \delta)$ and the Y direction width is $W_Y - 2 \cdot \delta$.

The second colored layer 47g is arranged in a positional relationship such that the second colored layer 37g in the second embodiment is rotated by 90° so as to overlap with two subpixels adjacent to each other in the X direction and located in the upper portion illustrated in FIG. 7.

The second colored layer 47g has a configuration similar to that of the second colored layer 37g in the second embodiment except for the point of having this kind of plan view shape and arrangement position.

Two subpixels adjacent in the Y direction to the two subpixels overlapped by the second colored layer 47g (the lower portion illustrated in FIG. 7) form a non-colored region 47n in which a colored layer is not overlapped.

In the color filter layer 47, the second colored layer 47g, the first colored layer 37r, and the third colored layer 37b are arranged in this order in the X direction, and furthermore, the repeating unit of the colored layer including these three colored layers has a pitch of $4 \cdot W_X$.

This kind of arrangement in the X direction is repeated with a pitch of $2\cdot W_Y$ in the Y direction while being offset by $2\cdot W_X$ in the X direction.

In the Y direction, the arrangement in which, on the Y direction side of the first colored layer 37r and the third colored layer 37b, the second colored layer 47g, and the non-colored region 47n are arranged in this order, is repeated in each row extending in the Y direction.

In the relationship between the subpixels and the colored layers, similarly to the second embodiment, the first colored layer 37r and the third colored layer 37b are each arranged to overlap two subpixels which are adjacent in the Y direction with a gap δ from the outer boundary of two subpixels.

The second colored layer 47g is arranged to overlap two subpixels which are adjacent in the X direction with a gap δ from the outer boundary of two subpixels.

In this modified example, the first colored layer 37r overlaps the subpixel Q4 of the pixel P1 and the subpixel Q1 of the pixel P4 within the repeating unit U.

The first colored layer 37r in this modified example is a traversing colored layer that traverses a side $S_4$ that forms a boundary with the pixel P4 in the repeating unit U in the pixel P1.

For example, the second colored layer 47g overlaps the subpixel Q3 of the pixel P1 and the subpixel Q4 of the pixel P2 within the repeating unit U.

The second colored layer 47g is a traversing colored layer that traverses a side $S_3$ that forms a boundary with the pixel P2 in the repeating unit U in the pixel P1.

For example, the third colored layer 37b overlaps the subpixel Q2 of the pixel P1 and the subpixel Q3 of the pixel P4 adjacent to the upper portion illustrated in FIG. 7 with respect to the repeating unit U.

The third colored layer 37b in this modified example is a traversing colored layer that traverses a side $S_2$ that forms a boundary with the pixel P4 adjacent to the repeating unit U in the pixel P1.

In other words, the colored layers in the present modified example each constitute a pixel boundary traversing colored layer that overlaps two pixels.

The subpixel on which the non-colored region 47n is formed is a non-colored subpixel.

By arranging the colored layers in this way, the first colored layer 37r, the second colored layer 47g, the third colored layer 37b, and the non-colored region 47n in the pixel P1 respectively overlap the subpixels Q4, Q3, Q2 and Q1 that are driven by the first color subpixel electrode 11r, the second color subpixel electrode 11g, the third color subpixel electrode 11b, and the achromatic color subpixel electrode 11n.

Similarly, the first colored layer 37r, the second colored layer 47g, the third colored layer 37b, and the non-colored region 47n in the pixels P2, P3, and P4 also overlap the subpixels that are driven by the first color subpixel electrode 11r, the second color subpixel electrode 11g, the third color subpixel electrode 11b, and the achromatic color subpixel electrode 11n, respectively.

The reflective display panel 1D of the present modified example performs full color display similarly to the second embodiment except that the extending direction of the first colored layer 37r and the third colored layer 37b is different from that of the second colored layer 47g.

The colored portion area ratio η in the subpixel in which the second colored layer 47g is arranged is represented by the following Equation (4).

Equation 4

$$\eta = \frac{(W_X - \delta)\cdot(W_Y - 2\cdot\delta)}{W_X \cdot W_Y} \tag{4}$$

When the size of the subpixel and the gap δ are the same, the relationships β<γ and β<η are satisfied. Therefore, with the reflective display panel 1D, it is possible to prevent the decrease of chroma of the display colors, as compared with the comparative example described in the first embodiment.

Third Embodiment

A reflective display apparatus according to a third embodiment of the present invention will now be described.

Figure 8:
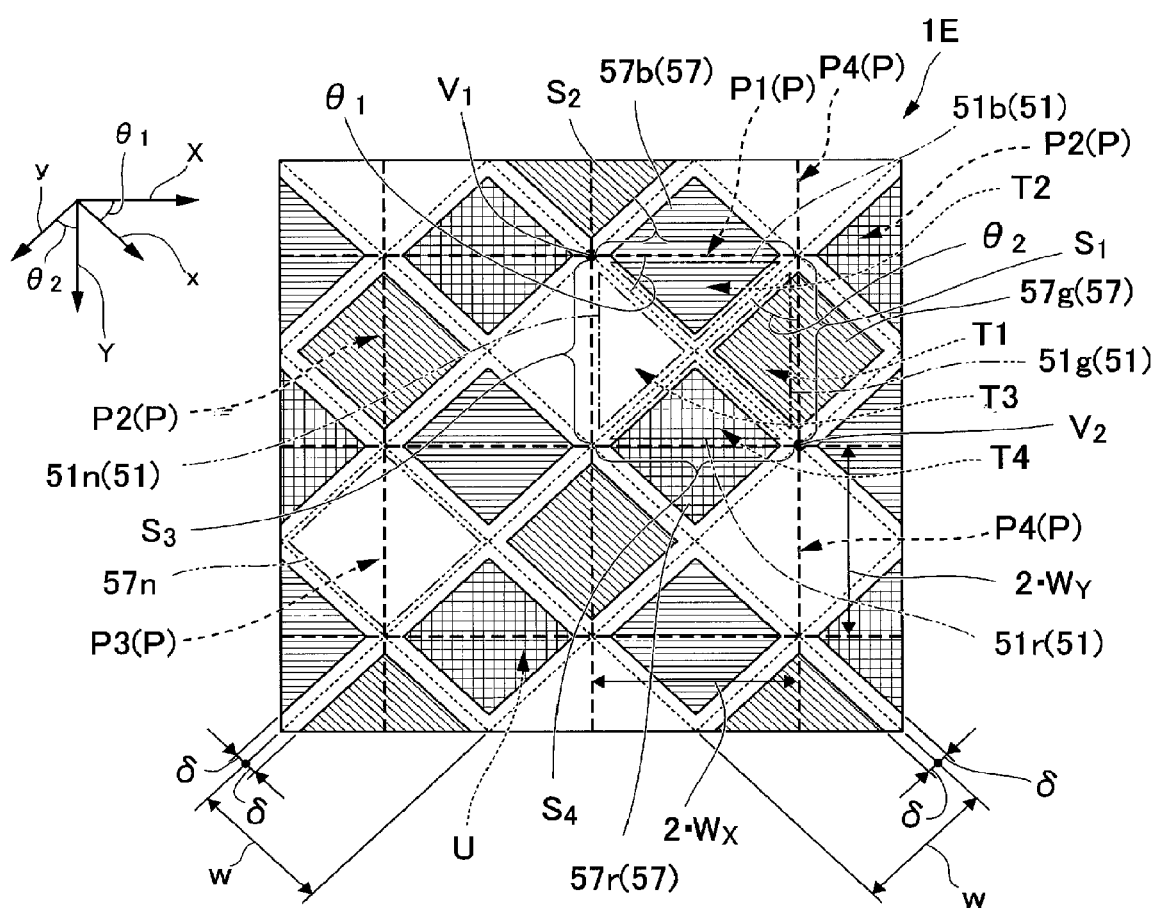
FIG. 8 is a schematic plan view illustrating a configuration of a main part of a reflective display apparatus according to a third embodiment of the present invention.

FIG. 8 is a schematic plan view illustrating a configuration of a main part of a reflective display apparatus according to the third embodiment of the present invention.

As illustrated in the main part of FIG. 8, the reflective display panel 1E (reflective display apparatus) according to the present embodiment includes a first electrode layer 51 and a color filter layer 57 instead of the first electrode layer 11 and the color filter layer 17 of the reflective display panel 1A according to the first embodiment.

The following description will center on differences from the first embodiment.

The first electrode layer 51 includes a first color subpixel electrode 51r, a second color subpixel electrode 51g, a third color subpixel electrode 51b, and an achromatic color subpixel electrode 51n instead of the first color subpixel electrode 11r, the second color subpixel electrode 11g, the third color subpixel electrode 11b, and the achromatic color subpixel electrode 11n of the first embodiment.

In the following description, when the first color subpixel electrode 51r, the second color subpixel electrode 51g, the third color subpixel electrode 51b, and the achromatic color subpixel electrode 51n are referred to collectively, they may be expressed as "the subpixel electrodes in the present embodiment" or simply "the subpixel electrodes" in order to simplify explanation.

The subpixel electrodes in the present embodiment are different in shape and arrangement position in plan view from the subpixel electrodes in the first embodiment.

The outer shapes in plan view of the subpixel electrodes in this embodiment are isosceles triangles.

The subpixel electrodes have substantially the same shape as isosceles triangles obtained when the pixel P is divided into four by diagonal lines. Therefore, the areas of the subpixel electrodes are equal. However, when the outer shape of the pixel P is not a square, the length of the base of the subpixel electrode and the height from the base differ.

The plan view shape of the subpixel electrodes may be a pseudo isosceles triangle in which a concave portion or a convex portion is formed in a part of an isosceles triangle depending on the arrangement position of the switching elements, for example.

Similarly to the subpixel electrodes of the first embodiment, the subpixel electrodes apply voltages to parts of the reflective display layer 13 that face the subpixel electrodes, whereby the reflectance of the parts of the reflective display layer 13 can be changed.

The subpixel electrodes divide the reflective display layer 13 into subpixels which are the drive units having a changeable reflectance.

The subpixels in this embodiment partition the surface 13a of the reflective display layer 13 into a two-dimensional pattern in accordance with the fact that the subpixel electrodes are isosceles triangles along a divisional shape by the diagonal lines of the pixels. This two-dimensional pattern is a repetitive pattern in which the pixels P are arranged in a rectangular lattice shape along the X direction and Y direction and are further divided into four by the diagonal X-shape lines of the pixels P.

In the following description, the subpixels in the pixels P will be referred to as subpixels T1, T2, T3, T4 (refer to the fine broken lines illustrated in FIG. 8). The relative positional relationship of each subpixel in each pixel P is the same. However, in FIG. 8, for simplicity of explanation, only the subpixels of the pixel P1 are denoted by reference signs.

The subpixels T3 and T1 of the pixel P have sides $S_3$ and $S_1$ extending in the Y direction of the pixel P as the base. The subpixels T3 and T1 are adjacent to each other in this order in the X direction.

The subpixels T2 and T4 of the pixel P have sides $S_2$ and $S_4$ extending in the X direction of the pixels P as the base. The subpixels T2 and T4 are adjacent to each other in this order in the Y direction.

The subpixels T1, T2, T3, T4 are arranged in this order counterclockwise with respect to the center of the pixel P in FIG. 8.

The type of the subpixel electrodes facing the subpixels T1, T2, T3, T4 differs depending on the pixel P.

For example, in the pixel P1 in FIG. 8, the subpixels T1, T2, T3, and T4 face the second color subpixel electrode 51g, the third color subpixel electrode 51b, the achromatic color subpixel electrode 51n, and the first color subpixel electrode 51r, respectively.

In FIG. 8, the reference signs of the respective subpixel electrodes in other pixels P are omitted, but the correspondence between the subpixels and the subpixel electrodes is as follows.

In the pixel P2, the sub-pixels T1, T2, T3, and T4 correspond to the achromatic color subpixel electrode 51n, the first color subpixel electrode 51r, the second color subpixel electrode 51g, and the third color subpixel electrode 51b, respectively. The arrangement pattern of the subpixel electrodes in the pixel P2 is a pattern obtained by mirror inverting the arrangement pattern in the pixel P1 both in the X direction and in the Y direction.

The arrangement pattern of the subpixels in the pixel P3 is the same pattern as in the pixel P1.

The arrangement pattern of the subpixels in the pixel P4 is the same pattern as in the pixel P2.

In the reflective display layer 13 of the present embodiment as well, pixels P1, P2, P3, and P4 form a repeating unit U in the X direction and the Y direction as in the first embodiment. The outer shapes of the repeating units U in plan view and the outer shapes of the pixels P are the same as those in the first embodiment.

The color filter layer 57 includes a first colored layer 57r, a second colored layer 57g, and a third colored layer 57b (colored layer, traversing, pixel boundary traversing colored layer) instead of the first colored layer 17r, the second colored layer 17g, and the third colored layer 17b of the color filter layer 17 of the first embodiment.

In the following description, when the first colored layer 57r, the second colored layer 57g, and the third colored layer 57b are referred to collectively, they may be expressed as "the colored layers in the present embodiment" or simply "the colored layers" in order to simplify explanation.

The first colored layer 57r (the second colored layer 57g, the third colored layer 57b) has a configuration similar to that of the first colored layer 17r (the second colored layer 57g, the third colored layer 57b) in the first embodiment except that the arrangement direction and the plan view shape are different.

The arrangement direction of the first colored layer 57r (the second colored layer 57g, the third colored layer 57b) is defined by two directions: the x direction (the first arrangement direction) obtained by rotating the X direction clockwise in FIG. 8 by $\theta_1$, and the y direction (second arrangement direction) obtained by rotating the Y direction clockwise in FIG. 8 by $\theta_2$. Here, $\theta_1$ is the angle formed by the diagonal line connecting the vertex $V_1$, where the sides $S_2$ and $S_3$ of the pixel P intersect, with the vertex V2, where the sides $S_1$ and $S_4$ intersect, and the side $S_2$. $\theta_2$ is a complementary angle of $\theta_1$ ($\theta_2 = 90° - \theta_1$).

Therefore, the x direction and the y direction are diagonal directions of the pixel P, respectively.

The colored layers have a rhombic shape in plan view.

The arrangement pattern in the x direction (y direction) of the first colored layer 57r (the second colored layer 57g, the third colored layer 57b) is the same arrangement pattern in the X direction (Y direction) of the first colored layer 17r (the second colored layer 17g, the third colored layer 17b) in the first embodiment.

However, the arrangement pitch is pitch 2·w in either direction. Here, w is a half of the length of the diagonal line of the pixel P, and is represented by the following Equation (5).

Equation 5

$$W = \tfrac{1}{2} \cdot \sqrt{W_X^2 + W_Y^2} \qquad (5)$$

Non-colored regions 57n in which no colored layers are formed are formed between first colored layers 57r adjacent to each other with two subpixels therebetween in the x direction, and between third colored layers 57b adjacent to each other with two subpixels therebetween in the y direction.

In the relationship between the colored layers and the subpixels, the colored layers are arranged to cross two subpixels in contact with each other on the base and overlap these subpixels. The colored layers are arranged at positions spaced by a gap δ from each isosceles side of these subpixels.

For example, the first colored layer 57r overlaps the subpixel T4 of the pixel P1 and the subpixel T2 of the pixel P4 within the repeating unit U.

For example, the second colored layer 57g overlaps the subpixel T1 of the pixel P1 and the subpixel T3 of the pixel P2 located on the right side portion of the repeating unit U illustrated in FIG. 8.

For example, the third colored layer 57b overlaps the subpixel T2 of the pixel P1 and the subpixel T4 of the pixel P4 located in the upper portion illustrated in FIG. 8 of the repeating unit U.

The first colored layer 57r, the second colored layer 57g, and the third colored layer 57b are traversing colored layers that traverse the sides $S_4$, $S_1$, and $S_2$ of the pixel P1, respectively.

In other words, the colored layers in this embodiment each constitute a traversing colored layer that overlaps two pixels.

The subpixel on which the non-colored region 57n is formed is a non-colored subpixel.

Due to this kind of arrangement of the colored layers, the first colored layer 57r, the second colored layer 57g, the third colored layer 57b, and the non-colored region 57n in the pixel P1 respectively overlap the subpixels T4, T1, T2, and T3 that are driven by the first color subpixel electrode 51r, the second color subpixel electrode 51g, the third color subpixel electrode 51b, and the achromatic color subpixel electrode 51n.

Similarly, the first colored layer 57r, the second colored layer 57g, the third colored layer 57b, and the non-colored region 57n in the pixels P2, P3, and P4 overlap the subpixels that are driven by the first color subpixel electrode 51r, the second color subpixel electrode 51g, the third color subpixel electrode 51b, and the achromatic color subpixel electrode 51n, respectively.

The reflective display panel 1E according to the present embodiment can perform full color display similarly to the first embodiment except that the colored layers each constitute a pixel boundary traversing colored layer that overlaps two pixels.

In the reflective display panel 1E according to the present embodiment, the colored layers are pixel boundary traversing colored layers that overlap two subpixels, so the colored portion area ratio is higher than in the case of not including traversing colored layers. Therefore, with the reflective display panel 1E, it is possible to prevent the decrease of chroma of the display colors as compared with the case where traversing colored layers are not included.

Fourth Embodiment

A reflective display apparatus according to a fourth embodiment of the present invention will now be described.

Figure 9:
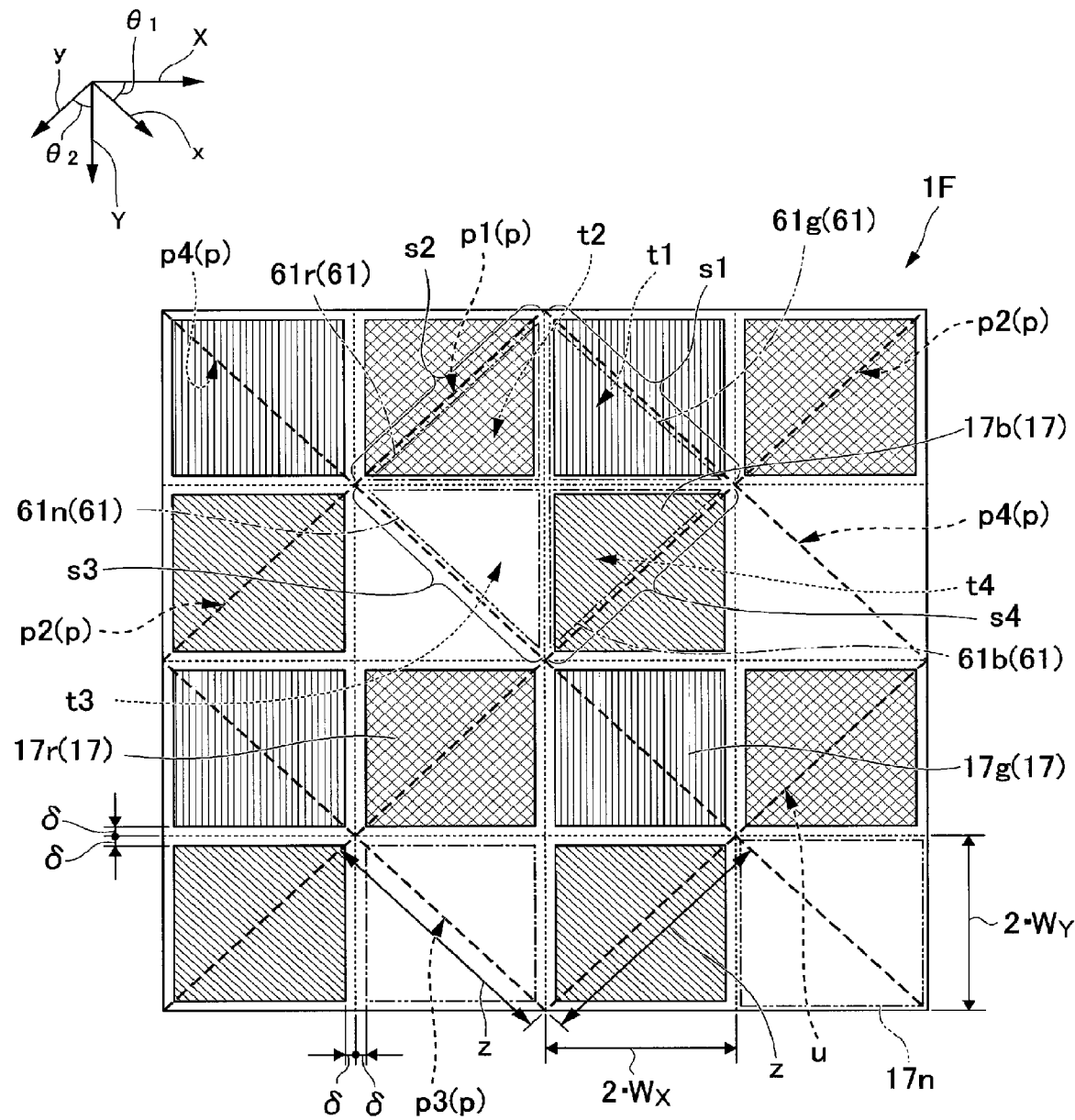
FIG. 9 is a schematic plan view illustrating a configuration of a main part of a reflective display apparatus according to a fourth embodiment of the present invention.

FIG. 9 is a schematic plan view illustrating a configuration of a main part of a reflective display apparatus according to a fourth embodiment of the present invention.

As illustrated in the main part in FIG. 9, the reflective display panel 1F (reflective display apparatus) includes a first electrode layer 61 instead of the first electrode layer 11 of the reflective display panel 1A according to the first embodiment.

Instead of the pixels P, the reflection type display panel 1F includes pixels p, which are display units for full color display. The pixels p have a rhomboid shape including a square. The pixels p are arranged in two directions inclined with respect to the X direction and the Y direction, and partition the surface 13a of the reflective display layer 13 in two dimensions.

The arrangement direction of the pixels p is not limited, but in the following description, the arrangement direction is described as being in the same direction as the x direction and the y direction in the third embodiment.

The following description will center on differences from the first embodiment.

The outer shape of a pixel p is a rhomboid along the diagonal line of a pixel P in the first embodiment. The length z of each side of a pixel p is expressed by the following Equation (6).

Equation 6

$$z = \tfrac{1}{2} \cdot \sqrt{W_X^2 + W_Y^2} \quad (6)$$

Four pixels p1, p2, p3, and p4 constitute a repeating unit u. The pixel p2 is adjacent to the pixel p1 in the y direction. The pixel p3 is adjacent to the pixel p2 in the x direction. The pixel p4 is adjacent to the pixel p3 (p1) in the direction opposite to the y direction (in the x direction).

The first electrode layer 61 includes a first color subpixel electrode 61r, a second color subpixel electrode 61g, a third color subpixel electrode 61b, and an achromatic color subpixel electrode 61n instead of the first color subpixel electrode 11r, the second color subpixel electrode 11g, the third color subpixel electrode 11b, and the achromatic color sub pixel electrode 11n in the first embodiment.

In the following description, when the first color subpixel electrode 61r, the second color subpixel electrode 61g, the third color subpixel electrode 61b, and the achromatic color subpixel electrode 61n are referred to collectively, they may be expressed as "the subpixel electrodes in the present embodiment" or simply "the subpixel electrodes" in order to simplify explanation.

The subpixel electrodes in the present embodiment are different in shape and arrangement position in plan view from the subpixel electrodes in the first embodiment.

A subpixel on which a non-colored region 17n is formed is a non-colored subpixel.

The outer shape of the subpixel electrodes in plan view is a right triangle. The subpixel electrodes have approximately the same shape as each right triangle when pixel p is divided into four with diagonal lines. Therefore, the areas of the subpixel electrodes are equal.

Depending on the arrangement position of the switching elements, for example, the plan view shape of the subpixel electrodes may be a pseudo right triangle in which a concave portion or a convex portion is formed in a part of a right triangle.

Similarly to the subpixel electrodes of the first embodiment, the subpixel electrodes apply voltages to parts of the reflective display layer 13 that face the subpixel electrodes, whereby the reflectance of the parts of the reflective display layer 13 can be changed.

The subpixel electrodes divide the reflective display layer 13 into subpixels which are the drive units having a changeable reflectance.

The subpixels in this embodiment partition the surface 13a of the reflective display layer 13 into a two-dimensional pattern, corresponding to the fact that the subpixel electrodes are right triangles along the divisional shape by the diagonal of the pixels. This two-dimensional pattern is a repeating pattern in which the inside of a pixel p is further divided into four by the diagonal cross-shape lines of the pixels p.

In the following, the subpixels in the pixels p are denoted as subpixels t1, t2, t3, and t4 (refer to the fine broken lines illustrated in FIG. 9). The relative positional relationship of the subpixels in the pixels p is the same. However, in FIG. 9, only the subpixels of the pixel p1 are denoted by reference signs in order to simplify description.

For the subpixels t1 and t3 in the pixels p, the sides s1 and s3 extending in the x direction of the pixel p are set as the base. The subpixels t1 and t3 are adjacent to each other in this order in the y direction.

The subpixels t2 and t4 in the pixels p have sides s2 and s4 extending in the y direction of the pixels p as the base. The subpixels t2 and t4 are adjacent to each other in this order in the x direction.

The subpixels t1, t2, t3, and t4 are arranged in this order counterclockwise with respect to the center of the pixel p in FIG. 9.

The types of the subpixel electrodes facing the subpixels t1, t2, t3, and t4 differ depending on the pixel p.

For example, in the pixel p1 in FIG. 9, the subpixels t1, t2, t3, and t4 face the second color subpixel electrode 61g, the first color subpixel electrode 61r, the achromatic color subpixel electrode 61n, and the third color subpixel electrode 61b, respectively.

In FIG. 9, the reference signs of the subpixel electrodes in the other pixels p are omitted; however, the correspondence between the subpixels and the subpixel electrodes is as follows.

In the pixel p2, the subpixels t1, t2, t3, and t4 face the achromatic color subpixel electrode 61n, the third color subpixel electrode 61b, the second color subpixel electrode 61g, and the first color subpixel electrode 61r, respectively. The arrangement pattern of the subpixel electrodes in the pixel p2 is a pattern obtained by mirror inverting the arrangement pattern in the pixel p1 both in the X direction and the Y direction.

The arrangement pattern of the subpixels in the pixel p3 is the same pattern as that in the pixel p1.

The arrangement pattern of the subpixels in the pixel p4 is the same pattern as that in the pixel p2.

Due to this kind of configuration of the first electrode layer 61, the colored layers of the color filter layer 67 in the present embodiment are arranged to traverse two subpixels in contact by the base and overlap these subpixels. The colored layers are arranged at positions spaced by a gap δ from each equilateral side of these subpixels.

For example, the third colored layer 17b overlaps the subpixel t4 of the pixel p1 and the subpixel t2 of the pixel p4 within the repeating unit u.

For example, the second colored layer 17g overlaps the subpixel t1 of the pixel p1 and the subpixel t3 of the pixel p2 in the diagonal upper right of the repeating unit u illustrated in FIG. 9.

For example, the first colored layer 17r overlaps the subpixel t2 of the pixel p1 and the subpixel t4 of the pixel p4 in the diagonal upper left of the repeating unit u illustrated in FIG. 9.

The first colored layer 17r, the second colored layer 17g, and the third colored layer 17b are pixel boundary traversing colored layers that traverse the sides $s_2$, $s_1$, and $s_4$ of the pixel p1, respectively.

That is, the colored layers in the present embodiment each constitute a pixel boundary traversing colored layer that overlaps two pixels.

By this kind of arrangement of the colored layers, the first colored layer 17r, the second colored layer 17g, the third colored layer 17b, and the non-colored region 17n in the pixel p1 overlap the subpixels t2, t1, t4, and t3 that are driven by the first color subpixel electrode 61r, the second color subpixel electrode 61g, the third color subpixel electrode 61b, and the achromatic color sub pixel electrode 61n, respectively.

Similarly, the first colored layer 17r, the second colored layer 17g, the third colored layer 17b, and the non-colored region 17n in the pixels p2, p3, and p4 overlap the subpixels that are driven by the first color subpixel electrode 61r, the second color subpixel electrode 61g, the third color subpixel electrode 61b, and the achromatic color subpixel electrode 61n, respectively.

The reflective display panel 1F according to the present embodiment can perform full color display similarly to the first embodiment except that the colored layers each constitute a pixel boundary traversing colored layer that overlaps two pixels.

In the reflective display panel 1F according to the present embodiment, the colored layers are pixel boundary traversing colored layers that overlap two subpixels, so the colored portion area ratio is higher than in the case of not including traversing colored layers. Therefore, with the reflective display panel 1F, it is possible to prevent the decrease of chroma of the display colors as compared with the case where traversing colored layers are not included.

The relative positional relationship between the pixels, the colored layers, the subpixels, and the subpixel electrodes in plan view in this embodiment corresponds to the case where each positional relationship in the third embodiment is mirror inverted in the left-right direction after rotating by 45° clockwise in FIG. 8.

Fifth Embodiment

A reflective display apparatus according to a fifth embodiment of the present invention will now be described.

Figure 10:
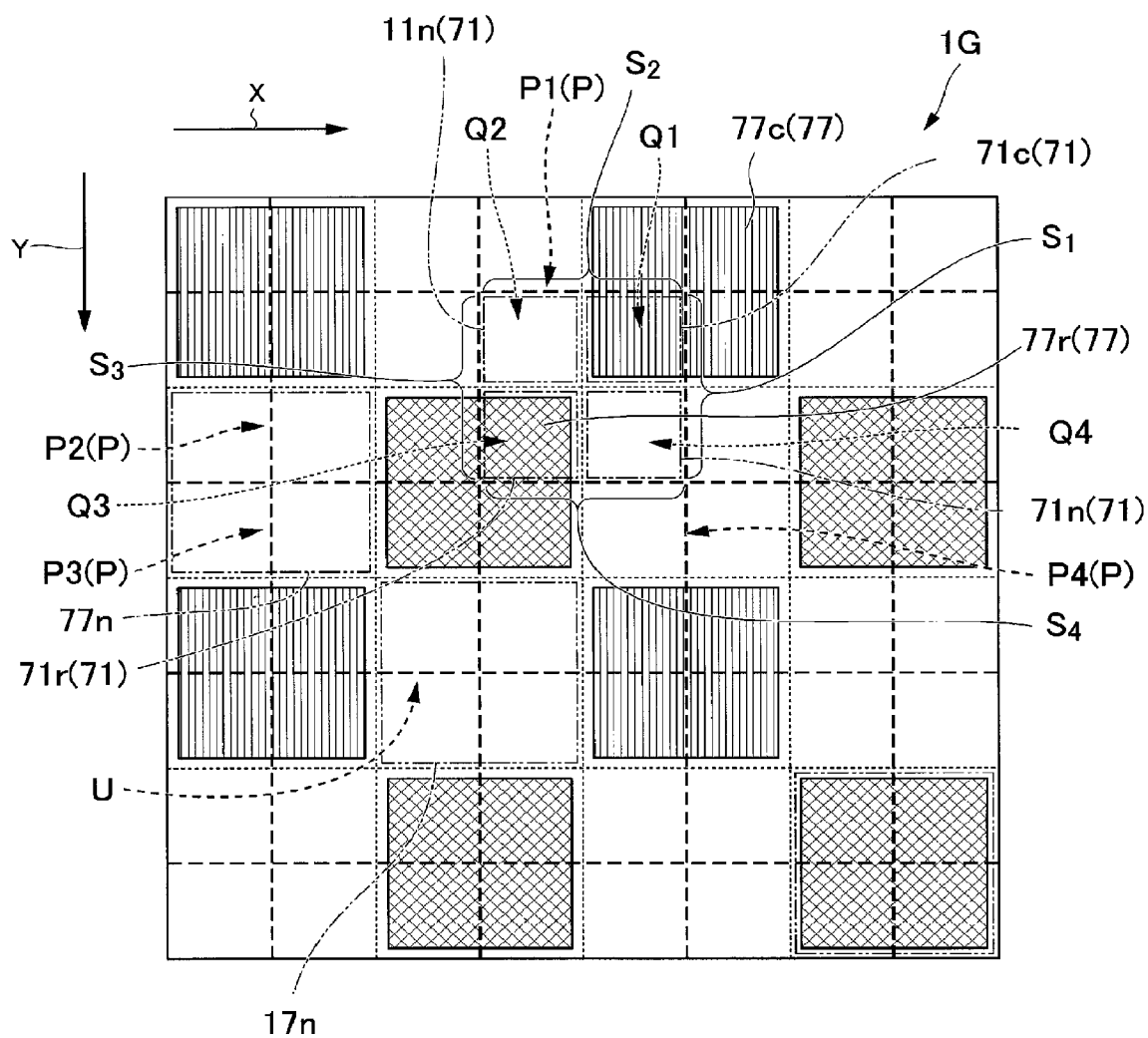
FIG. 10 is a schematic plan view illustrating a configuration of a main part of a reflective display apparatus according to a fifth embodiment of the present invention.

FIG. 10 is a schematic plan view illustrating a configuration of a main part of the reflective display apparatus according to the fifth embodiment of the present invention.

As the main part is illustrated in FIG. 10, the reflective display panel 1G (reflective display apparatus) according to the present embodiment includes a first electrode layer 71 and a color filter layer 77 instead of the first electrode layer 11 and color filter layer 17 of the reflective display panel 1A according to the first embodiment.

The reflective display panel 1G according to the present embodiment performs color display by combining two colors in a pixel P (hereinafter referred to as double color display), whereas the reflective display panel 1A according to the first embodiment performs full color display by combining three colors in a pixel P.

The following description will center on differences from the first embodiment.

The two colors used for the double color display are hereinafter referred to as the first color and the second color; however, they may be different from the first color and the second color in the first embodiment.

Examples of two colors used for double color display may include, for example, red and cyan, magenta and green, yellow and blue, and orange and green. In these combinations of two colors, the first color and the second color are exchangeable.

However, the two colors are not limited to these combinations. For the two colors in double color display, an appropriate combination of two colors according to the hue of the required display color may be used.

The first electrode layer 71 includes a first color subpixel electrode 71r, a second color subpixel electrode 71c, and an achromatic color subpixel electrode 71n instead of the first color subpixel electrode 11r, the second color subpixel electrode 11g, and the third color subpixel electrode 11b in the first embodiment.

In the following description, when the first color subpixel electrode 71r, the second color subpixel electrode 71c, and the achromatic color subpixel electrode 11n, 71n are referred to collectively, they may be expressed as "the subpixel electrodes in the present embodiment" or simply as "the subpixel electrodes" in order to simplify explanation.

In order to control the tone of the first color and the second color used for double color display, the first color subpixel electrode 71r and the second color subpixel electrode 71c are driving electrodes that respectively apply driving voltages to predetermined regions for driving the reflective display layer 13.

Similarly to the achromatic color subpixel electrode 11n, the achromatic color subpixel electrode 71n is a driving electrode for controlling the tone of achromatic color.

The subpixel electrodes in the present embodiment have a configuration similar to that of the subpixel electrodes in the first embodiment except for being driven by image signals of double color display.

The color filter layer 77 includes a first colored layer 77r and a second colored layer 77c instead of the first colored layer 17r and the third colored layer 17b, with the second colored layer 17g of the color filter layer 17 of the first embodiment eliminated. The area of the second colored layer 17g that has been eliminated is a non-colored region 77n similar to the non-colored region 17n.

The first colored layer 77r (second colored layer 77c) has a transmission wavelength band that transmits only the wavelength component of the first color (second color) used for double color display.

With this kind of configuration, in the reflective display panel 1G according to the present embodiment, in the pixels P, the first colored layer 77r, the second colored layer 77c, and the non-colored regions 17n, 77n overlap the subpixels that are driven by the first color subpixel electrode 71r, the second color subpixel electrode 71c, and the achromatic color subpixel electrodes 11n, 71n, respectively.

Similarly to the first colored layer 17r and the third colored layer 17b in the first embodiment, the first colored layer 77r and the second colored layer 77c are pixel boundary traversing colored layers that overlap four pixels.

The subpixels on which the non-colored regions 17n, 77n are formed are non-colored subpixels.

The reflective display panel 1G according to the present embodiment may perform double color display based on image signals of double color display. In this embodiment, the colored portion area ratio in the subpixels in which the colored layers are arranged is the same as in the first embodiment.

In the reflective display panel 1G according to the present embodiment, the colored layers are pixel boundary traversing colored layers that overlap four subpixels; therefore, the colored portion area ratio is higher than in the case of not including traversing colored layers. Therefore, with the reflective display panel 1G, it is possible to prevent a decrease of chroma of the display colors as compared with the case where traversing colored layers are not included.

Sixth Embodiment

A reflective display apparatus according to a sixth embodiment of the present invention will now be described.

Figure 11:
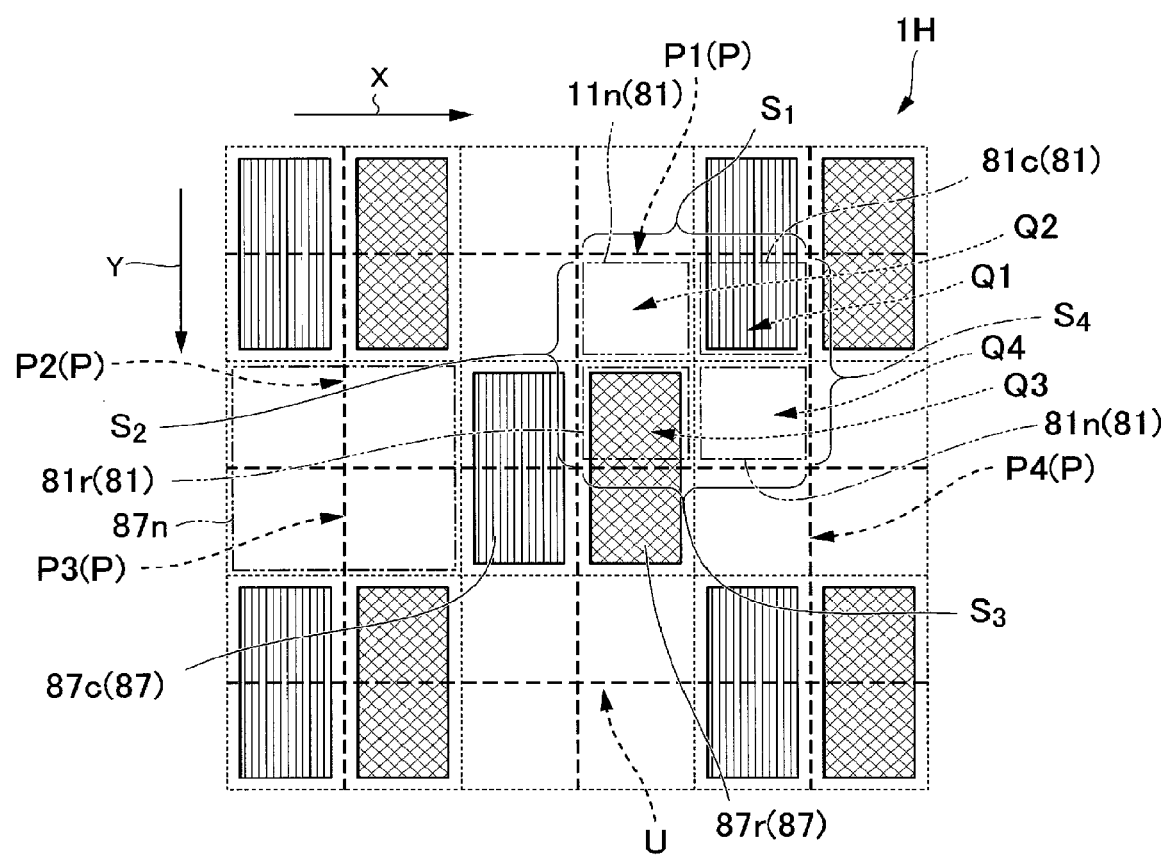
FIG. 11 is a schematic plan view illustrating a configuration of a main part of a reflective display apparatus according to a sixth embodiment of the present invention.

FIG. 11 is a schematic plan view illustrating a configuration of a main part of the reflective display apparatus according to the sixth embodiment of the present invention.

As the main part is illustrated in FIG. 11, the reflective display panel 1H (reflective display apparatus) according to the present embodiment includes a first electrode layer 81 and a color filter layer 87 instead of the first electrode layer 31 and color filter layer 37 of the reflective display panel 1C according to the second embodiment.

The reflective display panel 1H according to the present embodiment performs double color display on the pixel P, whereas the reflective display panel 1C according to the second embodiment performs full color display by combining three colors on the pixel P.

Hereinafter, the description will center on points that differ from the second embodiment and fifth embodiment.

The first electrode layer 81 includes a first color subpixel electrode 81r, a second color subpixel electrode 81c, and an achromatic color subpixel electrode 81n instead of the first color subpixel electrode 11r, the second color subpixel electrode 11g, and the third color subpixel electrode 11b in the second embodiment.

In the following description, when the first color subpixel electrode 81r, the second color subpixel electrode 81c, and the achromatic color subpixel electrodes 11n, 81n are collectively referred to, they may be expressed as "the subpixel electrodes in this embodiment" or simply "the subpixel electrodes" in order to simplify explanation.

In order to control the tone of the first color and the second color used for double color display, the first color subpixel electrode 81r and the second color subpixel electrode 81c are driving electrodes for applying driving voltages to predetermined regions for driving the reflective display layer 13.

Similarly to the achromatic color subpixel electrode 11n, the achromatic color subpixel electrode 81n is a driving electrode for controlling the tone of achromatic color.

The subpixel electrodes in this embodiment have a configuration similar to that of the subpixel electrodes in the second embodiment except for being driven by image signals of double color display.

The color filter layer 87 includes a first colored layer 87r and a second colored layer 87c instead of the first colored layer 37r and the second colored layer 37g, with the third colored layer 37b of the color filter layer 37 of the second embodiment eliminated. The region obtained by combining the region of the subpixels overlapped by the eliminated third colored layer 37b and the non-colored region 37n is a non-colored region 87n similar to the non-colored region 37n.

With this kind of a configuration, in the reflective display panel 1H according to the present embodiment, in the pixels P, the first colored layer 87r, the second colored layer 87c, and the non-colored region 87n overlap the subpixels that are driven by the first color subpixel electrode 81r, the second color subpixel electrode 81c, and the achromatic color subpixel electrodes 11n, 81n, respectively.

Similarly to the first colored layer 37r and the second colored layer 37g in the second embodiment, the first colored layer 87r and the second colored layer 87c are pixel boundary traversing colored layers that overlap two pixels.

The subpixel on which the non-colored region 87n is formed is a non-colored subpixel.

The reflective display panel 1H according to the present embodiment can perform double color display similarly to the second embodiment except for being based on image signals of double color display. In the present embodiment, the colored portion area ratio in the subpixels on which the colored layers are arranged is the same as in the second embodiment.

In the reflective display panel 1H according to the present embodiment, pixel boundary traversing colored layers overlap two subpixels, so the colored portion area ratio is higher than in the case of not including traversing colored layers. Therefore, with the reflective display panel 1H, it is possible to prevent the decrease of chroma of the display colors as compared with the case where traversing colored layers are not included.

Fourth Modified Example

A reflective display apparatus of a modified example (fourth modified example) of the sixth embodiment of the present invention will now be described.

Figure 12:
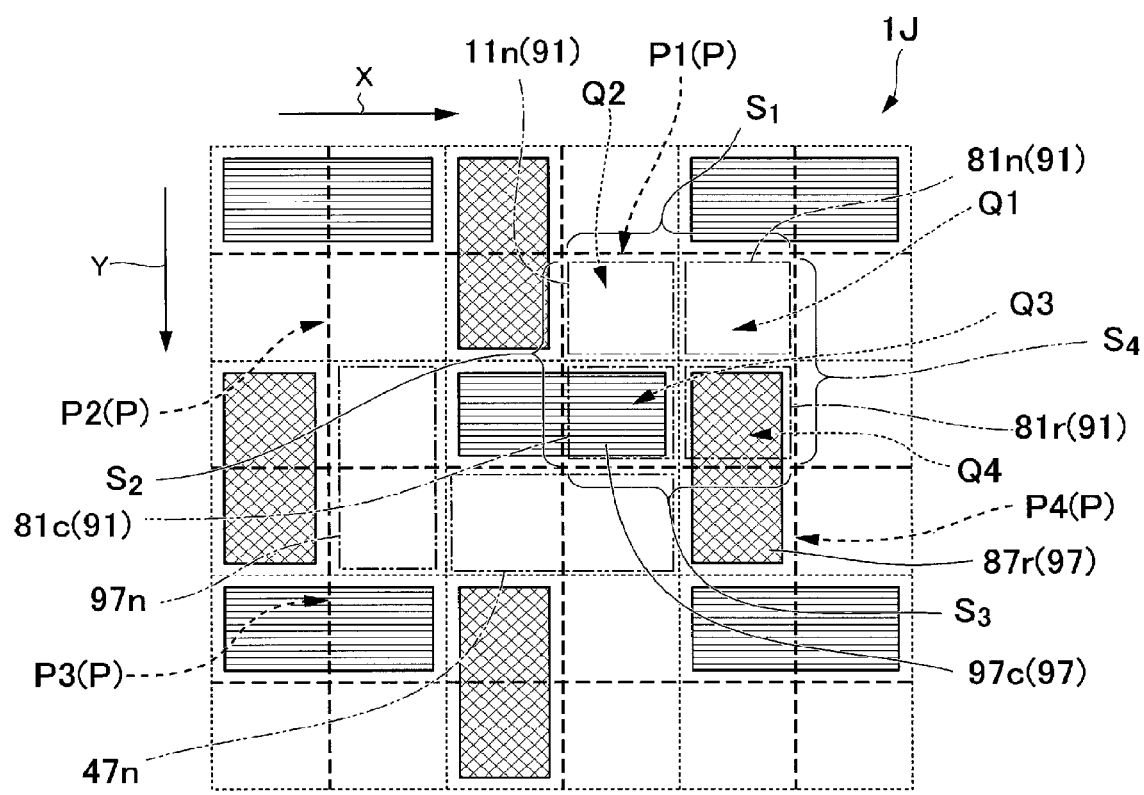
FIG. 12 is a schematic plan view illustrating a configuration of a main part of a modified example (fourth modified example) of the reflective display apparatus according to the sixth embodiment of the present invention.

FIG. 12 is a schematic plan view illustrating a configuration of a main part of the reflective display apparatus of the modified example (fourth modified example) of the sixth embodiment of the present invention.

As the main part is illustrated in FIG. 12, the reflective display panel 1J (reflective display apparatus) of the present modified example includes a first electrode layer 91 and a color filter layer 97 instead of the first electrode layer 81 and the color filter layer 87 of the reflective display panel 1H according to the sixth embodiment.

The reflective display panel 1J of this modified example is configured by applying the same modification as that of the third modified example of the second embodiment to the color filter layer 97 of the reflective display panel 1H according to the sixth embodiment.

Hereinafter, the description will center on the differences from the sixth embodiment and the third modified example.

The first electrode layer 91 has a configuration similar to that of the first electrode layer 81 in the sixth embodiment except that the arrangement pattern of the subpixel electrodes is different according to the arrangement pattern of the colored layers in the color filter layer 97 described later.

For example, in the pixel P1, the achromatic color subpixel electrode 81n, the achromatic color subpixel electrode 11n, the second color subpixel electrode 81c, and the first color subpixel electrode 81r are arranged to face the subpixels Q1, Q2, Q3, and Q4, respectively.

The arrangement pattern of the subpixel electrodes in the pixels P2 and P4 corresponds to a pattern obtained by rotating the arrangement pattern in the pixel P1 counterclockwise 90° in FIG. 12. In other words, in the pixels P2 and P4, the achromatic color subpixel electrode 81n, the achromatic color subpixel electrode 11n, the second color subpixel electrode 81c, and the first color subpixel electrode 81r are arranged to face the sub pixels Q2, Q3, Q4 and Q1.

The arrangement pattern of the subpixel electrodes in the pixel P3 is the same arrangement pattern in the pixel P1.

The color filter layer 97 includes a second colored layer 97c (a colored layer, a traversing colored layer, a pixel boundary traversing colored layer) instead of the second colored layer 87c of the color filter layer 87 of the sixth embodiment.

In the following description, when the first colored layer 87r and the second colored layer 97c are collectively referred to, they may be expressed as "the colored layers in this modified example" or simply as "the colored layers" in order to simplify explanation.

The second colored layer 97c has a plan view shape of a rectangle that is longer in the X direction. The shape of the second colored layer 97c in plan view is the same as that of the second colored layer 47g in the third modified example.

The second colored layer 97c is arranged in a positional relationship such that the second colored layer 87c in the sixth embodiment is rotated by 90° so as to overlap two subpixels which are adjacent in the X direction.

The second colored layer 97c has a configuration similar to that of the second colored layer 87c in the sixth embodiment except for this kind of a plan view shape and arrangement position.

Two subpixels adjacent in the Y direction to two subpixels overlapped by the second colored layer 97c form a non-colored region 47n in which no colored layers are overlapped as in the third modified example.

Two subpixels sandwiched between the first colored layer 87r, and the second colored layer 97c and the non-colored region 47n, and adjacent to each other in the Y direction form a non-colored region 97n.

In the color filter layer 97, a first repeating unit that includes a first colored layer 87r and a non-colored region 97n adjacent in the X direction, and a second repeating unit that includes a second colored layer 97c and a non-colored region 47n adjacent in the Y direction, are alternately arranged in the X direction. Furthermore, in the color filter layer 97, the first repeating unit and the second repeating unit are alternately arranged also in the Y direction.

The first repeating unit and the second repeating unit are offset $W_X$ in the X direction and $W_Y$ in the Y direction with respect to the pixels P.

With this kind of configuration, in the reflective display panel 1J according to the present modified example, in the pixels P, the first colored layer 87r, the second colored layer 97c, and the non-colored regions 97n and 47n overlap the subpixels that are driven by the first color subpixel electrode 81r, the second color subpixel electrode 81c, and the achromatic color subpixel electrodes 11n, 81n, respectively.

Similarly to the first colored layer 87r and the second colored layer 87g in the sixth embodiment, the first colored layer 87r and the second colored layer 97c are pixel boundary traversing colored layers that overlap two pixels.

The subpixels on which the non-colored regions 97n and 47n are formed are non-colored subpixels.

The reflective display panel 1J of this modified example can perform double color display similarly to the sixth embodiment. In this modified example, the colored portion area ratio in the subpixels on which the colored layers are arranged is the same as in the sixth embodiment.

In the reflective display panel 1J of this modified example, the colored layers are pixel boundary traversing colored layers that overlap two subpixels, so the colored portion area ratio is higher than in the case of not including traversing colored layers. Therefore, with the reflective display panel 1J, it is possible to prevent a decrease of chroma of the display colors as compared with the case where traversing colored layers are not included.

Seventh Embodiment

A reflective display apparatus according to a seventh embodiment of the present invention will now be described.

Figure 13:
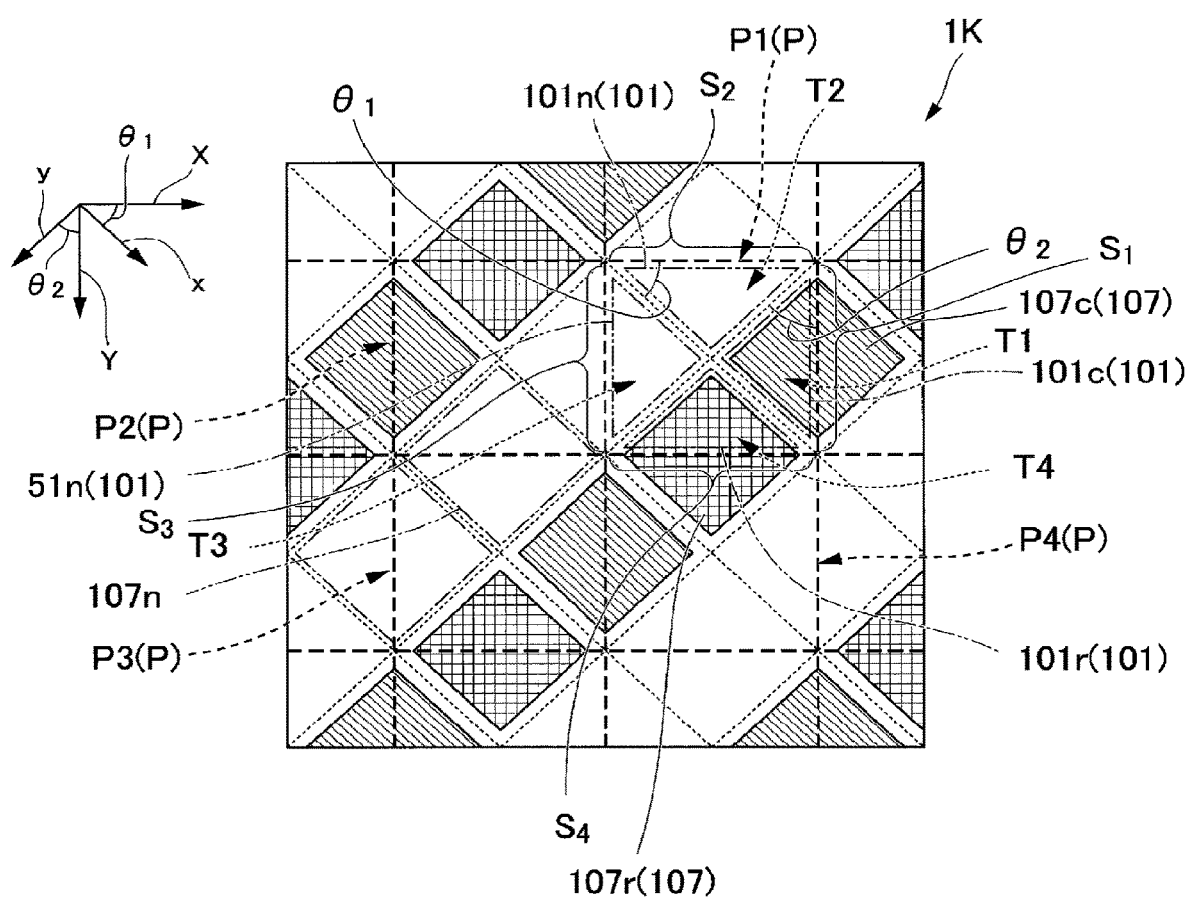
FIG. 13 is a schematic plan view illustrating a configuration of a main part of a reflective display apparatus according to a seventh embodiment of the present invention.

FIG. 13 is a schematic plan view illustrating a configuration of a main part of the reflective display apparatus according to the seventh embodiment of the present invention.

As illustrated in the main part in FIG. 13, the reflective display panel 1K (reflective display apparatus) according to the present embodiment includes a first electrode layer 101 and a color filter layer 107 instead of the first electrode layer 51 and the color filter layer 57 of the reflective display panel 1E according to the third embodiment.

The reflective display panel 1K performs double color display in the pixel P, whereas the reflective display panel 1E according to the third embodiment performs full color display by combining three colors in the pixel P.

The following description will center on points that differ from the third embodiment.

The first electrode layer 101 includes a first color subpixel electrode 101r, a second color subpixel electrode 101c, and an achromatic color subpixel electrode 101n instead of the first color subpixel electrode 51r, the second color subpixel electrode 51g, and the third color subpixel electrode 51b in the third embodiment.

In the following description, when the first color subpixel electrode 101r, the second color subpixel electrode 101c, and the achromatic color subpixel electrodes 51n, 101n are collectively referred to, they may be expressed as "the subpixel electrodes in the present embodiment" or simply "the subpixel electrodes" in order to simplify explanation.

In order to control the tone of the first color and the second color used for double color display, the first color subpixel electrode 101r and the second color subpixel electrode 101c are driving electrodes for respectively applying driving voltages for driving the reflective display layer 13 to predetermined regions.

Similarly to the achromatic color subpixel electrode 51n, the achromatic color subpixel electrode 101n is a driving electrode for controlling the tone of the achromatic color.

The subpixel electrodes in the present embodiment have a configuration similar to that of the subpixel electrodes in the third embodiment except for being driven by image signals of double color display.

For example, in the pixel P1, the second color subpixel electrode 101c, the achromatic color subpixel 101n, the achromatic color subpixel electrode 51n, and the first color subpixel electrode 101r are arranged to face the sub pixels T1, T2, T3, and T4, respectively.

The arrangement pattern of the subpixel electrodes in the pixels P2 and P4 corresponds to a pattern obtained by rotating the arrangement pattern in the pixel P1 by 180°.

The arrangement pattern of the subpixel electrodes in the pixel P3 is the same arrangement pattern in the pixel P1.

The color filter layer 107 includes a first colored layer 107r and a second colored layer 107c instead of the first colored layer 57r and the second colored layer 57g, with the third color layer 57b of the third embodiment eliminated. The region obtained by combining the region of the subpixel overlapped by the eliminated third colored layer 57b and the non-colored region 57n is a non-colored region 107n similar to the non-colored region 57n.

In the color filter layer 107, a first arrangement in which the first colored layer 107r and the second colored layer 107c are alternately arranged in the y direction and a second arrangement in which only the non-colored region 107n is arranged in the y direction are alternately arranged in the x direction.

Furthermore, in the color filter layer 107, a third arrangement in which the first colored layer 107r and the non-colored region 107n are alternately arranged in the x direction and a fourth arrangement in which the second colored layer 107c and the non-colored region 107n are alternately arranged in the x direction are alternately arranged in the y direction.

With this kind of configuration, in the reflective display panel 1K according to the present embodiment, in the pixels P, the first colored layer 107r, the second colored layer 107c, and the non-colored region 107n overlap the subpixels that are driven by the first color subpixel electrode 101r, the second color subpixel electrode 101c, and the achromatic color subpixel electrodes 51n, 101n, respectively.

Similarly to the first colored layer 57r and the second colored layer 57g in the third embodiment, the first colored layer 107r and the second colored layer 107c are pixel boundary traversing colored layers that overlap two pixels.

The subpixels on which the non-colored regions 57n and 107n are formed are non-colored subpixels.

The reflective display panel 1K according to the present embodiment can perform double color display similarly to the third embodiment except for being based on image signals of double color display. In this embodiment, the colored portion area ratio in the subpixels in which the colored layers are arranged is the same as in the third embodiment.

In the reflective display panel 1K according to the present embodiment, the colored layers are pixel boundary traversing colored layers that overlap two subpixels, so the colored portion area ratio is higher than in the case of not including traversing colored layers. Therefore, with the reflective display panel 1K, it is possible to prevent a decrease of chroma of the display colors as compared with the case where the traversing colored layers are not included.

Fifth Modified Example

A reflective display apparatus according to a modified example (fifth modified example) of the seventh embodiment of the present invention will now be described.

Figure 14:
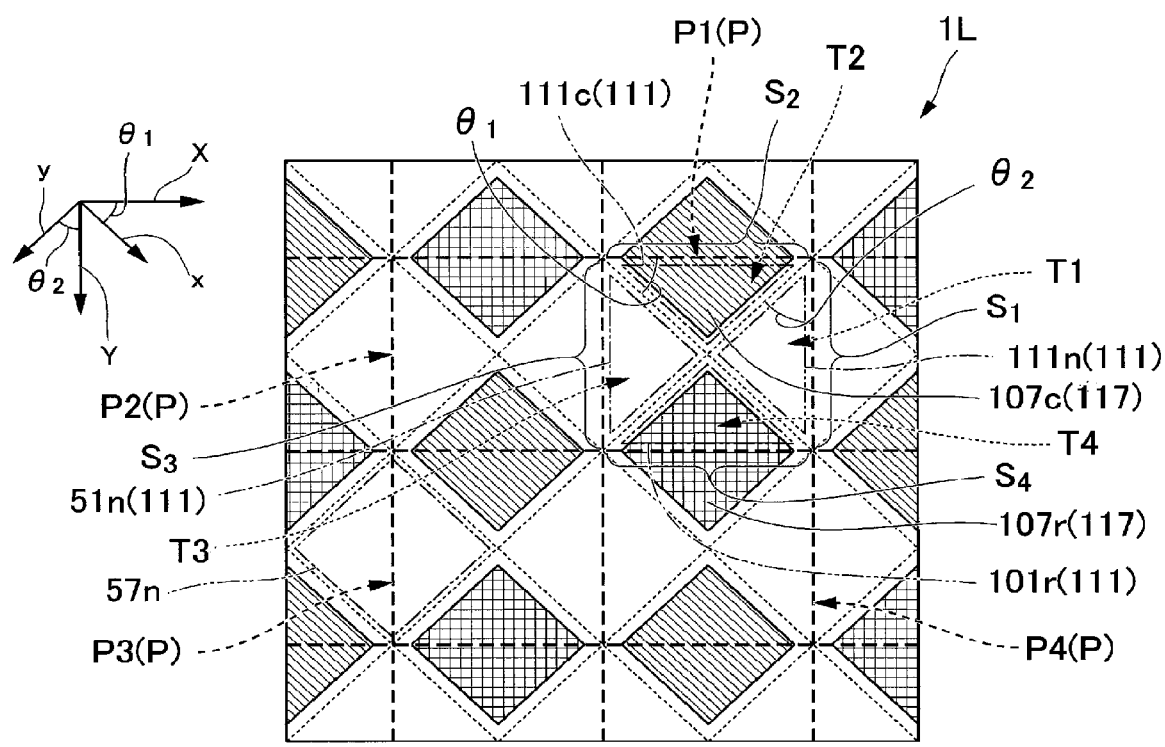
FIG. 14 is a schematic plan view illustrating a configuration of a main part of a modified example (fifth modified example) of the reflective display apparatus according to the seventh embodiment of the present invention.

FIG. 14 is a schematic plan view illustrating a configuration of a main part of the reflective display apparatus of the modified example (fifth modified example) of the seventh embodiment of the present invention.

As illustrated in the main part in FIG. 14, the reflective display panel 1L (reflective display apparatus) of this modified example includes a first electrode layer 111 and a color filter layer 117 instead of the first electrode layer 101 and color filter layer 107 of the reflective display panel 1K according to the seventh embodiment.

The reflective display panel 1L of this modified example is configured such that the arrangement positions of the subpixel electrodes and the colored layers in the first electrode layer 101 and the color filter layer 107 in the reflective display panel 1K according to the seventh embodiment are changed.

The following description will center on the points that are different from the seventh embodiment.

The first electrode layer 111 has a configuration similar to that of the first electrode layer 101 in the seventh embodiment except that the arrangement pattern of the subpixel electrodes differs according to the arrangement pattern of the colored layers in the color filter layer 107 described later.

For example, in the pixel P1, the achromatic color subpixel electrode 111n, the second color subpixel electrode 111c, the achromatic color subpixel electrode 51n, and the first color subpixel electrode 111r are arranged to face the subpixels T1, T2, T3, and T4, respectively.

The arrangement pattern of the subpixel electrodes in the pixels P2 and P4 corresponds to a pattern obtained by rotating the arrangement pattern in the pixel P1 by 180°.

The arrangement pattern of the subpixel electrodes in the pixel P3 is the same arrangement pattern in the pixel P1.

The color filter layer 117 is formed by moving the second colored layer 107c of the color filter layer 107 in the seventh embodiment to the non-colored region 107n sandwiched between first colored layers 107r in the X direction and the Y direction.

Therefore, in the color filter layer 117 according to the present modified example, in the region of two subpixels sandwiched between the first colored layers 107r in the x direction and sandwiched between the second colored layers 107c in the y direction, a non-colored region 57n similar to that of the embodiment 3 is formed.

In the color filter layer 117, a first arrangement in which the first colored layer 117r and the non-colored region 57n are alternately arranged in the x direction and a second arrangement in which the second colored layer 107c and the non-colored region 57n are alternately arranged in the x direction are alternately arranged in the y direction. Furthermore, in the color filter layer 117, a third arrangement in which the first colored layer 117r and the non-colored region 57n are alternately arranged in the y direction and a fourth arrangement in which the second colored layer 107c and the non-colored region 57n are arranged alternately in the y direction are alternately arranged in the x direction.

With this kind of configuration, in the pixels P of the reflective display panel 1L according to the present modified example, the first colored layer 107r, the second colored layer 107c, and the non-colored region 57n overlap the subpixels that are driven by the first color subpixel electrode 101r, the second color subpixel electrode 111c, and the achromatic color subpixel electrodes 51n, 111n, respectively.

As in the seventh embodiment, the first colored layer 107r and the second colored layer 107c are pixel boundary traversing colored layers that overlap two pixels.

The subpixel on which the non-colored region 57n is formed is a non-colored subpixel.

The reflective display panel 1L of this modified example can perform double color display similarly to the seventh embodiment. In this modified example, the colored portion area ratio in the subpixels in which the colored layers are arranged is the same as in the seventh embodiment.

In the reflective display panel 1L of this modified example, the colored layers are pixel boundary traversing colored layers that overlap two subpixels, so the colored area coverage ratio is higher than in the case where traversing colored layers are not included. Therefore, according to the reflective display panel 1L, it is possible to prevent the decrease of chroma of the display colors as compared with the case where the traversing colored layers are not included.

Eighth Embodiment

A reflective display apparatus according to an eighth embodiment of the present invention will now be described.

Figure 15:
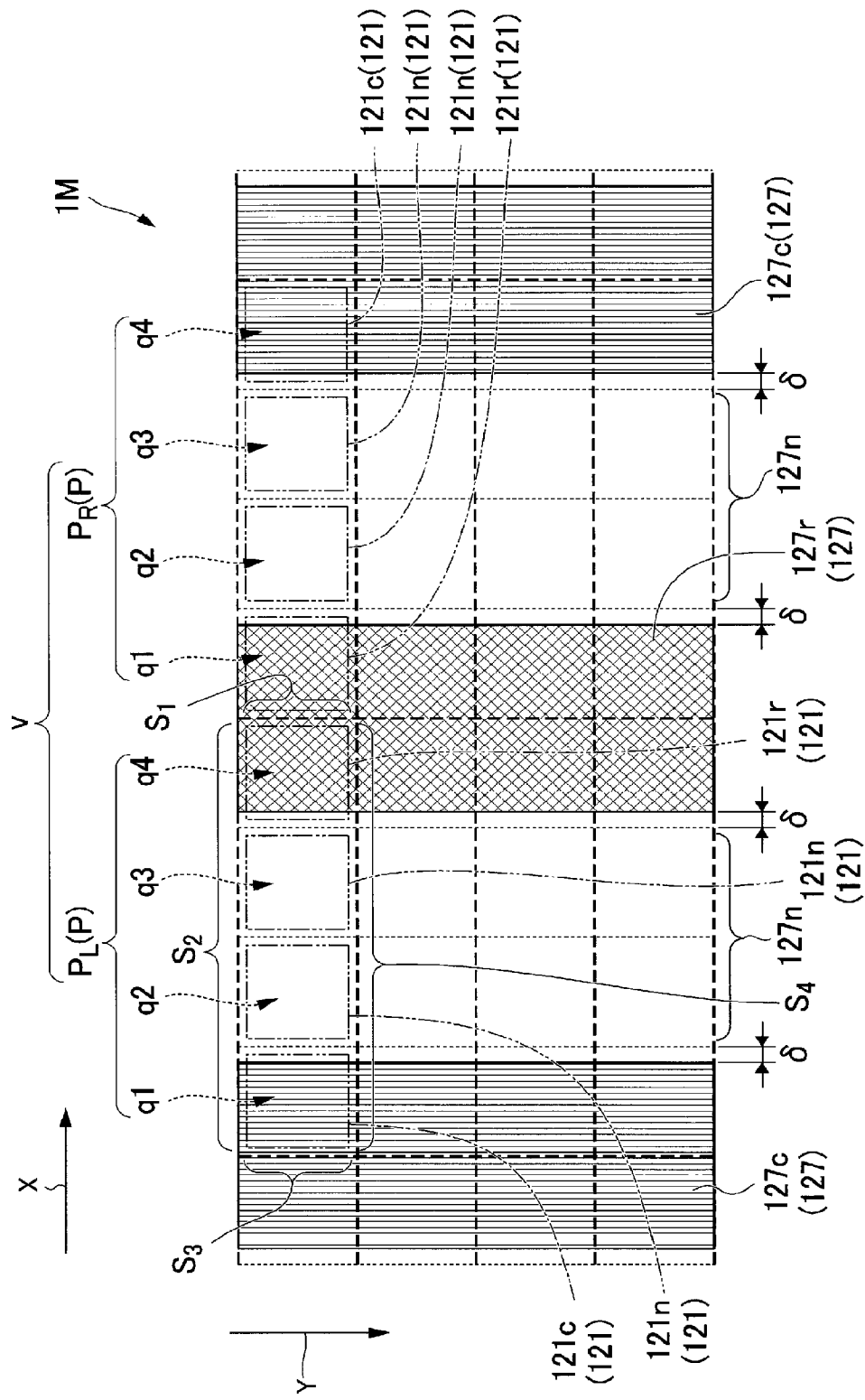
FIG. 15 is a schematic plan view illustrating a configuration of a main part of a reflective display apparatus according to an eighth embodiment of the present invention.

FIG. 15 is a schematic plan view illustrating a configuration of a main part of the reflective display apparatus according to the eighth embodiment of the present invention.

As the main part is illustrated in FIG. 15, the reflective display panel 1M (reflective display apparatus) according to this embodiment includes a first electrode layer 121 and a color filter layer 127 instead of the first electrode layer 11 and color filter layer 17 of the reflective display panel 1A according to the first embodiment.

The following description will center on differences from the first embodiment.

The first electrode layer 121 has a configuration similar to that of the first electrode layer 11 in the first embodiment except that the arrangement pattern of the subpixel electrodes differs according to the arrangement pattern of the colored layers in the color filter layer 127 described later.

The first electrode layer 121 includes a first color subpixel electrode 121r, a second color subpixel electrode 121c, and an achromatic color subpixel electrode 121n.

Similarly to the first color subpixel electrode 71r and the second color subpixel electrode 71c in the fifth embodiment, the first color subpixel electrode 121r and the second color subpixel electrode 121c are driving electrodes for controlling the tone of the first color and the second color for use in double color display.

Similarly to the achromatic color subpixel electrode 71n in the fifth embodiment, the achromatic color subpixel electrode 121n is a driving electrode for controlling the tone of the achromatic color used for double color display.

In the first electrode layer 121, two first color subpixel electrodes 121r, two achromatic color subpixel electrodes 121n, two second color subpixel electrodes 121c, and two achromatic color subpixel electrodes 121n are repeatedly arranged in this order in the X direction. In the Y direction, all the same kind of subpixel electrodes are arranged.

The four subpixels that face the region in which the second color subpixel electrode 121c, the two achromatic color subpixel electrodes 121n, and the first color subpixel electrode 121r are arranged in this order in the X direction constitute a pixel $P_L$, which is a display unit of double color display in the reflective display panel 1M (refer to the thick broken lines in FIG. 15). The X direction width of the pixel $P_L$ is $4 \cdot W_X$ and the Y direction width is $W_Y$.

The four subpixels that face the region in which the first color subpixel electrode 121r, the two achromatic color subpixel electrodes 121n, and the second color subpixel electrode 121c are arranged in this order in the X direction constitute a pixel $P_R$, which is a display unit of double color display in the reflective display panel 1M (refer to the thick broken lines in FIG. 15). The X direction width of the pixel $P_R$ is $4 \cdot W_X$, and the Y direction width is $W_Y$.

In the following description, the pixels $P_L$, $P_R$ may be collectively referred to as pixels P. The subpixels in the pixels P are represented as subpixels q1, q2, q3, and q 4 (refer to the fine broken lines illustrated in FIG. 15) in this order in the X direction.

The outer shape of the pixel $P_L$ is such that the sides $S_3$ and $S_1$ extending in the Y direction are arranged in this order in the X direction and one of them is the opposite side of another. The outer shape of the pixel $P_L$ is such that the sides $S_2$ and $S_4$ extending in the X direction are arranged in this order in the Y direction and one of them is the opposite side of another. Although not specifically illustrated, the outer shape of the pixel $P_R$ is also the same.

As described above, the pixels $P_L$ and $P_R$ are arranged adjacent to each other in the X direction. In the reflective display layer 13, the pixels $P_L$ and $P_R$ constitute a repeating unit v in the X direction and the Y direction. The outer shape of the repeating unit v in plan view is a rectangle in which the length of the side extending in the X direction is $8 \cdot W_X$ and the length of the side extending in the Y direction is $W_Y$. The repeating unit v is arranged in a rectangular lattice shape with a pitch of $8 \cdot W_X$ in the X direction and a pitch of $W_Y$ in the Y direction.

The color filter layer 127 includes a first colored layer 127r and a second colored layer 127c.

Similarly to the first colored layer 77r (second colored layer 77c) of the fifth embodiment, the first colored layer 127r (second colored layer 127c) has a transmission wavelength band that transmits only the wavelength component of the first color (second color) used for double color display.

The plan view shape of the first colored layer 127r (second colored layer 127c) is formed in a stripe shape extending in the Y direction with the width in the X direction being $2 \cdot (W_X - \delta)$. The first colored layer 127r (second colored layer 127c) traverses the effective display area of the reflective display panel 1M in the Y direction.

The first colored layer 127r and the second colored layer 127c are alternately arranged in parallel in the X direction at a pitch of $4 \cdot W_X$.

The first colored layer 127r overlaps the subpixels q4 and q1 in the region of the subpixel q4 in the pixel $P_L$ and in the region of the subpixel q1 in the pixel $P_R$.

The first colored layer 127r overlaps the subpixel q4 (q1) with a gap δ between the colored layer 127r and the outer shape of the subpixel q4 (q1) of the pixel $P_L$ (pixel $P_R$).

The first colored layer 127r is a pixel boundary traversing colored layer that traverses the side $S_1$ of the pixel $P_L$ (the side $S_3$ of the pixel $P_R$) forming the boundary between the pixels $P_L$ and $P_R$. Furthermore, in the Y direction, the first colored layer 127r traverses all the pixels $P_L$ and $P_R$ adjacent to each other in the Y direction.

The second colored layer 127c overlaps the subpixels q1 and q4 in the region of the subpixel q1 in the pixel $P_L$ and in the region of the subpixel q4 in the pixel $P_R$.

The second colored layer 127c overlaps the subpixel q1 (q4) with a gap δ between the colored layer 127c and the outer shape of the subpixel q1 (q4) of the pixel $P_L$ (pixel $P_R$).

The second colored layer 127c is a pixel boundary traversing colored layer that traverses the side $S_3$ of the pixel $P_L$ (the side $S_1$ of the pixel $P_R$) forming a boundary between the pixels $P_L$ and $P_R$. Furthermore, in the Y direction, the second colored layer 127c traverses all pixels $P_L$ and $P_R$ that are adjacent in the Y direction.

In the X direction, between the first colored layer 127r and the second colored layer 127c, a non-colored region 127n continuous in the Y direction is formed so as to cover the subpixels q2 and q3.

In the following description, when the first colored layer 127r and the second colored layer 127c are referred to collectively, they may be expressed as "the colored layers in this embodiment" or simply as "the colored layers" in order to simplify explanation.

The first colored layer 127r and the second colored layer 127c of the present embodiment are arranged one-dimensionally with a gap in the X direction (first arrangement direction), and in the region facing a pixel P, they are separated from each other and constitute a plurality of colored layers arranged to overlap the subpixels without extending beyond the each subpixel boundary.

The reflective display panel 1M according to the present embodiment is manufactured in the same way as the reflective display panel 1A according to the first embodiment except that the shape, type, and arrangement of each colored layer are different in the manufacturing process of the color filter layer 127.

The reflective display panel 1M according to this embodiment includes colored layers that each constitute a pixel boundary traversing colored layer that overlaps two pixels in the X direction and can perform double color display based on image signals of double color display.

The subpixel on which the non-colored region 127n is formed is a non-colored subpixel.

The colored portion area ratio ν in the subpixels in which the colored layers are arranged is expressed by the following Equation (7).

Equation 7

$$v = \frac{(W_X - \delta) \cdot W_Y}{W_X \cdot W_Y} \quad (7)$$

When the size of a subpixel and the gap δ are the same, the relationship β<ν holds. Therefore, with the reflective display panel 1M, it is possible to prevent the decrease of chroma of the display colors, as compared with the comparative example described above in the first embodiment.

Sixth Modified Example

A reflective display apparatus according to a modified example (sixth modified example) of an eighth embodiment of the present invention will now be described.

Figure 16:
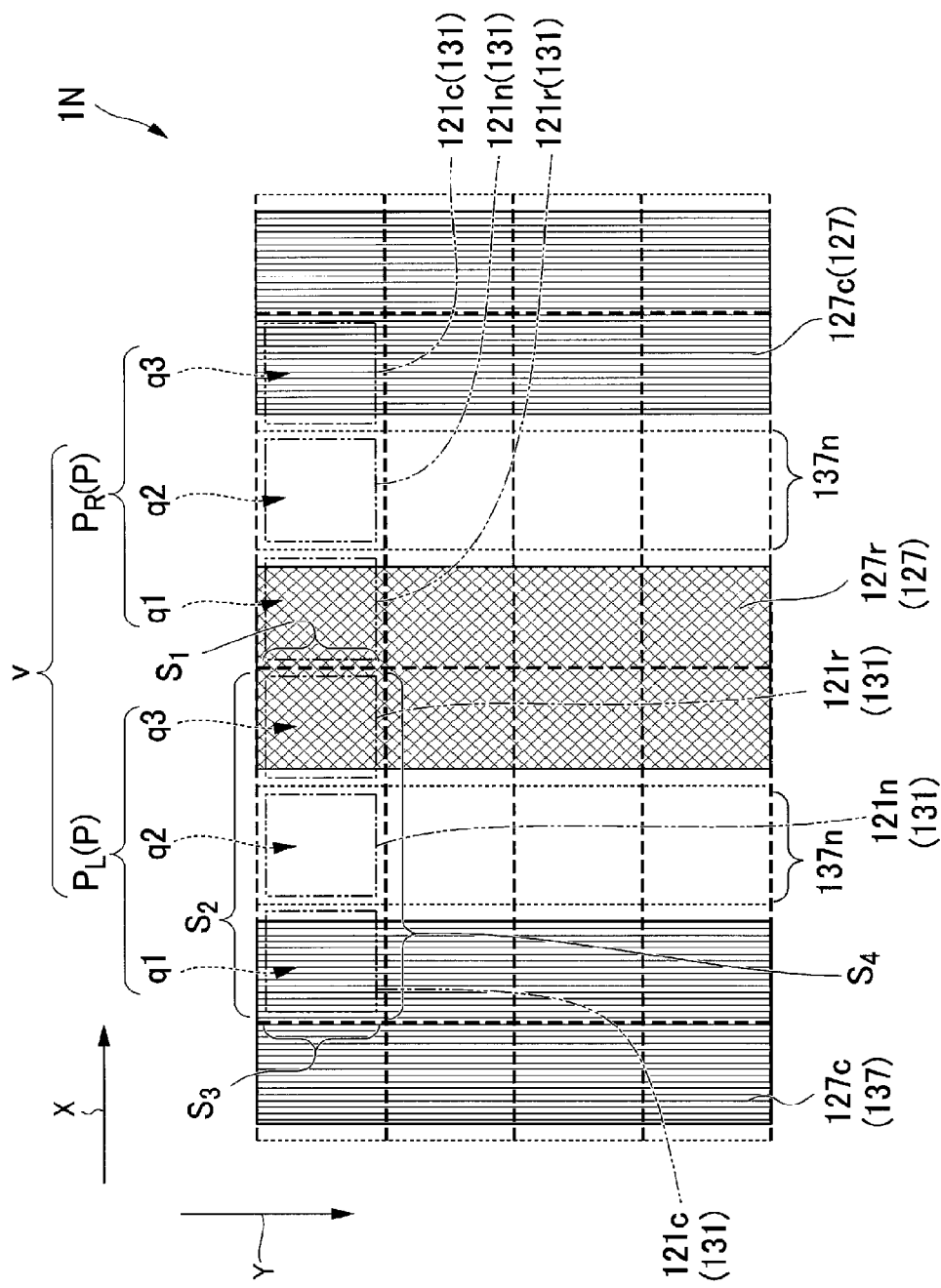
FIG. 16 is a schematic plan view illustrating a configuration of a main part of a modified example (sixth modified example) of the reflective display apparatus according to the eighth embodiment of the present invention.

FIG. 16 is a schematic plan view illustrating a configuration of a main part of the reflective display apparatus of the modified example (sixth modified example) of the eighth embodiment of the present invention.

As the main part is illustrated in FIG. 16, the reflective display panel 1N (reflective display apparatus) of this modified example includes a first electrode layer 131 and a color filter layer 137 instead of the first electrode layer 121 and color filter layer 127 of the reflective display panel 1M according to the eighth embodiment.

The pixels P of the reflective display panel 1N according to the present modified example are each consist of three subpixels, whereas the pixels P of the reflective display panel 1N according to the eighth embodiment are each consist of four subpixels. More specifically, the configuration of the reflective display panel 1N is the same as that of the eighth embodiment from which the subpixel q3 is omitted.

The following description will center on points that differ from the eighth embodiment.

As same as the eighth embodiment, the first electrode layer 131 includes a first color subpixel electrode 121r, a second color subpixel electrode 121c, and an achromatic color subpixel electrode 121n.

The first electrode layer 131 differs from the first electrode layer 121; two first color subpixel electrodes 121r, one achromatic color subpixel electrode 121n, and two second color subpixel electrodes 121c are arranged repeatedly in this order in the X direction.

Three subpixels q1, q2, and q3 facing a region where the second color subpixel electrode 121c, the achromatic color subpixel electrode 121n, and the first color subpixel electrode 121r are arranged in this order in the X direction constitute a pixel $P_L$ (refer to the thick broken lines illustrated in FIG. 16) which is a display unit of double color display in the reflective display panel 1N. The X direction width of the pixel $P_L$ is 3·$W_X$, and the Y direction width is $W_Y$.

The three subpixels q1, q2, and q3 facing the region in which the first color subpixel electrode 121r, the achromatic color subpixel electrode 121n, and the second color subpixel electrode 121c are arranged in this order constitute a pixel $P_R$ (refer to the thick broken lines illustrated in FIG. 16) which is a display unit of double color display in the reflective display panel 1N. The X direction width and the Y direction width of the pixel $P_R$ are 3·$W_X$ and $W_Y$, respectively.

In the following description, the pixels $P_L$, $P_R$ may be collectively referred to as pixels P.

The pixels P in this modified example differ from the eighth embodiment; the non-colored region 127n having an X direction width of 2·$W_X$ in the eighth embodiment is replaced with the non-colored region 137n having an X direction width of $W_X$.

The outer shape of the pixel $P_L$ is such that the sides $S_3$ and $S_1$ extending in the Y direction are arranged in this order in the X direction and one of them is the opposite side of another. The outer shape of the pixel $P_L$ is such that the sides $S_2$ and $S_4$ extending in the X direction are arranged in this order in the Y direction and one of them is the opposite side of another. Although not specifically illustrated, the outer shape of the pixel $P_R$ is also the same.

The color filter layer 137 is similar to the color filter layer 127 in the eighth embodiment except that the first colored layer 127r in the pixel $P_L$ overlaps the subpixel q3 and the second colored layer 127c in the pixel $P_R$ overlaps the subpixel q3.

In the reflective display panel 1N of this modified example, the colored layers each constitute a traversing colored layer that overlaps two pixels in the X direction, and thus double color display is performed based on image signals of double color display.

The colored portion area ratio in the subpixels on which the colored layers are arranged is the same as in the eighth embodiment. Therefore, with the reflective display panel 1N, it is possible to prevent the decrease of chroma of the display colors as compared with the comparative example described above in the first embodiment.

Ninth Embodiment

A reflective display apparatus according to a ninth embodiment of the present invention will now be described.

Figure 17A:
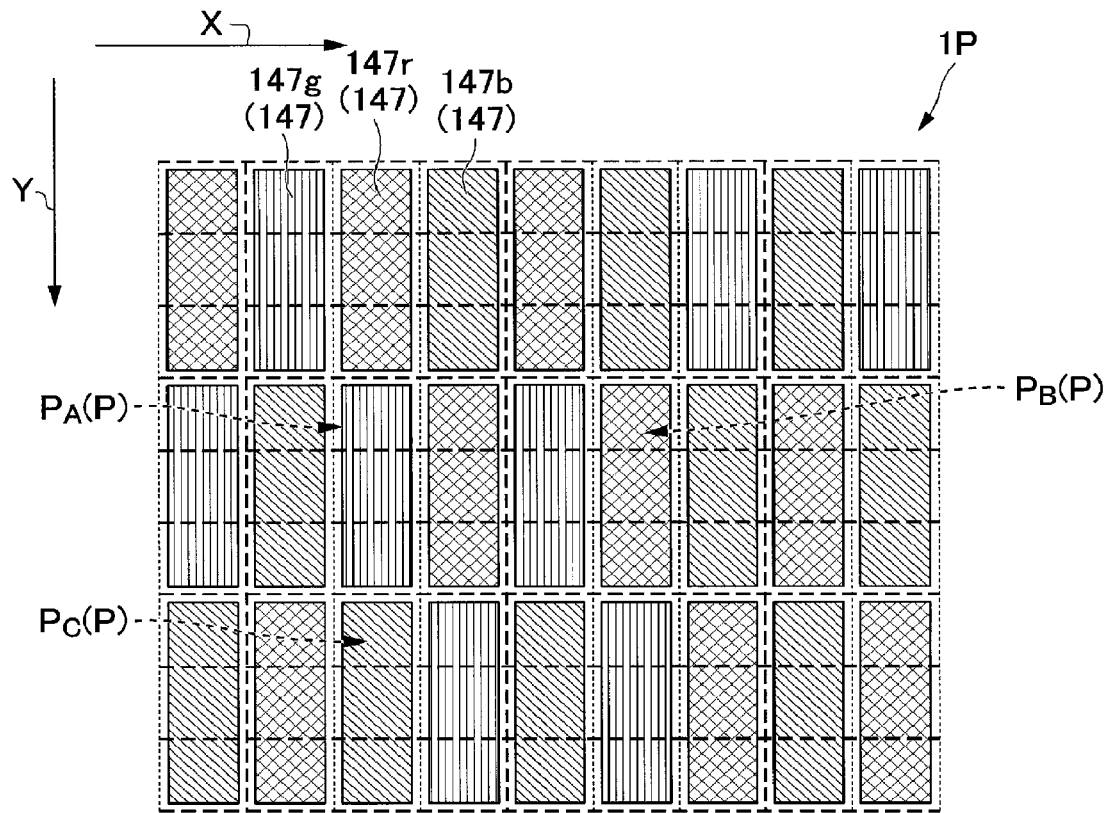
FIG. 17A is a schematic plan view illustrating a configuration of a main part of a reflective display apparatus according to a ninth embodiment of the present invention.
Figure 17B:
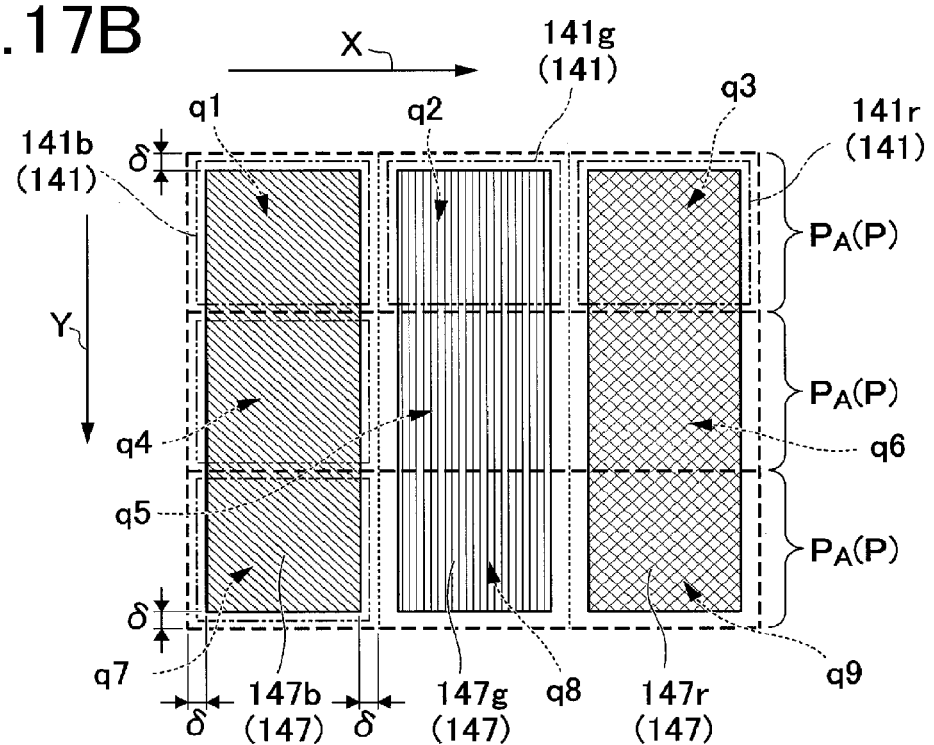
FIG. 17B is a schematic plan view illustrating a configuration of a main part of the reflective display apparatus according to the ninth embodiment of the present invention, and is a partial enlarged view of FIG. 17A.

FIG. 17A is a schematic plan view illustrating a configuration of a main part of the reflective display apparatus according to the ninth embodiment of the present invention. FIG. 17B is an enlarged partial view of FIG. 17A.

As the main part is illustrated in FIG. 17A, the reflective display panel 1P (reflective display apparatus) according to the present embodiment includes a first electrode layer 141 and a color filter layer 147 instead of the first electrode layer 131 and the color filter layer 137 of the reflective display panel 1N of the sixth modified example of the eighth embodiment.

In the reflective display panel 1P, a colored layer having a rectangular shape in plan view that is elongated in the Y direction is arranged two-dimensionally with gaps in the X direction and the Y direction, and full color display is performed in each pixel, whereas the colored layer of the sixth modified example traverses the effective display area in the Y direction.

The following description will center on the points that differ from the sixth modified example.

As illustrated in FIG. 17B, the first electrode layer 141 includes a first color subpixel electrode 141r, a second color subpixel electrode 141g, and a third color subpixel electrode 141b instead of the first color subpixel electrode 121r, the second color subpixel electrode 121c, and the achromatic color subpixel electrode 121n in the sixth modified example.

In the following description, when the first color subpixel electrode 141r, the second color subpixel electrode 141 g, and the third color subpixel electrode 141b are collectively referred to, they may be expressed as "the subpixel electrodes in the present embodiment" or simply "the subpixel electrodes" in order to simplify explanation.

The first color subpixel electrode 141r, the second color subpixel electrode 141g, and the third color subpixel electrode 141b are driving electrodes for applying drive voltages to respective predetermined regions for driving the reflective display layer 13 in order to control the tone of the first color, the second color, and the third color used for full color display.

The subpixel electrodes in the present embodiment have a configuration similar to that of the subpixel electrodes in the sixth modified example, except for being driven by image signals of full color display, and the positions inside the pixels differ according to the arrangement of the colored layers described later.

As illustrated in FIG. 17A, similarly to a pixel P in the sixth modified example, a pixel P in the present embodiment has a rectangular shape in plan view that is long in the X direction. Therefore, the pixels P in the present embodiment are divided into three subpixels according to three subpixel electrodes arranged in the X direction. The pixels P of this embodiment are classified into three types of pixels $P_A$, $P_B$, and $P_C$ according to the arrangement of the subpixel electrodes.

As illustrated in FIG. 17B, in the pixel $P_A$, a third color subpixel electrode 141b, a second color subpixel electrode 141g, and a first color subpixel electrode 141r are arranged in this order in the X direction. Three pixels $P_A$ are arranged adjacent to each other in the Y direction. The three pixels $P_A$ constitute a first pixel group. The first pixel group is configured by arranging subpixels into a 3×3 rectangular lattice shape. The first pixel group constitutes a repeating unit arranged with a pitch of $9 \cdot W_X$ in the X direction and a pitch of $9 \cdot W_Y$ in the Y direction.

Although not illustrated, in the pixel $P_B$, a second color subpixel electrode 141g, a first color subpixel electrode 141r, and the third color subpixel electrode 141b are arranged in this order in the X direction. In the pixel $P_C$, a first color subpixel electrode 141r, a third color subpixel electrode 141b, and a second color subpixel electrode 141g are arranged in this order in the X direction.

Similarly to the pixels $P_A$, three pixels of $P_B$ and three pixels of $P_C$ are arranged in the Y direction, and constitute a second pixel group and a third pixel group, respectively. The second pixel group and the third pixel group are repeating units having the same pitch as the first pixel group.

The arrangement order of the first, second, and third pixel groups is not limited. In the present embodiment, as an example, the first, second, and third pixel groups are arranged in this order in the X direction, and the first, third, and second pixel groups are arranged in this order in the Y direction.

In the following description, when the first, second, and third pixel groups are collectively referred to, they may be expressed as "the pixel groups".

The color filter layer 147 includes a first colored layer 147r, a second colored layer 147g, and a third colored layer 147b (colored layer, traversing colored layer, pixel boundary traversing colored layer) instead of the first colored layer 127r and the second colored layer 127c of the color filter layer 127 of the sixth modified example.

In the following description, when the first colored layer 147r, the second colored layer 147g, and the third colored layer 147b are referred to collectively, they may be expressed as "the colored layers in this embodiment" or simply "the colored layers" in order to simplify explanation.

The first colored layer 147r (second colored layer 147g, third colored layer 147b) has a configuration similar to that of the first colored layer 17r (second colored layer 17g, third colored layer 17b) in the first embodiment except that the shape in plan view is a rectangular shape that is longer in the Y direction, and the arrangement position differs.

The X direction width of the colored layers is $W_X - 2 \cdot \delta$, and the Y direction width is $3 \cdot W_Y - 2 \cdot \delta$.

As illustrated in the example of the first pixel group in FIG. 17B, the first colored layer 147r (second colored layer 147g, third colored layer 147b) is arranged in a position facing the first color subpixel electrodes 141r (second color subpixel electrodes 141g, third color subpixel electrodes 141b) in the pixel groups.

For example, three subpixels corresponding to each of three pixels $P_A$ of the first pixel group are (q1, q2, q3), (q4, q5, q6), and (q7, q8, q9) in the Y direction. The order of the signs in parentheses represents the order in the X direction.

Here, in plan view, the first colored layer 147r is arranged to overlap the subpixels q3, q6, and q9. The second colored layer 147g is arranged to overlap the subpixels q2, q5, and q8. The third colored layer 147b is arranged to overlap the subpixels q1, q4, and q7.

The colored layers are arranged with gaps δ between each colored layer and the boundary of the pixel P or between each colored layer and the boundary of the subpixel in the X direction. Both edges in the Y direction of the colored layers are arranged with gaps δ between each colored layer and the boundary of the pixel P in the Y direction.

With this kind of configuration, in the reflective display panel 1P according to the present embodiment, in the pixels P, the first colored layer 147r, the second colored layer 147g, and the third colored layer 147b overlap three subpixels in the X direction. These subpixels are driven by the first color subpixel electrode 141r, the second color subpixel electrode 141g, and the third color subpixel electrode 141b, respectively.

In the pixel groups, the first colored layer 147r (second colored layer 147g, third colored layer 147b) overlaps three pixels P arranged in the Y direction, and is a pixel boundary traversing colored layer that traverses two boundaries between the pixels P in the pixel groups.

Similarly to the first embodiment, the reflective display panel 1P according to the present embodiment can perform full color display for each pixel according to image signals of full color display.

In the subpixels q1, q2, q3, q7, q8, and q9 where both edges in the Y direction of the colored layers are overlapped, the colored portion area ratio in the subpixels in which the colored layers are arranged is γ expressed by the above-described Equation (3).

In the subpixels q4, q5, and q6 where the middle portions of the respective colored layers overlap, the colored portion area ratio is μ in the following Equation (8).

Equation 8

$$\mu = \frac{(W_X - 2\cdot\delta)\cdot W_Y}{W_X \cdot W_Y} \quad (8)$$

In the reflective display panel 1P according to the present embodiment, the colored layers are pixel boundary traversing colored layers that overlap three subpixels, so the colored portion area ratio is higher than in the case of not including transverse colored layers. Therefore, with the reflective display panel 1P, it is possible to prevent the decrease of chroma of the display colors as compared with the case where the traversing colored layers are not included.

Tenth Embodiment

A reflective display apparatus according to a tenth embodiment of the present invention will now be described.

Figure 18:
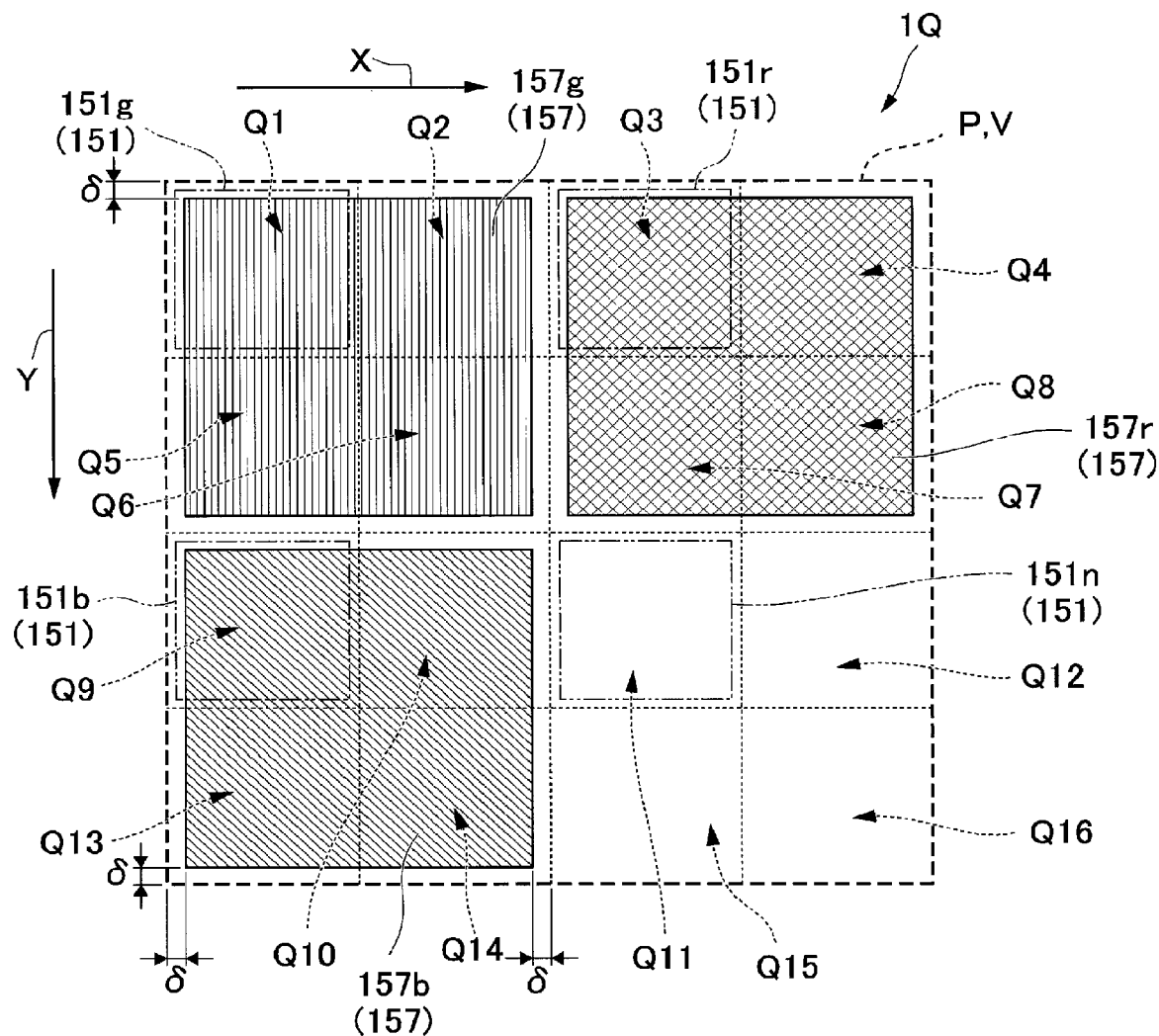
FIG. 18 is a schematic plan view illustrating a configuration of a main part of a reflective display apparatus according to a tenth embodiment of the present invention.

FIG. 18 is a schematic plan view illustrating a configuration of a main part of the reflective display apparatus according to the tenth embodiment of the present invention.

As illustrated in the main part in FIG. 18, the reflective display panel 1Q (reflective display apparatus) according to the present embodiment includes a first electrode layer 151 and a color filter layer 157 instead of the first electrode layer 11 and the color filter layer 17 of the reflective display panel 1A according to the first embodiment.

FIG. 18 illustrates a configuration in plan view of one pixel P of the present embodiment. As will be described later, the pixels P of the present embodiment differ from the first embodiment in the configuration of the subpixels; however, similarly to the first embodiment, the pixels P are arranged in a rectangular lattice shape of which the X direction and the Y direction are taken to be a first and second arrangement direction, respectively. Therefore, the pixels P of the present embodiment constitute a repeating unit V in the X direction and the Y direction.

The following description will center on differences from the first embodiment.

The first electrode layer 151 includes a first color subpixel electrode 151r, a second color subpixel electrode 151g, a third color subpixel electrode 151b, and an achromatic color subpixel electrode 151n instead of the first color subpixel electrode 11r, the second color subpixel electrode 11g, the third color subpixel electrode 11b, and the achromatic color subpixel electrode 11n of the first embodiment.

In the following description, when the first color subpixel electrode 151r, the second color subpixel electrode 151g, the third color subpixel electrode 151b, and the achromatic color subpixel electrode 151n are collectively referred to, they may be expressed as "the subpixel electrodes in the present embodiment" or simply "the subpixel electrodes" in order to simplify explanation.

The first color subpixel electrode 151r, the second color subpixel electrode 151g, and the third color subpixel electrode 151b are driving electrodes that apply driving voltages to predetermined regions for driving the reflective display layer 13 in order to control the tone of a first color, second color, third color, and achromatic color used for full color display.

The subpixel electrodes in this embodiment have a configuration similar to that of the subpixel electrodes in the first embodiment except that the positions in the pixels are different according to the arrangement of the colored layers described later.

The subpixels constitute 2×2 rectangular lattice shaped subpixel electrode groups in plan view. In the following description, when the subpixel electrode groups are distinguished, subpixel electrode groups constituted by the first color subpixel electrode 151r, the second color subpixel electrode 151g, the third color subpixel electrode 151b, and the achromatic color subpixel electrode 151n are referred to as first, second, third, and fourth subpixel electrode groups, respectively.

As illustrated in FIG. 18, in the pixels P, the first to fourth subpixel electrode groups are arranged in a 2×2 rectangular lattice shape in plan view. The second subpixel electrode group and the first subpixel electrode group are arranged in this order in the X direction. The second subpixel electrode group and the third subpixel electrode group are arranged in this order in the Y direction. The third subpixel electrode group and the fourth subpixel electrode group are arranged in this order in the X direction. Therefore, the first to fourth subpixel electrode groups are arranged in this order counterclockwise in FIG. 18.

With this kind of a configuration, the subpixel electrodes divide the reflective display layer 13 into subpixels that are driving units whose reflectance can be changed.

Identical driving voltages may be applied to the subpixel electrodes included in the subpixel electrode groups, or non-identical driving voltages may be applied thereto. In the case where a non-identical driving voltage is applied, the display color corresponding to the subpixel electrode group can be represented by four times the number of tones of the number of tones of the subpixel electrodes.

In the present embodiment, the pixels P are divided into 16 subpixels Q1 to Q16 by the subpixel electrodes arranged in a 4×4 rectangular lattice shape in plan view. The four sub-pixels Q1 to Q4 (Q5 to Q8, Q9 to Q12, Q13 to Q16) are arranged in this order in the X direction. The four subpixels Q1, Q5, Q9, and Q13 are arranged in this order in the Y direction.

The first subpixel electrode group composed of the first color subpixel electrode 151r controls the reflectance of the subpixels Q3, Q4, Q7, and Q8 as the first subpixel group according to the image signals corresponding to the first color.

The second subpixel electrode group composed of the second color subpixel electrode 151g controls the reflectance of the subpixels Q1, Q2, Q5, and Q6 as the second subpixel group according to the image signals corresponding to the second color.

The third subpixel electrode group composed of the third color subpixel electrode 151b controls the reflectance of the subpixels Q9, Q10, Q13, and Q14 as the third subpixel group according to the image signals corresponding to the third color.

The fourth subpixel electrode group composed of the achromatic color subpixel electrode 151n controls the reflectance of the subpixels Q11, Q12, Q15, and Q16 as the fourth subpixel group, according to the image signals corresponding to the achromatic color.

In the following description, when the first to fourth subpixel electrode groups and the first to fourth subpixel groups are referred to collectively, they may be expressed as "the subpixel electrode groups" and "the subpixel groups" in order to simplify explanation.

In the present embodiment, the plan view shape of the pixels P is a $4 \cdot W_X \times 4 \cdot W_Y$ rectangular shape. The plan view shape of the subpixel groups is a $2 \cdot W_X \times 2 \cdot W_Y$ rectangular shape.

The color filter layer 157 includes a first colored layer 157r, a second colored layer 157g, and a third colored layer 157b (colored layer, traversing colored layer) instead of the first colored layer 17r, the second colored layer 17g, and the third colored layer 17b of the color filter layer 17 described above.

In the following description, when the first colored layer 157r, the second colored layer 157g, and the third colored layer 157b are referred to collectively, they may be expressed as "the colored layers in this embodiment" or simply "the colored layers" in order to simplify explanation.

The first colored layer 157r (second colored layer 157g, third colored layer 157b) has a configuration similar to that of the first colored layer 17r (second colored layer 17g, third colored layer 17b) in the first embodiment except that the size in plan view is different.

The width in the X direction of the colored layers is $2 \cdot (W_X - \delta)$ and the width in Y direction is $2 \cdot (W_Y - \delta)$.

The first colored layer 157r (second colored layer 157g, third colored layer 157b) is arranged so that the centroid of the first colored layer 157r coincides with the center of the first (second, third) subpixel group.

Therefore, a gap $\delta$ is formed between the colored layers and the boundary of the subpixel groups that face the colored layers.

Furthermore, the colored layers overlap four subpixels across the inner boundaries of the four subpixels constituting the subpixel groups in plan view. Therefore, the colored layers in the present embodiment each constitute a traversing colored layer that overlaps four subpixels as viewed in a direction opposite to the reflective display layer 13.

The subpixels of the fourth subpixel group each constitute a non-colored subpixel because none of the colored layers face the subpixels. The region of the fourth subpixel group is a non-colored region.

The reflective display panel 1Q according to the present embodiment can perform full color display for each pixel according to image signals of full color display.

As in the first embodiment, the colored portion area ratio in the subpixels in which the colored layers are arranged is a in the Equation (1).

Therefore, the colored portion area ratio is improved as compared with the case where four colored layers are arranged to be separated from each other and to face four subpixels constituting a subpixel group.

In the reflective display panel 1Q according to the present embodiment, the colored layers are traversing colored layers that overlap four subpixels. Therefore, with the reflective display panel 1Q, it is possible to prevent the decrease of chroma of the display colors as compared with the case where the traversing colored layers are not included.

Eleventh Embodiment

A reflective display apparatus according to an eleventh embodiment of the present invention will now be described.

Figure 19A:
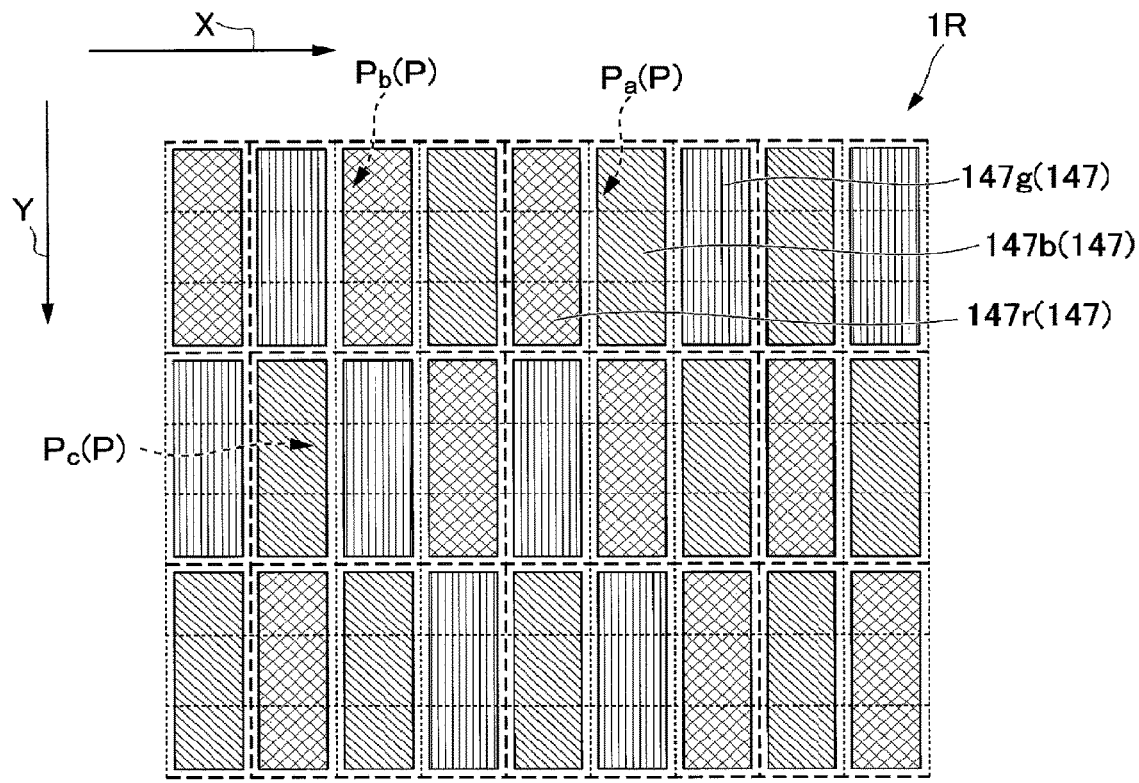
FIG. 19A is a schematic plan view illustrating a configuration of a main part of a reflective display apparatus according to an eleventh embodiment of the present invention.
Figure 19B:
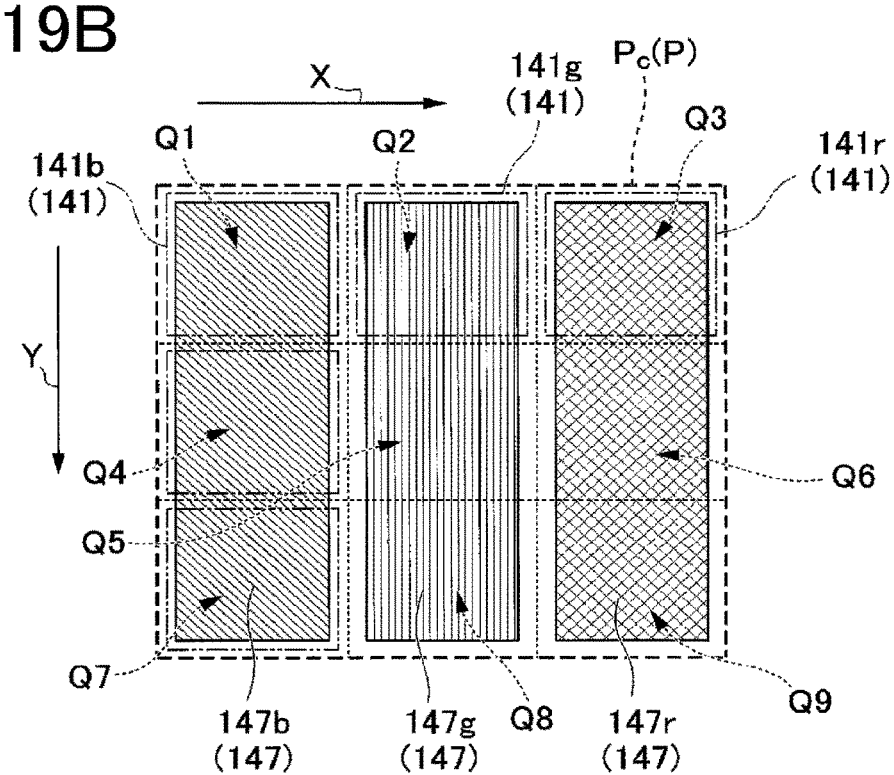
FIG. 19B is a schematic plan view illustrating a configuration of a main part of the reflective display apparatus according to the eleventh embodiment of the present invention, and is a partial enlarged view of FIG. 19A.

FIG. 19A is a schematic plan view illustrating a configuration of a main part of the reflective display apparatus according to the eleventh embodiment of the present invention. FIG. 19B is a partially enlarged view of FIG. 19A.

As the main part is illustrated in FIG. 19A, the reflective display panel 1R (reflective display apparatus) according to the present embodiment has a configuration similar to that of the reflective display panel 1P according to the ninth embodiment except for the pixel configuration. The reflective display panel 1R includes pixels $P_a$, $P_b$, and $P_c$ instead of the first to third pixel groups in the ninth embodiment. In the following description, when distinction between the pixels $P_a$, $P_b$, and $P_c$ is unnecessary, the pixels are simply referred to as pixels P.

The following description will center on points that differ from the ninth embodiment.

In the ninth embodiment, the pixels $P_A$, $P_B$, and $P_C$ are configured by arranging three rows of three 1×3 subpixels aligned in the X direction in the Y direction. Furthermore, first to third pixel groups are formed by arranging three respective rows of the pixels in the Y direction. As a result, in the first (second, third) pixel group, the pixels $P_A$ ($P_B$, $P_C$) are independently driven according to corresponding pixel signals, respectively, whereby full color display is possible for each.

In contrast, in the present embodiment, as illustrated in the example of the case of pixel $P_b$ in FIG. 19B, the subpixels Q1 to Q9 corresponding to the subpixels q1 to q9 in the ninth embodiment constitute one pixel P.

The difference between the pixels $P_a$, $P_b$ and $P_c$ is the arrangement order of the respective colored layers in each. The arrangement order of the respective colored layers in the pixel Pa ($P_b$, $P_c$) in the X direction is the same arrangement order in the X direction of the colored layers in the pixel $P_A$ ($P_B$, $P_C$) in the ninth embodiment.

In plan view, in a state of respectively overlapping three subpixels arranged in the Y direction, for example, subpixels [Q1, Q4, Q7], [Q2, Q5, Q8], and [Q3, Q6, Q9], the colored layers of the pixels P are arranged adjacent to each other with gaps 2·δ in the Y direction.

With this kind of configuration, in the reflective display panel 1R according to the present embodiment, in the pixels P, the first colored layer 147r, the second colored layer 147 g, and the third colored layer 147b respectively overlap three subpixels arranged in the Y direction. These subpixels are respectively driven by three first color subpixel electrodes 141r, three second color subpixel electrodes 141g, and three third color subpixel electrodes 141b arranged in the Y direction.

Three subpixel electrodes overlapping one colored layer may be applied with identical driving voltages or may be applied with non-identical driving voltages. In the case where non-identical driving voltages are applied, the display color corresponding to one colored layer can be represented by three times the number of tones of the number of tones of the three subpixel electrodes.

In the pixels P, the first colored layer 147r (second colored layer 147g, third colored layer 147b) of the present embodiment is a traversing colored layer that overlaps three subpixels arranged in the Y direction.

Similarly to the first embodiment, the reflective display panel 1R according to the present embodiment can perform full color display for each pixel according to image signals of full color display.

The colored portion area ratio in the subpixels in which the colored layers are arranged is the same colored portion area ratio in the ninth embodiment.

In the reflective display panel 1R according to the present embodiment, the colored layers are traversing colored layers that overlap three subpixels, so the colored portion area ratio is higher than in the case of not including the traversing colored layers. Therefore, with the reflective display panel 1R, it is possible to prevent a decrease of chroma of the display colors as compared with the case where the traversing colored layers are not included.

In the description of the embodiments and modified examples described above, each colored layer is a traversing colored layer. However, of the colored layers arranged in one pixel, at least one colored layer may be a traversing colored layer.

In the description of the first to eighth and tenth embodiments, and the modified examples, the colored portion area ratios in the subpixels in which the colored layers are arranged are equal to each other. However, for example, two or more of the colored layers may have colored portion area ratios that differ from each other.

In the description of the first modified example of the first embodiment, the colored layers have first to fourth colors. However, the fourth colored layer 27y may be colored in any one of the first color to the third color. For example, when the first to third colors are red, green, and blue, the fourth colored layer 27y may be colored in green.

In each of the embodiments and modified examples described above, the X direction and the Y direction are orthogonal. However, the X direction and the Y direction may intersect at an angle other than 90°. In this case, the rectangular shape of pixels in the above description, for example, may be read as quadrilateral shape or the like as appropriate.

In the description of the embodiments and modified examples described above, the plan view shape of the subpixels is a quadrilateral or a triangle. However, the shape of the subpixels may be a polygonal shape other than a quadrilateral or a triangle.

In the embodiments and modified examples described above, the arrangement the pixels in plan view is a rectangular lattice shape, a diagonal lattice shape, or the like. However, for example, the arrangement of the pixels may be another two-dimensional arrangement such as a triangular lattice shape or the like.

In the ninth and eleventh embodiments, three types of the arrangement of the repeating pattern of the colored layers are described. However, these are only examples, and the arrangement pattern of the colored layers is not limited to these. In addition, the pixel groups are described as constituting a repeating unit arranged with a pitch of $9 \cdot W_X$ in the X direction and a pitch of $9 \cdot W_Y$ in the Y direction. However, this is only an example, and the repeating unit of the pixel groups is not limited to this.

EXAMPLES

Examples 1 and 2 of the reflective display apparatus according to the first and fifth embodiments will now be described together with Comparative Examples 1 and 2.

The configurations and evaluation results of Examples 1 and 2 and Comparative Examples 1 and 2 are presented in Table 1 below.

TABLE 1

| | | Colored Portion Area Ratio (%) | Color Reproducibility | | |
| | | | Chroma C* | | |
| | Color Display | NTCS Ratio (%) | | Red Display | Cyan Display |
|---|---|---|---|---|---|
| Example 1 | Full Color | 93 | 10.2 | — | — |
| Example 2 | Double Color | 93 | — | 17.2 | 16.3 |
| Comparative Example 1 | Full Color | 87 | 9.0 | — | — |
| Comparative Example 2 | Double Color | 87 | — | 16.0 | 15.2 |

Example 1

Example 1 in Table 1 is an example of the reflective display panel 1A according to the first embodiment. In other words, in order to perform full color display, the colored layers of the color filter layer 17 overlap four pixels.

The reflective display panel 1A of Example 1 is manufactured as follows.

A first laminate was formed by laminating a second electrode layer 14 made of indium tin oxide (ITO) and a reflective display layer 13 made of an electrophoretic display medium in this order on a substrate 15 made of PET.

After that, a first electrode layer 11 made of ITO was formed on a base 10 made of glass. On the first electrode layer 11, the reflective display layer 13 was laminated via an adhesive layer 12 made of a transparent acrylic adhesive.

A polyester resin-based resin NS-141 LX (trade name; manufactured by Takamatsu Oil & Fat Co., Ltd.) for an inkjet receptive layer was continuously coated on the substrate 15 in this state using a comma coater.

After this, the resin for an inkjet receptive layer was dried in a vacuum dryer for 5 minutes. As a result, an ink fixing layer 16 having an average film thickness of 10 μm was formed.

The first electrode layer 11 was formed so that the X direction width $W_X$ and the Y direction width $W_Y$ of the subpixels in the pixels P were 200 μm and 200 μm, respectively.

The ink for forming a color filter layer 17 was produced as follows.

In the present example, red (hereinafter referred to as R) was used for the first color, green (hereinafter referred to as G) was used for the second color, and blue (hereinafter referred to as B) was used for the third color.

First, as shown in Table 2 below, a red (R) dispersion liquid, a green (G) dispersion liquid, and a blue (B) dispersion liquid containing R, G and B colorants were prepared, respectively

TABLE 2

| Dispersion Liquid | Solvent | | Dispersant | | Pigment | |
|---|---|---|---|---|---|---|
| | Substance Name | Added Amount (Parts by Weight) | Product Name | Added Amount (Parts by Weight) | C.I. No. | Added Amount (Parts by Weight) |
| Red | DGMEA | 70 | Solsperse (registered trademark) 20000 (trade name; manufactured by Lubrizol Corporation) | 10 | C.I. Pigment Red 254 | 19 |
| | | | | | C.I. Pigment Yellow 150 | 1 |
| Green | DGMEA | 70 | Solsperse (registered trademark) 20000 (trade name; manufactured by Lubrizol Corporation) | 10 | C.I. Pigment Green 58 | 15 |
| | | | | | C.I. Pigment Yellow 150 | 5 |
| Blue | DGMEA | 70 | Solsperse (registered trademark) 20000 (trade name; manufactured by Lubrizol Corporation) | 10 | C.I. Pigment Blue 15:6 | 19 |
| | | | | | C.I. Pigment Violet 23 | 1 |

As shown in Table 2, the R dispersion liquid was prepared by mixing 10 parts by mass of a dispersant and 20 parts by mass of R color pigment to 70 parts by mass of diethylene glycol monoethyl ether acetate (hereinafter abbreviated as DGMEA).

Solsperse (registered trademark) 20000 (trade name; manufactured by Lubrizol Corporation) was used as the dispersant. As the pigment, 19 parts by mass of C.I. Pigment Red 254, and 1 part by mass of C.I. Pigment Yellow 150 were used.

In order to sufficiently disperse the pigment in this mixed solution, a bead mill dispersion disperser was used. An R dispersion liquid was prepared in this way.

The G dispersion liquid was prepared similarly to the R dispersion liquid, except that the pigment in the R dispersion liquid was changed to C.I. Pigment Green 58 (15 parts by mass) and C.I. Pigment Yellow 150 (5 parts by mass).

The B dispersion liquid was prepared similarly to the R dispersion liquid, except that the pigment in the R dispersion liquid was changed to C.I. Pigment Blue 15:6 (19 parts by mass) and C.I. Pigment Violet 23 (1 part by mass).

The red (R) ink, green (G) ink, and blue (B) ink were prepared by adding a binder resin and solvent to each of the obtained R dispersion liquid, G dispersion liquid, and B dispersion liquid, and stirring them well. The compositions of the inks are shown in the following Table 3.

After that, an inkjet printing apparatus applied the prepared R ink, G ink, and B ink to the ink fixing layer 16 to render patterns of the first colored layer 17r, the second colored layer 17g, and the third colored layer 17b.

As an inkjet printing apparatus, an inkjet printing apparatus equipped with 12 pl, 180 dpi (180 dots per inch (2.54 cm)) inkjet heads manufactured by Seiko Instruments Inc. was used.

The colored layers, presuming a gap of δ=7 (μm), were formed so that the width in the X direction was 193 μm, and the width in the Y direction was 193 μm.

As a result, as shown in Table 1, the colored portion area ratio in the subpixels in which the colored layers were arranged was 93%.

The coated ink was dried in a vacuum dryer for 5 minutes. As a result, the color filter layer 17 was formed.

After this, a protective layer 18 made of polyimide was laminated on the color filter layer 17.

In this way, the reflective display panel 1A of Example 1 corresponding to the first embodiment was manufactured.

Example 2

The second example in Table 1 is an example of the reflective display panel 1G according to the fifth embodiment. In other words, in order to perform double color

TABLE 3

| Ink | Dispersion Liquid | | Binder Resin | | Solvent | |
|---|---|---|---|---|---|---|
| | Name | Added Amount (Parts by Weight) | Name | Added Amount (Parts by Weight) | Name | Added Amount (Parts by Weight) |
| Red Ink | Red dispersion liquid | 20 | Melamine resin | 20 | DGMEA | 60 |
| Green Ink | Green dispersion liquid | 20 | Melamine resin | 20 | DGMEA | 60 |
| Blue Ink | Blue dispersion liquid | 20 | Melamine resin | 20 | DGMEA | 60 |

As shown in Table 3, the R ink was prepared with 20 parts by mass of R dispersion liquid, 20 parts by mass of binder resin containing melamine resin, and 60 parts by mass of DGMEA which is an organic solvent.

MW-22 (trade name; manufactured by Sanwa Chemical Co., Ltd.) was used as the melamine resin.

The G ink and the B ink were prepared similarly to the R ink except that the R dispersion liquid in the R ink was changed to the G dispersion liquid and the B dispersion liquid, respectively.

display, the colored layers of the color filter layer 77 overlap four pixels. The first color and the second color of the double colors were red and cyan (hereinafter referred to as C), respectively.

The reflective display panel 1G of Example 2 was manufactured similarly to Example 1 except that the types and arrangement positions of the colored layers were different. The sizes in plan view of the subpixel electrodes, the subpixels, the pixels, and the colored layers were the same as those in the first embodiment.

Therefore, as shown in Table 1, the colored portion area ratio in the subpixels in which the colored layers were arranged in the present embodiment was also 93% as in Example 1.

The configuration of the red (R) dispersion liquid, the cyan (C) dispersion liquid, the red (R) ink, and the cyan (C) ink from which the first colored layer 77r and the second colored layer 77c were produced in this example were indicated in the following Table 4 and Table 5.

The NTSC ratio was calculated from values of reflectance measured by displaying black and white on the reflective display panel, and measured values of chromaticity in each color display of red, blue and green.

As a measuring instrument, a spectral color difference meter CM-700d (trade name; manufactured by Konica Minolta Co., Ltd.) was used. D65 light source was used as the light source, and the measurement spot diameter was set to Φ=8 (mm).

TABLE 4

| Dispersion Liquid | Solvent | | Dispersant | | Pigment | |
|---|---|---|---|---|---|---|
| | Substance Name | Added Amount (Parts by Weight) | Product Name | Added Amount (Parts by Weight) | C.I. No. | Added Amount (Parts by Weight) |
| Red | DGMEA | 70 | Solsperse (registered trademark) 20000 (trade name; manufactured by Lubrizol Corporation) | 10 | C.I. Pigment Red 254 | 19 |
| | | | | | C.I. Pigment Yellow 150 | 1 |
| Cyan | DGMEA | 70 | DISPER BYK (registered trademark) –111 (manufactured by BYK) | 10 | C.I. Pigment Blue 15:3 | 20 |

TABLE 5

| Ink | Dispersion Liquid | | Binder Resin | | Solvent | |
|---|---|---|---|---|---|---|
| | Name | Added Amount (Parts by Weight) | Name | Added Amount (Parts by Weight) | Name | Added Amount (Parts by Weight) |
| Red Ink | Red dispersion liquid | 20 | Melamine resin | 20 | DGMEA | 60 |
| Cyan Ink | Cyan dispersion liquid | 20 | Melamine resin | 20 | DGMEA | 60 |

As shown in the Table 4 and Table 5, the R dispersion liquid and the R ink were made of the same material and composition as in Example 1.

The C dispersion liquid was prepared in the same way as the R dispersion liquid except that the dispersant in the R dispersion liquid was changed to DISPER BYK (registered trademark)-111 (trade name; manufactured by BYK), and the pigment was changed to C.I. Pigment Blue 15:3 (20 parts by mass).

The C ink was prepared in the same way as the R ink except that the R dispersion liquid in the R ink was changed to the C dispersion liquid.

Comparative Examples 1, 2

Comparative Example 1 in Table 1 is different from Example 1 in that the arrangement and the shape in plan view of the colored layers in the comparative example of the first embodiment were used. Therefore, the colored portion area ratio in Comparative Example 1 was 87%.

Comparative Example 2 was prepared by eliminating the second colored layer 217g in Comparative Example 1, and changing the materials of the first colored layer 17r and the third colored layer 17b to the R ink and the C ink similar to those in Example 2. Therefore, the colored portion area ratios in Comparative Example 2 were 87% as in Comparative Example 1.

Evaluation

The reflective display panels of Examples 1 and 2 and Comparative Examples 1 and 2 were evaluated by measuring color reproducibility.

Color reproducibility in full color display was evaluated by the NTSC ratio.

Color reproducibility in double color display was evaluated by chroma C* in the R display and C display.

Chroma C* was calculated from measured values of brightness in the R display and the C display by the reflective display panel. The brightness was measured using the same measuring instrument and measurement conditions as in the case of the full-color display.

C* is the chroma ($C^*=\sqrt{(a^*)^2+(b^*)^2}$) expressed in the L*a*b* color system.

Evaluation Results

As shown in Table 1, the NTSC ratio of Example 1 was 10.2%. The NTSC ratio of Comparative Example 1 was 9.0%, so the color reproducibility of Example 1 was better than that of Comparative Example 1.

Chroma C* in Example 2 was 17.2 and 16.3 in the R display and the C display, respectively. In Comparative Example 2, Chroma C* in the R display and the C display were 16.0 and 15.2, respectively, so the color reproducibility of Example 2 was better than that of Comparative Example 2.

This is considered to be due to the fact that, in Examples 1 and 2, the colored portion area ratio was high as 93%, so the chromatic color component in the reflected light in the subpixels increased compared with Comparative Examples 1 and 2 in which the colored portion area ratio was 87%.

In this way, with the reflective display panels of Examples 1 and 2, chroma is higher compared with that of Comparative Examples 1 and 2, and vivid colors can be displayed.

Preferred embodiments and modified examples of the present invention, together with examples, have been described above; however, the present invention is not limited to these embodiments, modified examples, and practical examples. Additions, omissions, substitutions, and other changes in the configuration are possible without departing from the spirit of the present invention.

Moreover, the present invention is not limited by the description above, and is only limited by the scope of the appended claims.

For example, in the ninth and eleventh embodiments which do not have a non-colored region facing the achromatic color subpixel electrode, the achromatic color subpixel electrode and the non-colored region facing the achromatic color subpixel electrode may be added.

For example, by replacing the subpixels of the first to ninth embodiments and the like with a plurality of subpixels similar to those of the tenth and eleventh embodiments, traversing colored layers that are not pixel boundary traversing colored layers may be added.

The present application addresses the following. The conventional reflective display apparatus has the following problems.

In each of the apparatuses disclosed in Patent Literature 1 and 2, colored layers that are adjacent to each other are spaced apart from each other in order to avoid color mixing during manufacturing.

In the case where adjacent colored layers are partitioned by a bank, reflected light of external light is shielded by the bank, so there is a problem that the quantity of display light may decrease.

In the case where adjacent colored layers have gaps, the gaps between the colored layers can reflect external light, so a bright display screen can be obtained. However, in a unit pixel, the area occupied by the colored layer relatively decreases, so there is a problem that the chroma of the display color is inferior.

Taking into consideration the problems described above, an aspect of the present invention is to provide a reflective display apparatus capable of preventing a decrease of chroma of a display color.

The reflective display apparatus according to an aspect of the present invention includes a reflective display portion that is two-dimensionally partitioned with pixels having a plurality of subpixels as a unit and that can change the reflectance of each subpixel based on an image signal; and a plurality of colored layers that face the reflective display portion and that are arranged to overlap part of the pixels as viewed in the facing direction; where the plurality of colored layers include traversing colored layers that overlap two or more of the subpixels as viewed in the facing direction; and the plurality of colored layers are arranged so that two or more of the colored layers do not overlap for each subpixel as viewed in the facing direction.

In the reflective display apparatus described above, the plurality of colored layers may be two-dimensionally arranged with a gap in a first arrangement direction and in a second arrangement direction that crosses the first arrangement direction, and inside the region facing a pixel, the colored layers are arranged to be separated from each other and to overlap the subpixels without extending beyond the each subpixel boundary as viewed in the facing direction; and the traversing colored layers may include a pixel boundary traversing colored layer that overlaps a first subpixel included in a first pixel and a second subpixel included in a second pixel adjacent to the first pixel.

In the reflective display apparatus described above, the traversing colored layer that overlaps the first pixel as viewed in the facing direction may be the pixel boundary traversing colored layer.

In the reflective display apparatus described above, the pixels may be rectangular shaped; and the traversing colored layers may be arranged to face four of the pixels arranged in a rectangular lattice shape.

In the reflective display apparatus described above, the plurality of subpixels in the pixel may include a non-colored subpixel that does not overlap any of the plurality of colored layers as viewed in the facing direction.

In the reflective display apparatus described above, among the plurality of colored layers, colored layers that overlap a pixel as viewed in the facing direction may have colors different from each other.

In the reflective display apparatus described above, the plurality of colored layers may be one-dimensionally arranged with a gap in a first arrangement direction, and inside the region facing a pixel, the colored layers may be arranged to be separated from each other, and to overlap the subpixels without extending beyond the each subpixel boundary as viewed in the facing direction; and the traversing colored layers may include a pixel boundary traversing colored layer that overlaps a first subpixel included in a first pixel and a second subpixel included in a second pixel adjacent to the first pixel.

In the reflective display apparatus described above, inside the pixel boundary as viewed in the facing direction, the plurality of colored layers may be arranged to overlap the pixel and may be arranged with a gap therebetween.

In the reflective display apparatus described above, the plurality of colored layers may be arranged along a plurality of first rows and a plurality of second rows extending in a first arrangement direction; the plurality of first rows may be alternately arranged to be adjacent to the plurality of second rows along a second arrangement direction that crosses the first arrangement direction; and the colored layers arranged in the second row may be arranged at positions offset by one pixel along the first arrangement direction from the colored layers arranged in the first row.

With the reflective display apparatus of an aspect of the present invention, it is possible to prevent the decrease of chroma of the display colors.

REFERENCE SIGNS LIST 1A, 1B, 1C, 1D, 1E, 1F, 1G, 1H, 1J, 1K, 1L, 1M, 1N, 1P, 1Q, 1R . . . Reflective display panel (reflective display apparatus)
11, 21, 31, 41, 51, 61, 71, 81, 91, 101, 111, 121, 131, 141, 151 . . . First electrode layer
11r, 51r, 61r, 71r, 81r, 101r, 111r, 121r, 141r, 151r . . . First color subpixel electrode
11g, 51g, 61g, 71c, 81c, 101c, 111c, 121c, 141g, 151g . . . Second color subpixel electrode
11b, 51b, 61b, 141b, 151b . . . Third color subpixel electrode
11n, 51n, 61n, 71n, 81n, 101n, 121n, 151n . . . Achromatic color subpixel electrode
13 . . . Reflective display layer (reflective display portion)
13B . . . Black portion
13W . . . White portion
14 . . . Second electrode layer
16 . . . Ink fixing layer
17, 27, 37, 47, 57, 77, 87, 97, 107, 117, 127, 137, 147, 157 . . . Color filter layer
19 . . . Light-transmissive layer
17r, 37r, 57r, 77r, 87r, 107r, 117r, 127r, 147r, 157r . . . First colored layer (colored layer, traversing colored layer, pixel boundary traversing colored layer)
17g, 37g, 47g, 57g, 77c, 87c, 97c, 107c, 127c, 147g, 157g . . . Second colored layer (colored layer, traversing colored layer, pixel boundary traversing colored layer)
17b, 37b, 57b, 147b, 157b . . . Third colored layer (colored layer, traversing colored layer, pixel boundary traversing colored layer)
17n, 37n, 47n, 57n, 77n, 87n, 97n, 107n, 127n, 137n . . . Non-colored region
21y . . . Fourth color subpixel electrode 27y . . . Fourth colored layer (colored layer, traversing colored layer, pixel boundary traversing colored layer)
P, P1, P2, P3, P4, p1, p2, p3, p4, $P_R$, $P_L$, $P_A$, $P_B$, $P_C$, $P_a$, $P_b$, $P_c$ . . . Pixel
Q1, Q2, Q3, Q4, Q5, Q6, Q7, Q8, Q9, Q10, Q11, Q12, Q13, Q14, Q15, Q16, q1, q2, q3, q4, q5, q6, q7, q8, q9, T1, T2, T3, T4, t1, t2, t3, t4 . . . Subpixel
U, u, V, v . . . Repeating unit
R1 . . . First row
R2 . . . Second row
CF1 . . . First color filter unit
CF2 . . . Second color filter unit Obviously, numerous modifications and variations of the present invention are possible in light of the above teachings. It is therefore to be understood that within the scope of the appended claims, the invention may be practiced otherwise than as specifically described herein.

What is claimed is:

1. A reflective display apparatus, comprising:
a reflective display portion which is two-dimensionally divided into a plurality of pixels each having a plurality of subpixels and is configured to change reflectance of each subpixel based on an image signal; and
a plurality of colored layers facing the reflective display portion and partially overlapping the pixels as viewed in a facing direction in which the colored layers face the reflective display portion, the colored layers being formed without forming a black matrix, wherein
the colored layers include a plurality of traversing colored layers that each traverse two adjacent pixels and overlap more than one of the subpixels as viewed in the facing direction, and the colored layers are positioned such that at most one of the colored layers overlaps one of the subpixels as viewed in the facing direction, and
the plurality of colored layers and the reflective display portion are separated by a light-transmissive layer in which an electrode layer, a substrate, and an ink fixing layer are laminated, the electrode layer contacting the reflective display portion.

2. The reflective display apparatus according to claim 1, wherein the colored layers are two-dimensionally formed with a gap in each of a first direction and a second direction that crosses the first direction, the colored layers inside a region facing the pixels are separated from each other and overlap the subpixels without extending beyond a boundary of each of the subpixels as viewed in the facing direction, the pixels comprise a first pixel and a second pixel adjacent to the first pixel, and the traversing colored layers include a plurality of pixel boundary traversing colored layers that overlap a first subpixel included in the first pixel and a second subpixel included in the second pixel.

3. The reflective display apparatus according to claim 2, wherein the traversing colored layers that overlap the first pixel as viewed in the facing direction comprise the pixel boundary traversing colored layers.

4. The reflective display apparatus according to claim 3, wherein the pixels are rectangular shaped, and the traversing colored layers face four of the pixels positioned in a rectangular lattice form.

5. The reflective display apparatus according to claim 3, wherein the subpixels in the pixels include a non-colored subpixel that does not overlap the colored layers as viewed in the facing direction.

6. The reflective display apparatus according to claim 3, wherein one of the colored layers which overlaps one of the pixels as viewed in the facing direction and another of the colored layers which overlaps the one of the pixels as viewed in the facing direction have different colors.

7. The reflective display apparatus according to claim 2, wherein the pixels are rectangular shaped, and the traversing colored layers face four of the pixels positioned in a rectangular lattice form.

8. The reflective display apparatus according to claim 7, wherein the subpixels in the pixels include a non-colored subpixel that does not overlap the colored layers as viewed in the facing direction.

9. The reflective display apparatus according to claim 7, wherein one of the colored layers which overlaps one of the pixels as viewed in the facing direction and another of the colored layers which overlaps the one of the pixels as viewed in the facing direction have different colors.

10. The reflective display apparatus according to claim 2, wherein the subpixels in the pixels include a non-colored subpixel that does not overlap the colored layers as viewed in the facing direction.

11. The reflective display apparatus according to claim 10, wherein one of the colored layers which overlaps one of the pixels as viewed in the facing direction and another of the colored layers which overlaps the one of the pixels as viewed in the facing direction have different colors.

12. The reflective display apparatus according to claim 2, wherein one of the colored layers which overlaps one of the pixels as viewed in the facing direction and another of the colored layers which overlaps the one of the pixels as viewed in the facing direction have different colors.

13. The reflective display apparatus according to claim 1, wherein the colored layers are one-dimensionally formed with a gap in a first direction, the colored layers inside a region facing the pixels are separated from each other and overlap the subpixels without extending beyond a boundary of each subpixel boundary as viewed in the facing direction, the pixels comprise a first pixel and a second pixel adjacent to the first pixel, and the traversing colored layers include a plurality of pixel boundary traversing colored layers that overlap a first subpixel included in the first pixel and a second subpixel included in the second pixel.

14. The reflective display apparatus according to claim 1, wherein the colored layers overlapping one of the pixels inside a boundary of the one of the pixels as viewed in the facing direction are formed with a gap therebetween.

15. The reflective display apparatus according to claim 1, wherein the colored layers are formed in a plurality of first rows and a plurality of second rows extending in a first direction, the first rows and the second rows are alternately formed along a second direction that crosses the first direction, and the colored layers in the first rows and the colored layers in the second rows having same colors as the colored layers in the first rows are at positions offset by one pixel along the first direction.

16. The reflective display apparatus according to claim 1, wherein each of the plurality of traversing colored layers traverses four pixels and overlaps four subpixels.

17. The reflective display apparatus according to claim 1, wherein the ink fixing layer contacts the plurality of colored layers.

* * * * *